(12) United States Patent
Hattori et al.

(10) Patent No.: US 8,824,868 B2
(45) Date of Patent: Sep. 2, 2014

(54) PLAYBACK APPARATUS AND METHOD, PROGRAM, RECORDING MEDIUM, DATA STRUCTURE, AND MANUFACTURING METHOD FOR RECORDING MEDIUM

(75) Inventors: Shinobu Hattori, Minato-ku (JP); Motoki Kato, Minato-ku (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 12/833,667

(22) Filed: Jul. 9, 2010

(65) Prior Publication Data

US 2010/0272126 A1 Oct. 28, 2010

Related U.S. Application Data

(62) Division of application No. 11/505,370, filed on Aug. 17, 2010, now Pat. No. 8,139,922.

(30) Foreign Application Priority Data

Aug. 30, 2005 (JP) ................................ 2005-250163
Jun. 5, 2006 (JP) ................................ 2006-156203

(51) Int. Cl.
*H04N 5/92* (2006.01)
*H04N 9/80* (2006.01)
*H04N 5/84* (2006.01)
*H04N 5/89* (2006.01)
*H04N 5/78* (2006.01)

(52) U.S. Cl.
USPC ........... 386/326; 386/239; 386/248; 386/332; 386/334; 386/336; 386/337

(58) Field of Classification Search
CPC ..... H04N 5/85; H04N 9/8227; H04N 9/8205; G11B 2220/2541; G11B 27/105
USPC .......... 386/337, 239, 248, 326, 332, 334, 336
See application file for complete search history.

(56) References Cited

U.S. PATENT DOCUMENTS 7,389,036 B2 * 6/2008 Kim et al. ...................... 386/248
7,571,386 B2 * 8/2009 Yoo et al. ...................... 715/723

(Continued)

FOREIGN PATENT DOCUMENTS

JP 8-331509 A 12/1996
JP 2004-120099 4/2004

(Continued)

OTHER PUBLICATIONS

Office Action issued May 10, 2011, in Japanese Patent Application No. 2006-156203.

(Continued)

*Primary Examiner* — Daquan Zhao
(74) *Attorney, Agent, or Firm* — Oblon, Spivak, McClelland, Maier & Neustadt, L.L.P.

(57) ABSTRACT

A playback apparatus includes an obtaining unit obtaining playback management information including a main playback path of a main stream set, a first sub playback path of a first sub-stream set, and a second sub playback path of a second sub-stream set. The first and second sub playback paths are allowed for a predetermined category. A selection-receiver receives a selection of streams as a first combination or a second combination. A reading unit reads the corresponding stream sets according to whether the first or second combination is selected. A playback unit plays back the main stream set and the first or second sub-stream set. The number of files that are readable at one time is predetermined. The sub playback paths are determined so that the number of the files that are readable at one time does not exceed the predetermined number.

20 Claims, 61 Drawing Sheets

(56) References Cited

U.S. PATENT DOCUMENTS

| | | | |
|---|---|---|---|
| 7,660,516 B2* | 2/2010 | McCrossan et al. | 386/326 |
| 7,787,755 B2* | 8/2010 | Seo et al. | 386/201 |
| 2006/0039258 A1* | 2/2006 | Seo et al. | 369/53.2 |
| 2007/0025696 A1* | 2/2007 | Kim et al. | 386/95 |

FOREIGN PATENT DOCUMENTS

| | | |
|---|---|---|
| JP | 2004-328450 | 11/2004 |
| JP | 2005-158197 | 6/2005 |
| JP | 2007-95249 A | 4/2007 |
| WO | WO 2004030351 A1 * 4/2004 | H04N 5/44 |
| WO | WO 2005/074394 A2 | 8/2005 |
| WO | WO 2005/074394 A8 | 8/2005 |
| WO | WO 2005/078727 A1 | 8/2005 |
| WO | WO 2005079064 * 8/2005 | G11B 20/10 |

OTHER PUBLICATIONS

Japanese Office Action mailed Apr. 2, 2013, in Japanese Patent Application No. 2011-174437.

Japanese Office Action mailed issued Dec. 6, 2012, in Japanese Patent Application No. 2011-152906.

* cited by examiner

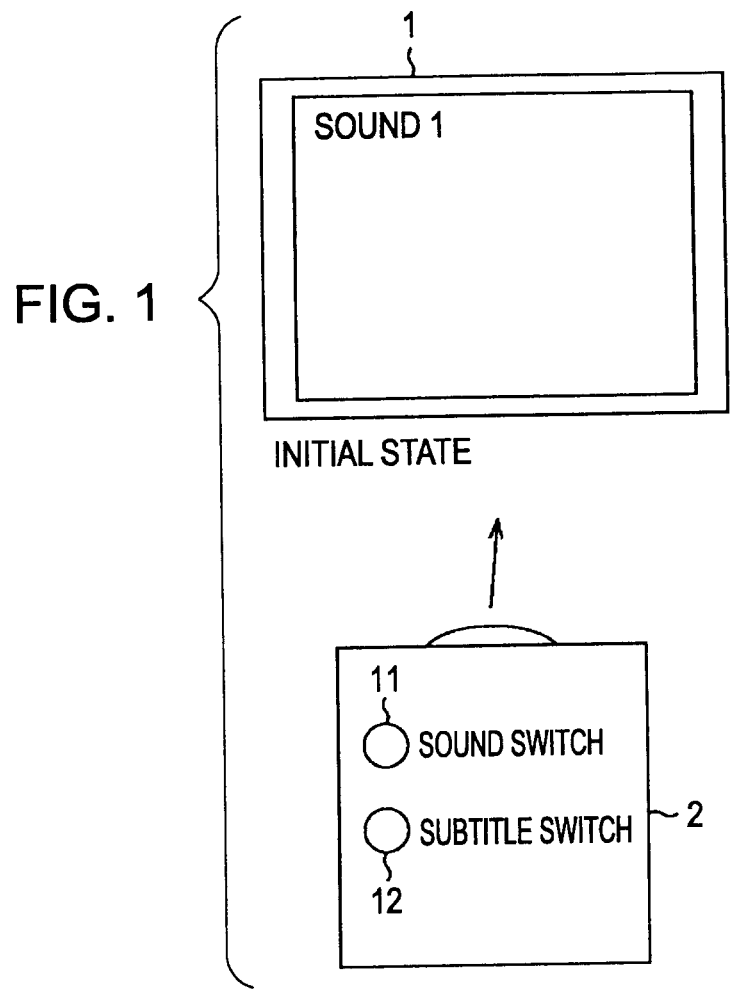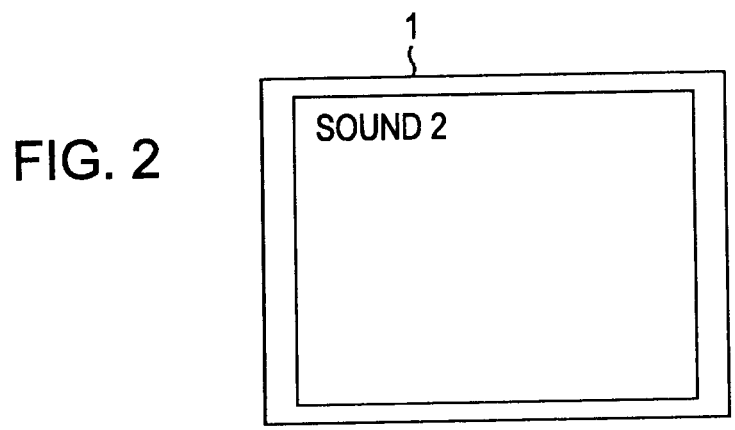

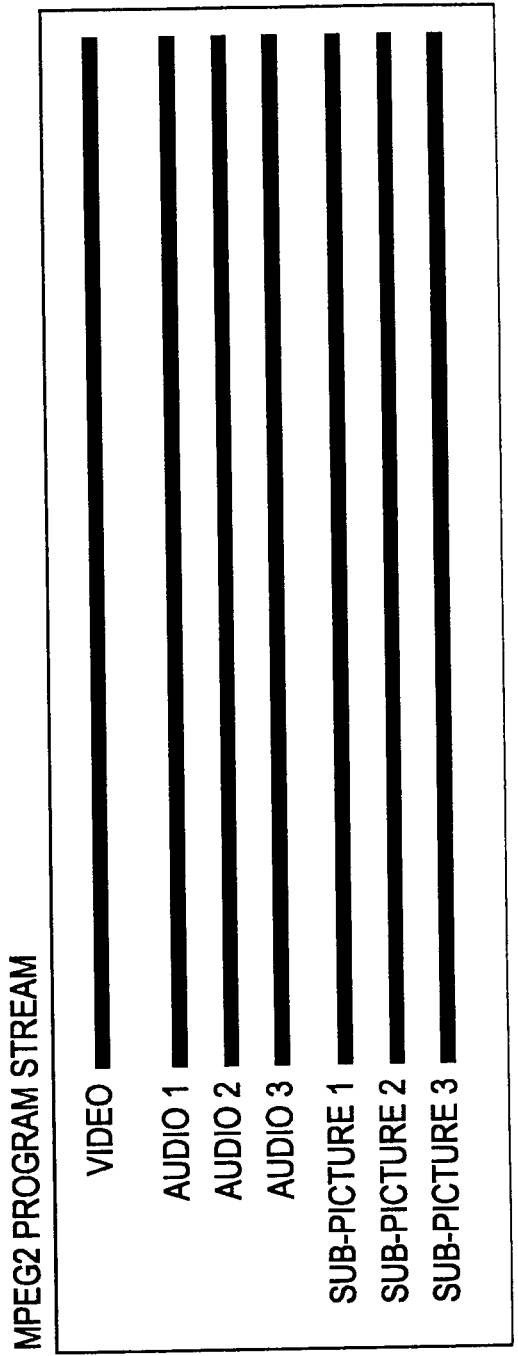

FIG. 4

STREAM NUMBER TABLE

A_SN=1: AUDIO 2
A_SN=2: AUDIO 1
A_SN=3: AUDIO 3

S_SN=1: SUB-PICTURE 3
S_SN=2: SUB-PICTURE 1
S_SN=3: SUB-PICTURE 2

FIG. 9

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|       PlayItem() | | |
|   } | | |
|   for (SubPath_id= 0; | | |
|     SubPath_id<number_of_SubPaths; | | |
|     SubPath_id++) { | | |
|       SubPath() | | |
|   } | | |
| } | | |

FIG. 10

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for(i=0;i< number_of_SubPlayItems;i++) { | | |
|     SubPlayItem(i) | | |
|   } | | |
| } | | |

FIG. 11

SubPath_type

| SubPath_type | Meaning |
|---|---|
| 0 | reserved |
| 1 | reserved |
| 2 | Audio presentation path of the Browsable slideshow<br>(The audio presentation path using the SubPath is not synchronized with the main path using PlayItems in the PlayList.) |
| 3 | Interactive graphics presentation menu<br>(The interactive graphics menu using the SubPath is not synchronized with the main path using PlayItems in the PlayList.) |
| 4 | Text subtitle presentation path<br>(The text subtitle presentation path using the SubPath is synchronized with the main path using PlayItems in the PlayList.) |
| 5 | 2nd Audio Presentation path<br>(The 2nd Audio Presentation path using the SubPath is synchronized with the main path using PlayItems in the PlayList.) |
| 6 | 2nd Video Presentation path<br>(The 2nd Video Presentation path using the SubPath is synchronized with the main path using PlayItems in the PlayList.) |
| 7–255 | reserved |

FIG. 12

```
SubPlayItem(i)-Syntax
```

| Syntax | No. of bits | Mnemonic |
|---|---|---|
| SubPlayItem(i) { | | |
|     length | 16 | uimsbf |
|     Clip_Information_file_name[0]    //subclip_entry_id=0 | 8*5 | bslbf |
|     Clip_codec_identifier[0] | 8*4 | bslbf |
|     reserved_for_future_use | 31 | bslbf |
|     is_multi_Clip_entries | 1 | bslbf |
|     ref_to_STC_id[0] | 8 | uimsbf |
|     SubPlayItem_IN_time | 32 | uimsbf |
|     SubPlayItem_OUT_time | 32 | uimsbf |
|     sync_PlayItem_id | 16 | uimsbf |
|     sync_start_PTS_of_PlayItem | 32 | uimsbf |
|     if(is_multi_Clip_entries==1b) { | | |
|         reserved_for_future_use | 8 | bslbf |
|         num_of_Clip_entries | 8 | uimsbf |
|         for(subclip_entry_id=1;//Note:Entries after subclip_entry_id=0 | | |
|         subclip_entry_id<num_of_Clip_entries;subclip_entry_id ++) { | | |
|             Clip_Information_file_name[subclip_entry_id] | 8*5 | bslbf |
|             Clip_codec_identifier[subclip_entry_id] | 8*4 | bslbf |
|             ref_to_STC_id[subclip_entry_id] | 8 | uimsbf |
|             reserved_for_future_use | 8 | bslbf |
|         } | | |
|     } | | |
| } | | |

FIG. 13

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 14

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attributes() | | |
|     } | | |
|     for (audio_stream_id2=0; | | |
|         audio_stream_id2 < number_of_audio_stream2_entries; | | |
|         audio_stream_id2++) { | | |
|         stream_entry() | | |
|         stream_attributes() | | |
|     } | | |
|     for (PG_textST_stream_id=0; | | |
|         PG_textST_stream_id < number_of_PG_textST_stream_entries; | | |
|         PG_txtST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |
| } | | |

FIG. 15

| Syntax | No. of bits | Mnemonic |
|---|---|---|
| Stream_entry() { | | |
| stream_entry(id) { | | |
|   length | 8 | uimsbf |
|   type | 8 | uimsbf |
|   if(type==1) { | | |
|     ref_to_stream_PID_of_mainClip | 16 | uimsbf |
|     reserved_for_future_use | 48 | Bslbf |
|   } else if(type==2) { | | |
|     ref_to_SubPath_id | 8 | Uimsbf |
|     ref_to_subClip_entry_id | 8 | Uimsbf |
|     ref_to_stream_PID_of_subClip | 16 | |
|     reserved_for_future_use | 32 | bslbf |
|   } | | |
| } | | |

FIG. 16 stream_attribute()

| Syntax | No. of bits | Mnemonic |
|---|---|---|
| stream_attribute() { | | |
|     length | 8 | uimsbf |
|     stream_coding_type | 8 | bslbf |
|     if (stream_coding_type==0x02) { | | |
|         video_format | 4 | bslbf |
|         frame_rate | 4 | bslbf |
|         aspect_ratio | 4 | bslbf |
|         reserved_for_future_use | 4 | bslbf |
|     } else if (stream_coding_type==0x80 \|\| <br>         stream_coding_type==0x81 \|\| <br>         stream_coding_type==0x82) { | | |
|         audio_presentation_type | 4 | bslbf |
|         sampling_frequency | 4 | bslbf |
|         audio_language_code | 8*2 | bslbf |
|         reserved_for_future_use | 8 | bslbf |
|     } else if (stream_coding_type==0x90) { <br>         // Presentation graphics stream | | |
|         PG_language_code | 8*2 | bslbf |
|     } else if (stream_coding_type==0x91) { <br>         // Interactive graphics stream | | |
|         IG_language_code | 8*2 | bslbf |
|     } else if (stream_coding_type==0x92) { <br>         // Text subtitle stream | | |
|         character_code | 8 | bslbf |
|         textST_language_code | 8*2 | bslbf |
|     } | | |
| } | | |

FIG. 17 stream_coding_type

| stream_coding_type | Meaning |
|---|---|
| 0x02 | MPEG-2 video stream |
| 0x80 | HDMV LPCM audio |
| 0x81 | Dolby AC-3 audio |
| 0x82 | dts audio |
| 0x90 | Presentation graphics stream |
| 0x91 | Interactive graphics stream |
| 0x92 | Text subtitle stream |
| other values | reserved |

FIG. 18 video_format

| video_format | Meaning | Video standard |
|---|---|---|
| 0 | reserved | |
| 1 | 480i | ITU-R BT.601-4 |
| 2 | 576i | ITU-R BT.601-4 |
| 3 | 480p | SMPTE 293M |
| 4 | 1080i | SMPTE 274M |
| 5 | 720p | SMPTE 296M |
| 6 | 1080p | SMPTE 274M |
| 7 - 14 | reserved | |

FIG. 19 frame_rate

| frame_rate | Meaning [Hz] |
|---|---|
| 0 | reserved |
| 1 | 24 000/1001 (23.976...) |
| 2 | 24 |
| 3 | 25 |
| 4 | 30 000/1001 (29.97...) |
| 5 | reserved |
| 6 | 50 |
| 7 | 60 000/1001 (59.94...) |
| 8-15 | reserved |

FIG. 20 aspect_ratio

| aspect_ratio | Meaning |
|---|---|
| 0 | reserved |
| 1 | reserved |
| 2 | 4:3 display aspect ratio |
| 3 | 16:9 display aspect ratio |
| 4-15 | reserved |

FIG. 21 audio_presentation_type

| audio_presentation_type | Meaning |
|---|---|
| 0 | reserved |
| 1 | single mono channel |
| 2 | dual mono channel |
| 3 | stereo (2-channel) |
| 4 | reserved |
| 5 | reserved |
| 6 | multi-channel |
| 7-15 | reserved |

FIG. 22 sampling_frequency

| sampling_frequency | Meaning |
|---|---|
| 0 | reserved |
| 1 | 48 kHz |
| 2 | reserved |
| 3 | reserved |
| 4 | 96 kHz |
| 5 -15 | reserved |

FIG. 23

| Character code value | Character set | Character Encoding scheme |
|---|---|---|
| 0x00 | reserved | |
| 0x01 | Unicode V1.1 (ISO 10646-1) | UTF8 |
| 0x02 | Unicode V1.1 (ISO 10646-1) | UTF16 big endian |
| 0x03 | Shift JIS (Japanese) | |
| 0x04 | KSC 5601-1987 including KSC 5653 for Roman character (Korean) | |
| 0x05 | GB18030-2000 (Chinese) | |
| 0x06 | GB2312 (Chinese) | |
| 0x07 | BIG5 (Chinese) | |
| Others | Reserved | |

FIG. 24

```
─────── STREAM NUMBER TABLE ───────

A_SN=1: AUDIO 2
A_SN=2: AUDIO 1
A_SN=3: AUDIO 3

A_SN2=1: AUDIO 4
A_SN2=2: AUDIO 5

S_SN=1: SUB-PICTURE 3
S_SN=2: SUB-PICTURE 1
S_SN=3: SUB-PICTURE 2
```

FIG. 32

STREAM NUMBER TABLE

A_SN=1: AUDIO 2
A_SN=2: AUDIO 1
A_SN=3: AUDIO 3

A_SN2=1: AUDIO 4
A_SN2=2: AUDIO 5

S_SN=1: SUB-PICTURE 3
S_SN=2: SUB-PICTURE 1
S_SN=3: SUB-PICTURE 2

⇩ USER'S SELECTION

MIX AND PLAY BACK AUDIO 1 + AUDIO 5

FIG. 33

| STN_table() | | |
|---|---|---|
| Syntax | No. of bits | Mnemonic |
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; <br>         video_stream_id < number_of_video_stream_entries; <br>         video_stream_id++) { | | |
|         stream_entry() | | |
|         stream_attribute() | | |
|     } | | |
|     for (audio_stream_id=0; <br>         audio_stream_id < number_of_audio_stream_entries; <br>         audio_stream_id++) { | | |
|         stream_entry() | | |
|         stream_attributes() | | |
|     } | | |
|     for (audio_stream_id2=0; <br>         audio_stream_id2 < number_of_audio_stream2_entries; <br>         audio_stream_id2++) { | | |
|         Combination_of_Primary_and_Secondary | | |
|         stream_entry() | | |
|         stream_attributes() | | |
|     } | | |
|     for (PG_textST_stream_id=0; <br>         PG_textST_stream_id < number_of_PG_textST_stream_entries; <br>         PG_txtST_stream_id++) { | | |
|         stream_entry() | | |
|         stream_attribute() | | |
|     } | | |
|     for (IG_stream_id=0; <br>         IG_stream_id < number_of_IG_stream_entries; <br>         IG_stream_id++) { | | |
|         stream_entry() | | |
|         stream_attribute() | | |
|     } | | |
| } | | |

FIG. 34

| Combination_of_Primary_and_Secondary | | | | | | | | | | | | |
|---|---|---|---|---|---|---|---|---|---|---|---|---|
| audio_stream_id | 0 | 1 | 2 | 3 | 4 | 5 | ... | 26 | 27 | 28 | 29 | 30 | 31 |
| indicator | 1 | 1 | 0 | 0 | 0 | 0 | ... | 0 | 0 | 0 | 0 | 0 | 0 |

FIG. 35

```
┌─ STREAM NUMBER TABLE ──────────────────────┐
│                                            │
│   A_SN=1: AUDIO 2 ... × AUDIO 4            │
│   A_SN=2: AUDIO 1 ... × AUDIO 4, × AUDIO 5 │
│   A_SN=3: AUDIO 3                          │
│                                            │
│   S_SN=1: SUB-PICTURE 3                    │
│   S_SN=2: SUB-PICTURE 1                    │
│   S_SN=3: SUB-PICTURE 2                    │
│                                            │
└────────────────────────────────────────────┘
```

FIG. 36

```
┌─ STREAM NUMBER TABLE ──────────────────────┐
│                                            │
│   A_SN=1: AUDIO 2 ... × AUDIO 4            │
│  ┌─────────────────┐                       │
│  │A_SN=2: AUDIO 1  │... × AUDIO 4, ○ AUDIO 5│
│  └─────────────────┘                       │
│   A_SN=3: AUDIO 3                          │
│                                            │
│   S_SN=1: SUB-PICTURE 3                    │
│   S_SN=2: SUB-PICTURE 1                    │
│   S_SN=3: SUB-PICTURE 2                    │
│                                            │
└────────────────────────────────────────────┘
```

⇩ USER'S SELECTION

MIX AND PLAY BACK AUDIO 1 + AUDIO 5

FIG. 37

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 38

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_textST_stream_entries | 8 | uimsbf |
|     number_of_IG_stream_entries | 8 | uimsbf |
|     number_of_audio_stream2_entries | 8 | uimsbf |
|     reserved_for_future_use | 56 | Bslbf |
|     for(video_stream_id=0; | | |
|         video_stream_id<number_of_video_stream_entries; | | |
|         video_stream_id++) { | | |
|         stream_entry() | | |
|         stream_attributes() | | |
|     } | | |
|     for(audio_stream_id=0; | | |
|         audio_stream_id < | | |
|         number_of_audio_stream_entries; | | |
|         audio_stream_id++) { | | |
|         stream_entry() | | |
|         stream_attributes() | | |
|         if(number_of_audio_stream2_entries!=0) { | | |
|             number_of_audio_stream2_ref_entries | 8 | uimsbf |
|             for(i=0; i< number_of_audio_stream2_ref_entries; i++) { | | |
|                 audio_stream_id2_ref | 8 | uimsbf |
|             } | | |
|         } | | |
|     } | | |
|     for(PG_textST_stream_id=0; | | |
|         PG_textST_stream_id<number_of_PG_textST_stream_entries; | | |
|         PG_textST_stream_id++) { | | |
|         stream_entry() | | |
|         stream_attributes() | | |
|     } | | |
|     for(IG_stream_id=0; | | |
|         IG_stream_id<number_of_IG_stream_entries; | | |
|         IG_stream_id++) { | | |
|         stream_entry() | | |
|         stream_attributes() | | |
|     } | | |
|     for(audio_stream_id2=0; | | |
|         audio_stream_id2 < | | |
|         number_of_audio_stream2_entries; | | |
|         audio_stream2_id++) { | | |
|         stream_entry() | | |
|         stream_attributes() | | |
|     } | | |
| } | | |

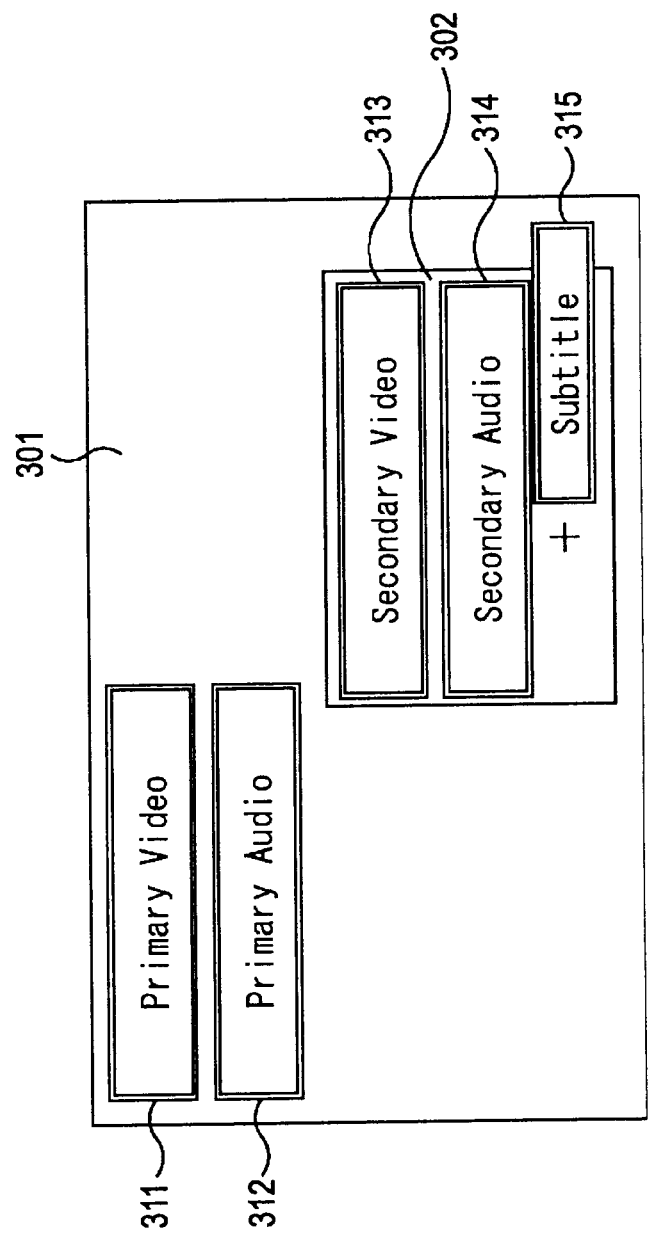

FIG. 40

| STN_table() | | |
|---|---|---|
| Syntax | No. of bits | Mnemonic |
| STN_definition_table() { | | |
|     length | 16 | uimsbf |
|     reserved_for_future_use | 16 | bslbf |
|     num_of_video_stream_entries | 8 | uimsbf |
|     num_of_audio_stream_entries | 8 | uimsbf |
|     num_of_audio_stream2_entries | 8 | uimsbf |
|     num_of_PG_txtST_stream_entries | 8 | uimsbf |
|     num_of_IG_stream_entries | 8 | uimsbf |
|     num_of_video_stream2_entries | 8 | uimsbf |
|     reserved_for_future_use | 48 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attributes() | | |
|     } | | |
|     for (audio_stream_id2=0; | | |
|         audio_stream_id2 < number_of_audio_stream2_entries; | | |
|         audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |
|     } | | |
|     for (PG_textST_stream_id=0; | | |
|         PG_textST_stream_id < number_of_PG_textST_stream_entries; | | |
|         PG_txtST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |

FIG. 41

| Syntax | No. of bits | Mnemonic |
|---|---|---|
| for (video_stream_id2=0; | | |
| video_stream_id2 < num_of_video_stream2_entries; | | |
| video_stream_id2++) { | | |
| number_of_Audio_combinations_for_video2 | 8 | |
| for (i=0; i<number_of_Audio_combinations_for_video2; i++) { | | |
| audio_stream_id | 8 | |
| audio_stream_id2 | 8 | |
| } | | |
| number_of_Subtitle_combinations_for_video2 | 8 | |
| for (i=0; i<number_of_Subtitle_combinations_for_video2; i++) { | | |
| PG_textST_stream_id | 8 | |
| } | | |
| stream_entry() | | |
| stream_attributes() | | |
| } | | |

FIG. 42

STREAM NUMBER TABLE

A_SN=1: AUDIO 2 ... × VIDEO 2, × AUDIO 4
A_SN=2: AUDIO 1 ... × VIDEO 1, × AUDIO 4, × AUDIO 5
A_SN=3: AUDIO 3

V2_SN=1: VIDEO 2 ... × AUDIO 2, × AUDIO 4,     × SUB-PICTURE 3
V2_SN=2: VIDEO 1 ... × AUDIO 1, × AUDIO 4, × AUDIO 5, × SUB-PICTURE 1

S_SN=1: SUB-PICTURE 3
S_SN=2: SUB-PICTURE 1
S_SN=3: SUB-PICTURE 2

FIG. 45

SubPath_type

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG. 46

Stream_entry()

| Syntax | No. of bits | Mnemonic |
|---|---|---|
| stream_entry(id) { | | |
|   length | 8 | uimsbf |
|   type | 8 | uimsbf |
|   if(type==1) { | | |
|     ref_to_stream_PID_of_mainClip | 16 | uimsbf |
|     reserved_for_future_use | 48 | Bslbf |
|   } else if(type==2) { | | |
|     ref_to_SubPath_id | 8 | Uimsbf |
|     ref_to_subClip_entry_id | 8 | Uimsbf |
|     ref_to_stream_PID_of_subClip | 16 | |
|     reserved_for_future_use | 32 | bslbf |
|   } else if(type==3) { | | |
|     ref_to_SubPath_id | 8 | |
|     ref_to_stream_PID_of_mainClip | 16 | |
|     reserved_for_future_use | 40 | |
|   } | | |
| } | | |

FIG. 52

| application_type | meaning | Stream Input |
|---|---|---|
| 0 | reserved | |
| 1 | TS for Movie applications | These type of Clip AV stream files may be provided from either Disc or Local storage |
| 2 | TS for Time based slide show | |
| 3 | TS for a main-path of Browsable slide show | |
| 4 | TS for a sub-path of Browsable slide show | |
| 5 | TS for a sub-path of Interactive graphics menu | |
| 6 | TS for a sub-path of Text subtitle | |
| 7 | TS for a sub-path of one or more elementary streams path | This type of Clip AV stream file may be provided only from Local storage, shall not provided from Disc |
| 8-255 | reserved | |

FIG. 53

| application_type (of Main TS) | | SubPath_type | number of SubPaths |
|---|---|---|---|
| Movie Type/ Time-based Slideshow | 1 or 2 | 3 (*1) | ≥0 |
| | | 4 | ≥0 |
| | | 5 | ≥0 |
| | | 6 | ≥0 |
| | | 7 | 0,1 |
| | | 2 | ≥0 |
| Browsable slideshow | 3 | 3 (*2) | ≥0 |

(*1) If the PlayItems of PlayList uses IG or If the SubPaths with SubPath_type=5 uses IG, then the PlayList shall not have SubPaths with SubPath_type=3

(*2) If the PlayItems of PlayList uses IG, then the PlayList shall not have SubPaths with SubPath_type=3

FIG. 54

| Num of PlayItem | Num of SubPat |
|---|---|
| 1 | 0 |
| 1 | 1 |
| 1 | 2 (*) |

(*) one SubPath and one SubPath with SubPath_type=7

US 8,824,868 B2

PLAYBACK APPARATUS AND METHOD, PROGRAM, RECORDING MEDIUM, DATA STRUCTURE, AND MANUFACTURING METHOD FOR RECORDING MEDIUM

CROSS REFERENCES TO RELATED APPLICATIONS

This application is a division of application Ser. No. 11/505,370, filed Aug. 17, 2006, and claims the benefit of priority under 35 U.S.C. §119 from Japanese Patent Application JP 2005-250163 filed in the Japanese Patent Office on Aug. 30, 2005 and Japanese Patent Application JP 2006-156203 filed in the Japanese Patent Office on Jun. 5, 2006, the entire contents of which are incorporated herein by reference.

BACKGROUND OF THE INVENTION

1. Field of the Invention

The present invention generally relates to playback apparatuses and methods, programs, recording media, data structures, and manufacturing methods for recording media. More particularly, the invention relates to a playback apparatus and method, a program, a recording medium, a data structure, and a manufacturing method for the recording medium, which are suitably used when playing back streams.

2. Description of the Related Art

In digital versatile disc (DVD) video standards, interactive operations can be performed, that is, users can switch sound or subtitles when playing back AV content, such as a movie, recorded in an information recording medium (for example, see DVD Specifications for Read-Only Disc Part 3; Version 1.1). More specifically, in a display device 1 shown in FIG. 1, the user operates a sound switch button 11 or a subtitle switch button 12 of a remote controller 2 to switch sound or subtitles of AV content displayed on the display device 1. For example, if the user operates the sound switch button 11 when sound 1 is set in the initial state in the display device 1, sound 1 is switched to sound 2, as shown in FIG. 2.

AV content based on the DVD video standards is recorded in the form of a Moving Picture Experts Group (MPEG)2 program stream. In the MPEG2 program stream, as shown in FIG. 3, a video stream (indicated by "video" in FIG. 3), a plurality of audio streams (indicated by "audio 1", "audio 2", and "audio 3" in FIG. 3), and a plurality of sub-picture streams (indicated by "sub-picture 1, "sub-picture 2", and "sub-picture 3") are multiplexed such that the audio streams and the sub-picture streams are synchronized with the video stream. The sub-picture streams (sub-pictures 1, 2, and 3) are streams in which bitmap images are run-length coded, and are mainly used for subtitles.

Generally, a plurality of audio streams are used for recording sound of different languages, and a plurality of sub-picture streams are used for recording subtitles of different languages. The user can interactively select sound or subtitles of a desired language by using the remote controller 2 while video is being played back.

The DVD video standards define a table structure, provided to users, indicating the relationship between sound numbers and a plurality of audio streams (audio 1, 2, and 3) and the relationship between subtitle numbers and a plurality of sub-picture streams (sub-pictures 1, 2, and 3) in a program stream.

FIG. 4 illustrates an example of such a stream number table. In this table, the sound numbers are referred to as "A_SN (Audio Stream Numbers)", and the subtitle numbers are referred to as "S_SN (Sub-picture Stream Numbers)". In the stream number table shown in FIG. 4, each of the audio streams is provided with A_SN, and more specifically, A_SN=1: audio 2, A_SN=2: audio 1, and A_SN-3: audio 3. Also in FIG. 4, each of the sub-picture streams is provided with S_SN, and more specifically, S_SN=1: sub-picture 3, S_SN=2: sub-picture 1, and S_SN=3: sub-picture 2. In this case, a smaller number of A_SN or S_SN indicates an audio signal or a subtitle signal to be provided to users with higher priority. That is, A_SN=1 is an audio stream played back as a default, and S SN=1 is a sub-picture stream played back as a default.

More specifically, sound 1 played back in the initial state in FIG. 1 is audio 2, which is A_SN=1 (FIG. 4), and sound 2 played back after being switched from sound 1 in FIG. 2 is audio 1, which is A_SN=2.

SUMMARY OF THE INVENTION

According to the DVD video standards, however, when the user switches sound or subtitles while playing back a video program stream, the user can select only from audio streams or sub-picture streams multiplexed into the program stream which is currently played back. That is, when playing back the MPEG2 program stream shown in FIG. 3, the user can select only from audio 1 through audio 3 when switching sound.

Accordingly, even if another stream having audio streams and subtitles different from a program stream which is currently played back is available, it is difficult for the user to switch sound or subtitles to the audio streams or subtitles in the different stream. Accordingly, the extensibility in selecting streams is low.

It can also be considered that in the near future, content to be switched will not be restricted to sound, but will be extended to various types of content items, such as video. If it is difficult to select content items from a stream different from a stream which is being played back when switching such various types of content, the extensibility in selecting streams becomes low.

It is thus desirable to simplify the data structure of various types of content, such as sound and video, that can be selected from streams or data files different from a main AV stream so that the selected content can be played back together with the main AV stream.

According to an embodiment of the present invention, there is provided a playback apparatus including obtaining means for obtaining playback management information including a main playback path indicating a position on a time axis of a main stream set, a first sub playback path indicating a position on the time axis of a first sub-stream set, and a second sub playback path indicating a position on the time axis of a second sub-stream set, which is different from the first sub-stream set, the playback management information being classified into a predetermined category among a plurality of categories that are defined beforehand in accordance with the type of the main stream set, the playback management information satisfying at least a first condition that each of the first sub playback path and the second sub playback path is a playback path allowed for the predetermined category, selection-receiving means for receiving a selection of streams to be played back based on the playback management information obtained by the obtaining means as a first combination of the main stream set and the first sub stream set or a second combination of the main stream set and the second sub stream set, reading means for reading the main stream set by referring to the main playback path and the first sub-stream set by referring to the first sub playback path when the selection of the first combination is received by the selection-receiving means, or for reading the main stream set by referring to the main playback path and the second sub-stream set by referring to the second sub playback path when the selection of the second combination is received by the selection-receiving means, and playback means for playing back, together with the main stream set read by the reading means, the first sub-stream set or the second sub-stream set read by the reading means. The main stream set, the first sub-stream set, and the second sub-stream set are included in files. The number of the files that are readable at one time by the reading means is a predetermined number. The playback management information satisfies, in addition to the first condition, a second condition that one or more of the first and second sub playback paths are determined so that the number of the files that are readable at one time does not exceed the predetermined number.

The main playback path may indicate a position on the time axis of at least one stream of the main stream set included in a first file. The first sub playback path or the second sub playback path may indicate a position on the time axis of at least one stream of the first sub-stream set or the second sub-stream set, respectively, included in one or more second files. The reading means may read one or more streams specified by the playback management information obtained by the obtaining means from a corresponding file selected from the first file referred to by the main playback path and the one or more second files referred to by one or more of the first and second sub playback paths.

The predetermined number of the files that are readable at one time may be two. The first file and the one or more second files may be different files, and the second condition may be that the one or more first and second sub playback paths are determined so that the number of the second file read together with the first file is one.

The predetermined number of the files that are readable at one time may be two. Among the one or more second files, a predetermined second file may be the same file as the first file, and the remaining file may be a file different from the first file. The second condition may be that the one or more sub-playback paths are determined so that one of the second files read with the first file is the same file as the first file and the other second file is different from the first file.

If the one or more first and second sub playback paths include at least one non-synchronized reading type defining that the one or more second files are read asynchronously with the first file, the playback management information may satisfy, in addition to the first condition and the second condition, a third condition that the one or more second files referred to by the one or more first and second sub playback paths of the non-synchronized reading type do not count toward the number of the files that are readable at one time.

According to another embodiment of the present invention, there is provided a playback method or a program including the steps of obtaining playback management information including a main playback path indicating a position on a time axis of a main stream set, a first sub playback path indicating a position on the time axis of a first sub-stream set, and a second sub playback path indicating a position on the time axis of a second sub-stream set, which is different from the first sub-stream set, the playback management information being classified into a predetermined category among a plurality of categories that are defined beforehand in accordance with the type of the main stream set, the playback management information satisfying at least a first condition that each of the first sub playback path and the second sub playback path is a playback path allowed for the predetermined category, receiving a selection of streams to be played back based on the obtained playback management information as a first combination of the main stream set and the first sub stream set or a second combination of the main stream set and the second sub stream set, reading the main stream set by referring to the main playback path and the first sub-stream set by referring to the first sub playback path when the selection of the first combination is received, or for reading the main stream set by referring to the main playback path and the second sub-stream set by referring to the second sub playback path when the selection of the second combination is received, and playing back, together with the read main stream set, the first sub-stream set or the second sub-stream set which is read. The main stream set, the first sub-stream set, and the second sub-stream set are included in files. The number of the files that are readable at one time is a predetermined number. The playback management information satisfies, in addition to the first condition, a second condition that one or more of the first and second sub playback paths are determined so that the number of the files that are readable at one time does not exceed the predetermined number.

Data or a data structure recorded on a recording medium according to an embodiment of the present invention includes playback management information for managing playback of at least two streams including a first stream and a second stream. The playback management information includes a main playback path indicating the position on the time axis of the first stream, a sub playback path indicating the position on the time axis of the second stream, and type information indicating whether the second stream is played back synchronously with the first stream and whether the second stream is multiplexed into the same file as the first stream.

The type information may indicate that the second stream is played back synchronously with the first stream and that the second stream is multiplexed into the same file as the first stream.

The type information may indicate that the second stream is played back synchronously with the first stream and that the second stream is multiplexed into a file different from a file of the first stream.

The type information may indicate that the second stream is played back asynchronously with the first stream and that the second stream is multiplexed into a file different from a file of the first stream.

According to another embodiment of the present invention, there is provided a manufacturing method for a recording medium on which data that can be played back by a playback apparatus is recorded. The manufacturing method includes the steps of generating data having a data structure including playback management information for managing playback of at least two streams, the playback management information including a main playback path indicating the position on the time axis of the first stream, a sub playback path indicating the position on the time axis of the second stream, and type information indicating whether the second stream is played back synchronously with the first stream and whether the second stream is multiplexed into the same file as the first stream, and recording the generated data on the recording medium.

Data or a data structure recorded on a recording medium according to another embodiment of the present invention includes playback management information for managing playback of a file including at least one stream. Playback management information includes a main playback path indicating the position on the time axis of a main stream set, a first sub playback path indicating the position on the time axis of a first sub-stream set, and a second sub playback path indicating the position on the time axis of a second sub-stream set, which is different from the first sub-stream set, the playback management information being classified into a predetermined category among a plurality of categories that are defined beforehand in accordance with the type of the main stream set. The playback management information at least satisfies a condition that each of the first sub playback path and the second sub playback path is a playback path allowed for the predetermined category. The main stream set, the first sub-stream set, and the second sub-stream set are included in files. The first sub playback path and the second sub playback path are determined so that the number of the files that are readable at one time does not exceed a number which is predetermined in a playback apparatus.

According to another embodiment of the present invention, there is provided a manufacturing method for a recording medium on which data that can be played back by a playback apparatus is recorded. The manufacturing method includes the steps of generating data having a data structure including playback management information and recording the generated data on the recording medium. In the data structure, playback management information includes a main playback path indicating the position on the time axis of a main stream set, a first sub playback path indicating a position on the time axis of a first sub-stream set, and a second sub playback path indicating the position on the time axis of a second sub-stream set, which is different from the first sub-stream set, the playback management information being classified into a predetermined category among a plurality of categories that are defined beforehand in accordance with the type of the main stream set. The playback management information at least satisfies a condition that each of the first sub playback path and the second sub playback path is a playback path allowed for the predetermined category. The main stream set, the first sub-stream set, and the second sub-stream set are included in files. The first sub playback path and the second sub playback path are determined so that the number of the files that are readable at one time does not exceed a number which is predetermined in the playback apparatus.

According to an embodiment of the present invention, various types of content, such as sound and video, can be selected from streams or data files different from a main AV stream. In particular, the data structure of such content can be simplified, and the selected content can be played back.

BRIEF DESCRIPTION OF THE DRAWINGS

FIGS. 1 and 2 illustrate known sound switching operations;
FIG. 3 illustrates the structure of an MPEG2 program stream;
FIG. 4 illustrates a stream number table indicating sound signals and subtitle signals provided to a user;
FIG. 9 illustrates the syntax of PlayList( );
FIG. 10 illustrates the syntax of SubPath( );
FIG. 11 illustrates an example of SubPath_type;
FIG. 12 illustrates the syntax of SubPlayItem(i);
FIG. 13 illustrates the syntax of PlayItem( );
FIG. 14 illustrates the syntax of a first example of STN_t-able( );

FIG. 15 illustrates an example of the syntax of stream_entry( );
FIG. 16 illustrates the syntax of stream_attribute( );
FIG. 17 illustrates stream_coding_type;
FIG. 18 illustrates video_format;
FIG. 19 illustrates frame_rate;
FIG. 20 illustrates aspect_ratio;
FIG. 21 illustrates audio_presentation_type;
FIG. 22 illustrates sampling_frequency;
FIG. 23 illustrates character code;
FIG. 24 illustrates a stream number table indicating sound signals and subtitle signals provided to a user;
FIG. 32 illustrates an example in which two audio streams are mixed and played back;
FIG. 33 illustrates the syntax of a second example of STN_table( ) defining combinations of audio streams #1 and audio streams #2;
FIG. 34 illustrates an example of the bitmap syntax of Combination_of_Primary_and_Secondary;
FIG. 35 illustrates a stream number table indicating sound signals and subtitle signals provided to a user;
FIG. 36 illustrates another example in which two audio streams are mixed and played back;
FIG. 37 illustrates the syntax of a third example of STN_t-able( ) defining combinations of audio streams #1 and audio streams #2;
FIG. 38 illustrates the syntax of a fourth example of STN_table( ) defining combinations of audio streams #1 and audio streams #2;
FIG. 39 illustrates a picture-in-picture (PiP) technique;
FIGS. 40 and 41 illustrate the syntax of a fifth example of STN_table( ) defining combinations of secondary video streams, primary audio streams, secondary audio streams, and subtitle streams that can be played back together with primary video streams;
FIG. 42 illustrates a stream number table indicating combinations of sound signals, video signals, and subtitle signals provided to a user;
FIG. 45 illustrates another example of SubPath_type different from SubPath_type shown in FIG. 11;
FIG. 46 illustrates another example of stream_entry( )

FIG. 52 illustrates the categories of application_type;

FIG. 53 illustrates a sub-path restriction technique, and more specifically, FIG. 53 illustrates sub-paths that can be provided for playlists according to the types of playlists;

FIG. 54 illustrates a sub-path restriction technique, and more specifically, FIG. 54 illustrates the relationships between the number of play items disposed in a playlist and the number of sub-paths;

DESCRIPTION OF THE PREFERRED EMBODIMENTS

Figure 5:
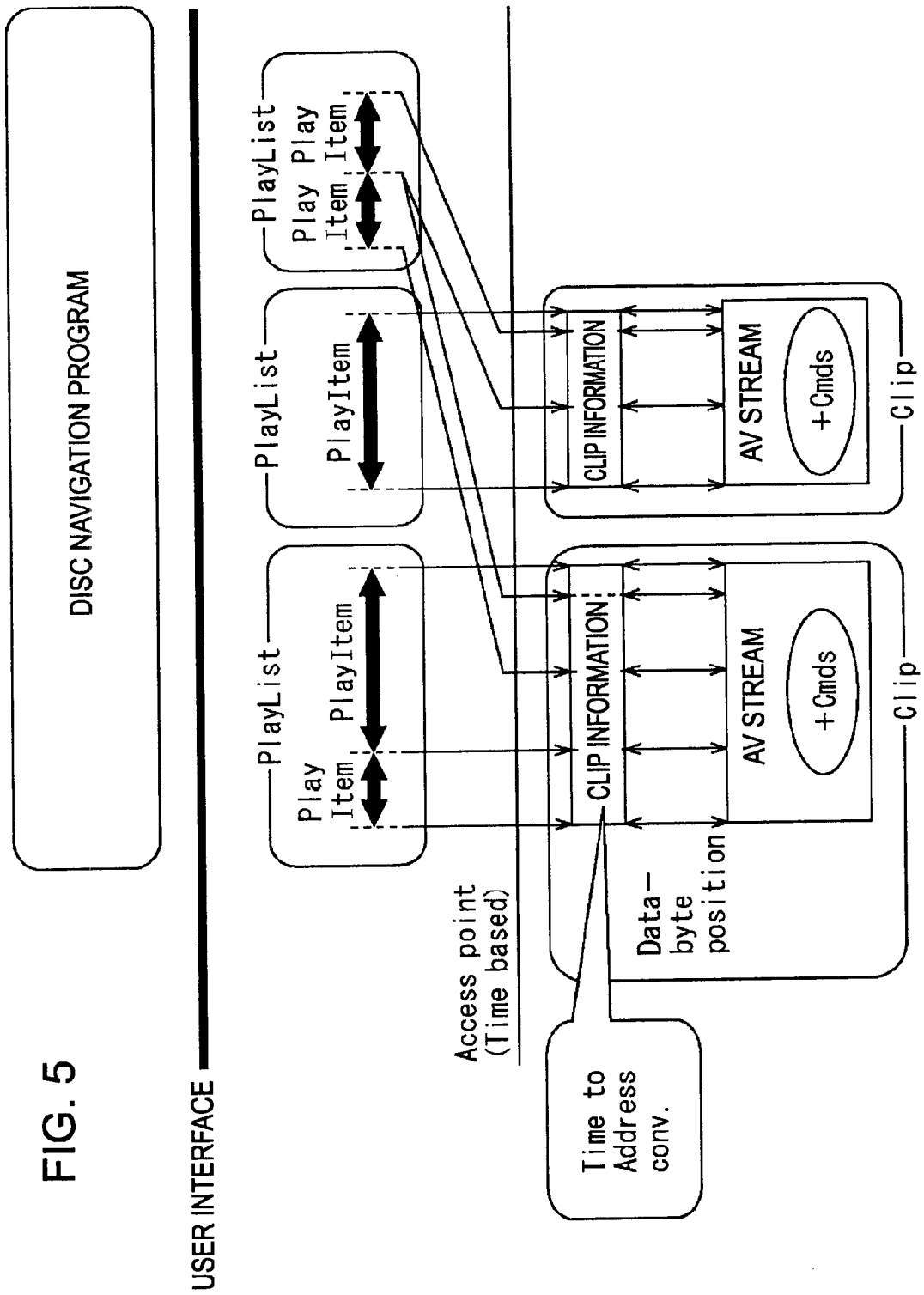
FIG. 5 illustrates an example of an application format on a recording medium installed on a playback apparatus of an embodiment of the present invention.

Before describing an embodiment of the present invention, the correspondence between the features of the claims and an embodiment of the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

A playback apparatus (for example, a playback apparatus 401 shown in FIG. 49) according to an embodiment of the present invention includes obtaining means (controller 34 shown in FIG. 49 executing step S11 in FIG. 26 for playing back a playlist of application_type=1 or 2 shown in FIGS. 61 through 64) for obtaining playback management information (for example, the playlist shown in FIG. 58) including a main playback path (for example, the main path shown in FIG. 58) indicating a position on a time axis of a main stream set (for example, video or audio in clip AV stream-0 in FIG. 58), a first sub playback path (for example, sub-path 1 in FIG. 58) indicating a position on the time axis of a first sub-stream set (for example, second video or second audio), and a second sub playback path (for example, sub-path 2 referring to clip AV stream-1 or sub-path 3 referring to clip AV stream-2) indicating a position on the time axis of a second sub-stream set (for example, audio), which is different from the first sub-stream set, the playback management information being classified into a predetermined category (for example, a category, i.e., movie-type/time-based slideshow of categories classified into application_type (of main TS) in FIG. 53, that is, synchronized type, which is discussed below) among a plurality of categories that are defined beforehand in accordance with the type of the main stream set, the playback management information satisfying at least a first condition that each of the first sub playback path and the second sub playback path is a type (for example, one of SubPath_type (FIG. 45)=5, 6, or 7 in FIG. 53) of playback path allowed for the predetermined category, selection-receiving means (for example, the controller 34 shown in FIG. 49 executing steps S164 through S169) for receiving a selection of streams to be played back based on the playback management information obtained by the obtaining means as a first combination of the main stream set and the first sub stream set or a second combination of the main stream set and the second sub stream set, reading means (for example, the controller 34 shown in FIG. 49 executing processing equivalent to step S108 in FIG. 51 before executing step S151 in FIG. 62, step S155 in FIG. 63, and steps S161 and S162 in FIG. 64 when playing back the playlist in FIG. 58) for reading the main stream set by referring to the main playback path and the first sub-stream set by referring to the first sub playback path when the selection of the first combination is received by the selection-receiving means, or for reading the main stream set by referring to the main playback path and the second sub-stream set by referring to the second sub playback path when the selection of the second combination is received by the selection-receiving means, and playback means (for example, an AV decoder 33 shown in FIG. 49 executing step S151 in FIG. 62, step S155 in FIG. 63, and steps S161 and S162 in FIG. 64) for playing back, together with the main stream set read by the reading means, the first sub-stream set or the second sub-stream set read by the reading means. The main stream set, the first sub-stream set, and the second sub-stream set are included in files (clips). The number of the files that are readable at one time by the reading means is a predetermined number. The playback management information satisfies, in addition to the first condition, a second condition (for example, the number of sub paths in FIG. 53 and the conditions shown in FIG. 54) that one or more of the first and second sub playback paths are determined so that the number of the files that are readable at one time does not exceed the predetermined number.

The main playback path indicates a position on the time axis of at least one stream (for example, clip AV stream-0 in FIGS. 55 through 58) in the main stream set included in a first file. The first sub playback path or the second sub playback path indicates a position on the time axis of at least one stream (for example, clip AV stream-1, 2, 3 in FIGS. 55 through 58) in the first sub-stream set or the second sub-stream set, respectively, included in one or more second files, and the reading means reads one or more streams specified by the playback management information obtained by the obtaining means from a corresponding file selected from the first file referred to by the main playback path and the one or more second files referred to by one or more of the first and second sub playback paths.

The predetermined number of the files that are readable at one time is two. The first file and the one or more second files are different files (for example, in FIGS. 55 through 57, the clips containing clip AV stream-1, 2, 3 are different from the clip containing clip AV stream-0). The second condition is that the one or more first and second sub playback paths are determined so that the number of the second file read together with the first file is one (for example, the middle row in the table shown in FIG. 54).

The predetermined number of the files that are readable at one time is two. Among the one or more second files, a predetermined second file is the same file as the first file (for example, in FIG. 58, a clip, which is the second file including the clip AV stream referred to by sub path-1, is the same clip as the first file referred to by the main path), and the remaining files are files different from the first file (for example, in FIG. 58, clips, which are the second files referred to by sub-path 2 and sub-path 3, are clip-1 and clip-2 different from clip-0, which is the first file referred to by the main path). The second condition is that the one or more sub playback paths are determined so that one of the second files read with the first file is the same file as the first file or the other second file is different from the first file (for example, the bottommost row in the table shown in FIG. 54).

If the one or more first and second sub playback paths include at least one non-synchronized reading type (for example, in FIG. 45, SubPath_type=3, i.e., IG preloading type) defining that the one or more second files are read asynchronously with the first file, the playback management information satisfies, in addition to the first condition and the second condition, a third condition that the one or more second files referred to by the one or more first and second sub playback paths of the non-synchronized reading type do not count toward the number of the files that are readable at one time.

Figure 58:
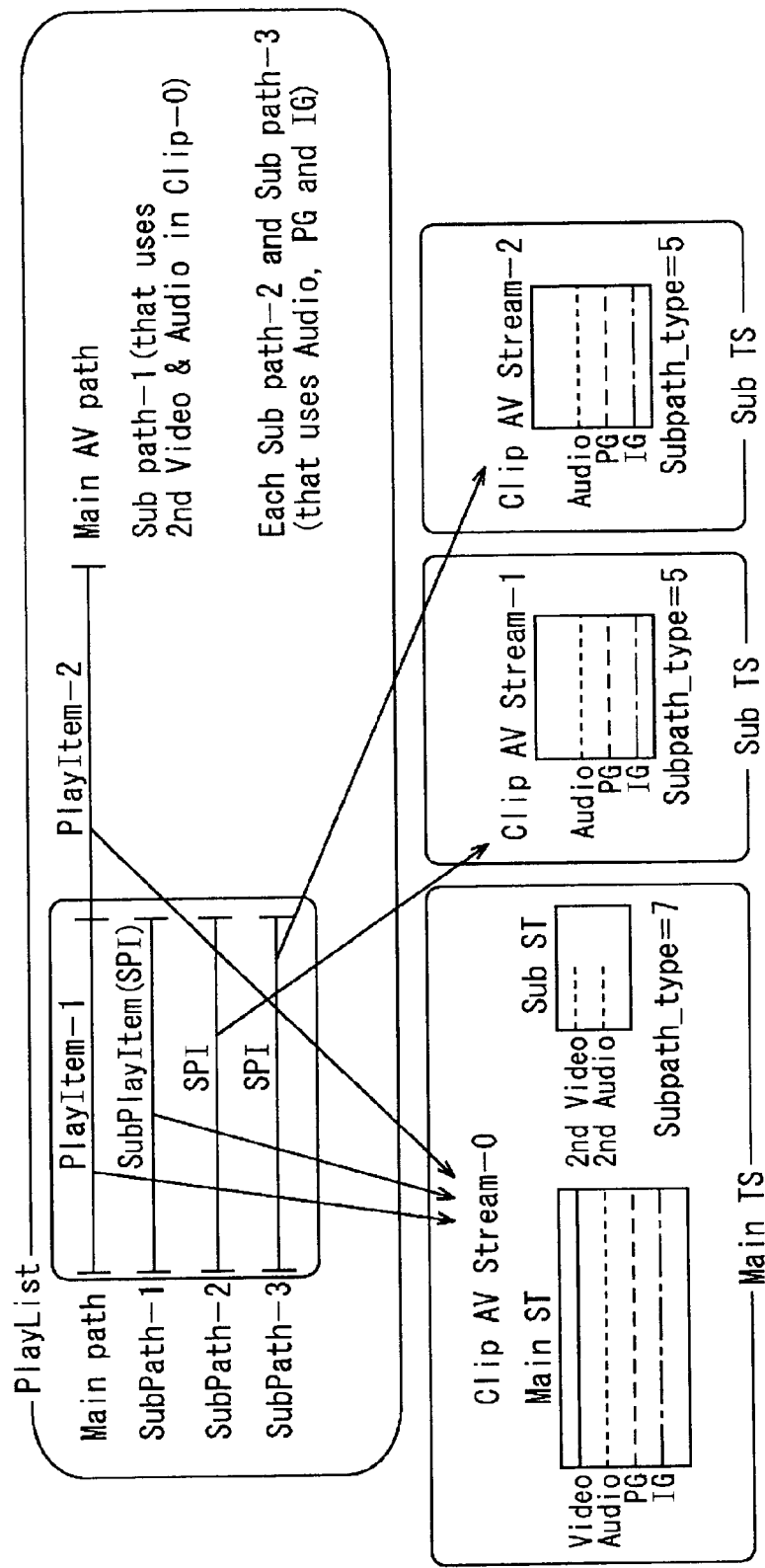
Figure 62:
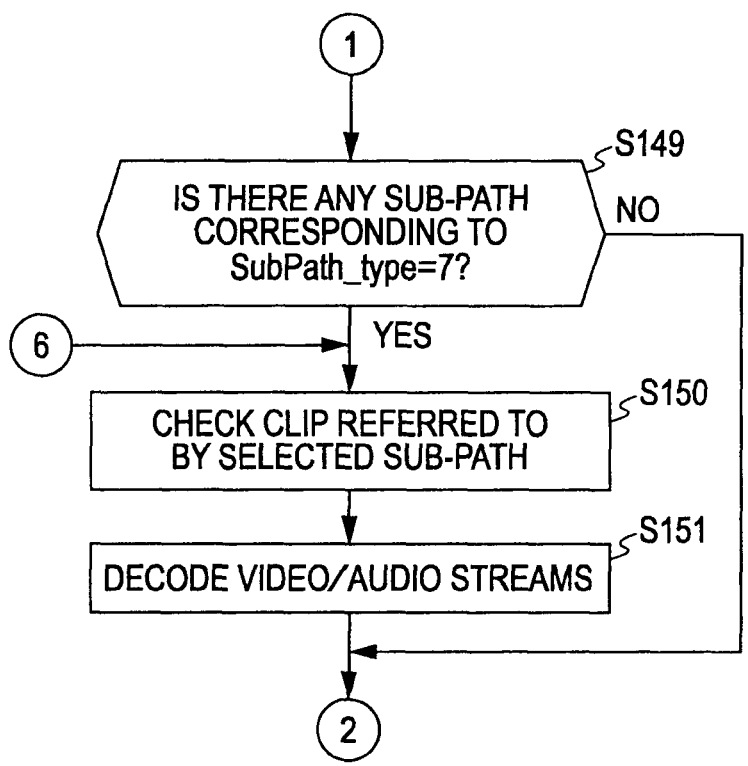
Figure 63:
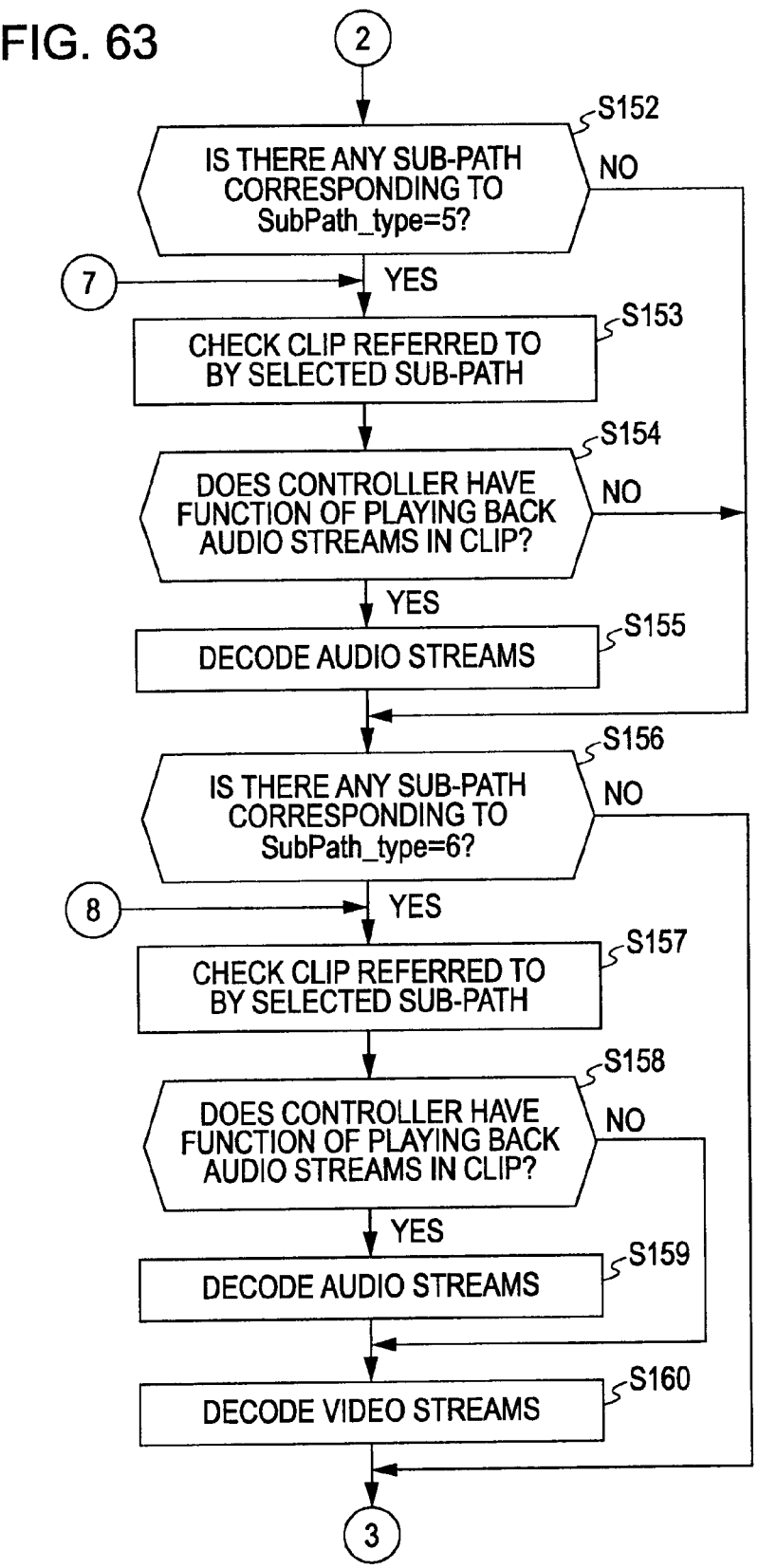
Figure 64:
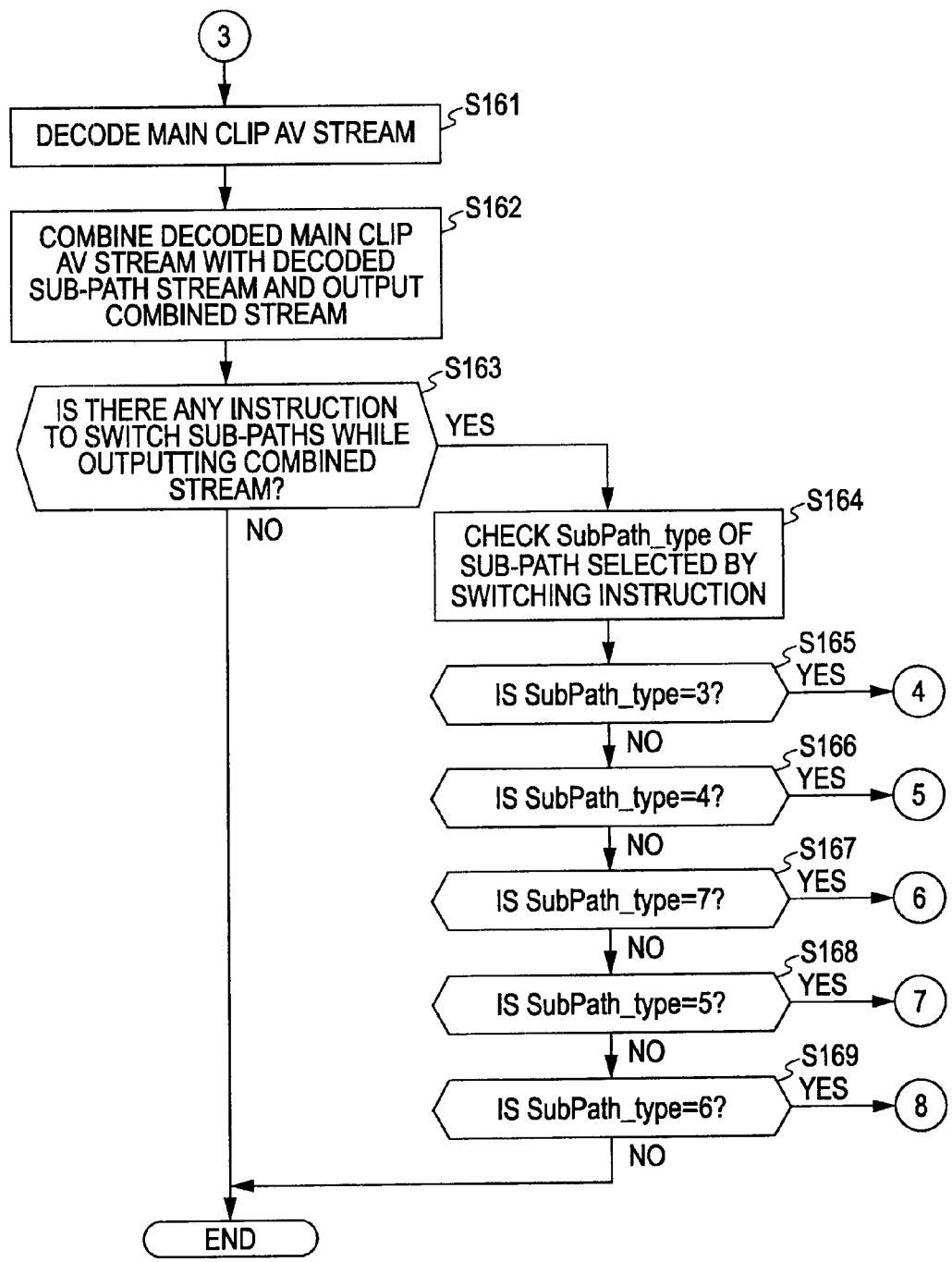

A playback method or a program according to another embodiment of the present invention includes the steps of obtaining playback management information (for example, the playlist shown in FIG. 58) including a main playback path (for example, the main path shown in FIG. 58) indicating a position on a time axis of a main stream set (for example, video or audio of clip-0 in FIG. 58), a first sub playback path (for example, sub-path 1 in FIG. 58) indicating a position on the time axis of a first sub-stream set, and a second sub playback path (for example, sub-path 2 referring to clip AV stream-1 shown in FIG. 58 and sub-path 3 referring to clip AV stream-2) indicating a position on the time axis of a second sub-stream set (for example, audio), which is different from the first sub-stream set, the playback management information being classified into a predetermined category (for example, a category, i.e., movie-type/time-based slideshow of categories classified into application_type (of main TS) in FIG. 53, that is, synchronized type, which is discussed below) among a plurality of categories that are defined beforehand in accordance with the type of the main stream set, the playback management information satisfying at least a first condition that each of the first sub playback path and the second sub playback path is a type (for example, one of SubPath_type (FIG. 45)=5, 6, or 7 in FIG. 53) of playback path allowed for the predetermined category (for example, step S11 in FIG. 26 executed for playing back the playlist of application_type=1 or 2), receiving a selection of streams to be played back based on the obtained playback management information as a first combination of the main stream set and the first sub stream set or a second combination of the main stream set and the second sub stream set (for example, steps S164 through S169 in FIG. 64), reading the main stream set by referring to the main playback path and the first sub-stream set by referring to the first sub playback path when the selection of the first combination is received, or for reading the main stream set by referring to the main playback path and the second sub-stream set by referring to the second sub playback path when the selection of the second combination is received (processing equivalent to step S108 in FIG. 51 before executing step S151 in FIG. 62, step S155 in FIG. 63, and steps S161 and S162 in FIG. 64 when playing back the playlist shown in FIG. 58), and playing back, together with the read main stream set, the first sub-stream set or the second sub-stream set which is read (for example, step 151 in FIG. 62, step S155 in FIG. 63, and steps S161 and S162 in FIG. 64 when playing back the playlist in FIG. 58). The main stream set, the first sub-stream set, and the second sub-stream set are included in files (clips). The number of the files that are readable at one time is a predetermined number. The playback management information satisfies, in addition to the first condition, a second condition (for example, the number of sub paths in FIG. 53 and the conditions shown in FIG. 54) that one or more of the first and second sub playback paths are determined so that the number of the files that are readable at one time does not exceed the predetermined number.

A data structure or data recorded on a recording medium according to an embodiment of the present invention includes playback management information (for example, the playlist shown in FIG. 58) for managing playback of at least two streams including a first stream and a second stream. The playback management information includes a main playback path (for example, the main path in FIG. 58) indicating a position on a time axis of the first stream, a sub playback path (for example, sub-path 1 in FIG. 58) indicating a position on the time axis of the second stream, and type information (for example, SubPath_type=7 in FIG. 45) indicating whether the second stream is played back synchronously with the first stream and whether the second stream is multiplexed into the same file as the first stream.

A manufacturing method for a recording medium according to an embodiment of the present invention includes the steps of generating data having a data structure including playback management information (for example, the playlist shown in FIG. 58) for managing playback of at least two streams, and recording the generated data on the recording medium. The playback management information includes a main playback path (for example, the main path in FIG. 58) indicating a position on a time axis of the first stream, a sub playback path (for example, sub-path 1 in FIG. 58) indicating a position on the time axis of the second stream, and type information (for example, SubPath_type=7) indicating whether the second stream is played back synchronously with the first stream and whether the second stream is multiplexed into the same file as the first stream.

The type information indicates that the second stream is played back synchronously with the first stream and that the second stream is multiplexed into the same file as the first stream (for example, SubPath_type=7).

The type information indicates that the second stream is played back synchronously with the first stream and that the second stream is multiplexed into a file different from a file of the first stream (for example, SubPath_type=5).

The type information indicates that the second stream is played back asynchronously with the first stream and that the second stream is multiplexed into a file different from a file of the first stream (for example, SubPath_type=6).

Data or a data structure recorded on a recording medium according to another embodiment of the present invention includes playback management information. The playback management information includes a main playback path indicating a position on a time axis of a main stream set, a first sub playback path indicating a position on the time axis of a first sub-stream set, and a second sub playback path indicating a position on the time axis of a second sub-stream set, which is different from the first sub-stream set, the playback management information being classified into a predetermined category among a plurality of categories that are defined beforehand in accordance with the type of the main stream set. The playback management information at least satisfies a condition that each of the first sub playback path and the second sub playback path is a type (for example, one of SubPath_type (FIG. 45)=5, 6, or 7 in FIG. 53) of playback path allowed for the predetermined category. The main stream set, the first sub-stream set, and the second sub-stream set are included in files (clips). The first sub playback path and the second sub playback path are determined so that the number of the files that are readable at one time does not exceed a number which is predetermined in a playback apparatus.

A manufacturing method for a recording medium according to another embodiment of the present invention includes the steps of generating data having a data structure including playback management information and recording the generated data on the recording medium. In the data structure, playback management information includes a main playback path indicating a position on a time axis of a main stream set, a first sub playback path indicating a position on the time axis of a first sub-stream set, and a second sub playback path indicating a position on the time axis of a second sub-stream set, which is different from the first sub-stream set, the playback management information being classified into a predetermined category among a plurality of categories that are defined beforehand in accordance with the type of the main stream set. The playback management information at least satisfies a condition that each of the first sub playback path and the second sub playback path is a type (for example, one of SubPath_type (FIG. 45)=5, 6, or 7 in FIG. 53) of playback path allowed for the predetermined category. The main stream set, the first sub-stream set, and the second sub-stream set are included in files (clips). The first sub playback path and the second sub playback path are determined so that the number of the files that are readable at one time does not exceed a number which is predetermined in the playback apparatus.

An embodiment of the present invention is described below with reference to the accompanying drawings.

FIG. 5 illustrates an example of an application format on a recording medium installed in a recording apparatus configured in accordance with an embodiment of the present invention, for example, a playback apparatus 20 described below with reference to FIG. 25 or a playback apparatus 401 described below with reference to FIG. 49. The recording medium is an optical disc, a magnetic disk, or a semiconductor memory, which is discussed below.

The application format has two layers, i.e., a playlist layer and a clip layer, for managing AV streams. In this case, a pair of one AV stream and one item of clip information associated with the AV stream are considered to be as one object, which is referred to as a "clip". An AV stream is also referred to as an "AV stream file". The AV stream file may include, not only sound data and video data, but also various stream files played back together with the sound data and the video data. Clip information is also referred to as a "clip information file".

Generally, files used in computers are handled as byte strings. On the other hand, content of AV stream files is expanded onto a time axis, and access points in clips are mainly specified by playlists by using time stamps. That is, it can be said that the playlists and clips form two layers for managing AV streams.

If access points in clips are indicated by playlists by using time stamps, a clip information file is used for finding, from the time stamps, information concerning an address at which decoding in an AV stream file is started.

A playlist is a set of playback zones of an AV stream. One playback zone in an AV stream is referred to as a "play item", which is indicated by a pair of an IN point (playback start point) and an OUT point (playback end point) on the time axis. Accordingly, a playlist has one or a plurality of play items, as shown in FIG. 5.

In FIG. 5, the first playlist from the left has two play items, which refer to the first half and the second half of the AV stream contained in the clip at the left side in FIG. 5. The second playlist from the left has one play item, which refers to the entirety of the AV stream contained in the clip at the right side. The third playlist from the left has two play items, which refer to a certain portion of the AV stream contained in the clip at the left side and a certain portion of the AV stream contained in the clip at the right side.

If a disc navigation program shown in FIG. 5 designates the left play item contained in the first playlist from the left as information concerning the current playback position, the first half of the AV stream contained in the left clip, which is referred to by the designated play item, is played back. In this manner, the playlists are used as playback management information for managing the playback operation of AV stream files.

The disc navigation program has a function of controlling the playback order specified in playlists and interactive playback operations by using playlists. The disc navigation program also has a function of displaying a menu screen for allowing a user to give instructions to perform various types of playback operations. The disc navigation program is described in a programming language, for example, Java™, and is recorded on a recording medium.

In this embodiment, a playback path including at least one play item (sequential play items if there are more than one) in a playlist is referred to as a "main path", and a playback path including at least one sub-play item (may be sequential or non-sequential play items if there are more than one) disposed in parallel with the main path in a playlist is referred to as a "sub-path". That is, the application format on a recording medium installed in the playback apparatus 20 shown in FIG. 25 or the playback apparatus 401 shown in FIG. 49 has at least one sub-path, which is played back in association with the main path, in a playlist.

Figure 6:
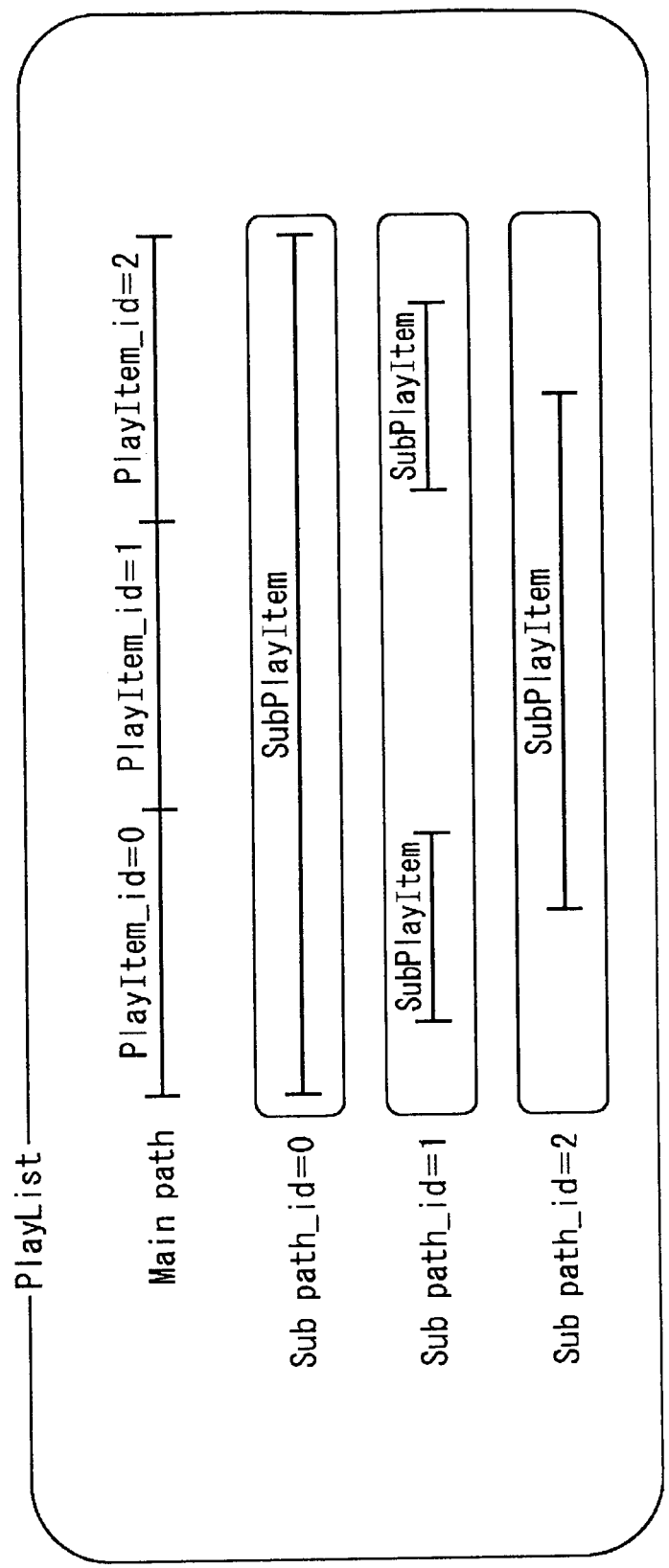
FIG. 6 illustrates the structure of a playlist including a main path and sub-paths.

FIG. 6 illustrates the structure of the main path and sub-paths. A playlist is allowed to have the single main path and at least one sub-path. The main path includes at least one play item, and one sub-path includes at least one sub-play item.

The playlist shown in FIG. 6 has one main path including three play items and three sub-paths. The play items forming the main path are provided with IDs (identifications) from the head. More specifically, the main path includes play items, such as PlayItem_id=0, PlayItem_id=1, and PlayItem_id=2. The sub-paths are also provided with IDs from the head. Subpath_id=0 has one sub-play item, Subpath_id=1 has two sub-play items, and Subpath_id=2 has one sub-play item.

The stream referred to by the sub-play item contained in Subpath_id=0 is, for example, dubbed Japanese movie sound, and can be played back instead of the audio stream contained in the AV stream file referred to by the main path. The stream referred to by the sub-play items contained in Subpath_id=1 is, for example, Director's Cut, and can be inserted into a predetermined portion of the AV stream file referred to by the main path as the director's commentaries.

A clip AV stream file referred to by one play item includes at least video stream data (main image data). The clip AV stream file may also include at least one audio stream, which is played back simultaneously with (in synchronization with) the video stream (main image data) which is also contained in the clip AV stream file. The clip AV stream file may also include at least one bitmap subtitle stream file which is played back in synchronization with the video stream which is also contained in the clip AV stream file. The clip AV stream file may also include at least one interactive graphics stream file which is played back in synchronization with the video stream which is also contained in the clip AV stream file. The video stream contained in the clip AV stream file and the audio stream, bitmap subtitle stream, or interactive graphics stream, which is played back in synchronization with the video stream, are multiplexed. In other words, a clip AV stream file referred to by one play item includes video stream data and at least 0 audio stream data, at least 0 bitmap subtitle stream data, or at least 0 interactive graphics stream data, which is played back in synchronization with the video stream data, such that they are multiplexed into the clip AV stream file.

That is, a clip AV stream file referred to by one play item includes a plurality of types of streams, such as a video stream, an audio stream, a bitmap subtitle stream, or an interactive graphics stream.

A sub-play item refers to, for example, audio stream data or subtitle data contained in a stream file different from the clip AV stream file referred to by the play item.

When playing back a playlist including only a main path, the user can select sound and subtitles only from audio streams and sub-picture streams multiplexed into a clip referred to by that main path. In contrast, when playing back a playlist including a main path and a sub-path, the user can refer to audio streams and sub-picture streams multiplexed into a clip referred to by the sub-play item in addition to audio streams and sub-picture streams multiplexed into a clip AV stream file referred to by the main path.

As discussed above, at least one sub-path is included in one playlist, and a sub-play item of each sub-path refers to the corresponding streams. Accordingly, AV streams having high extensibility and high flexibility can be provided. That is, sub-play items can be added afterwards to the clip AV stream referred to by the main path.

Figure 7:
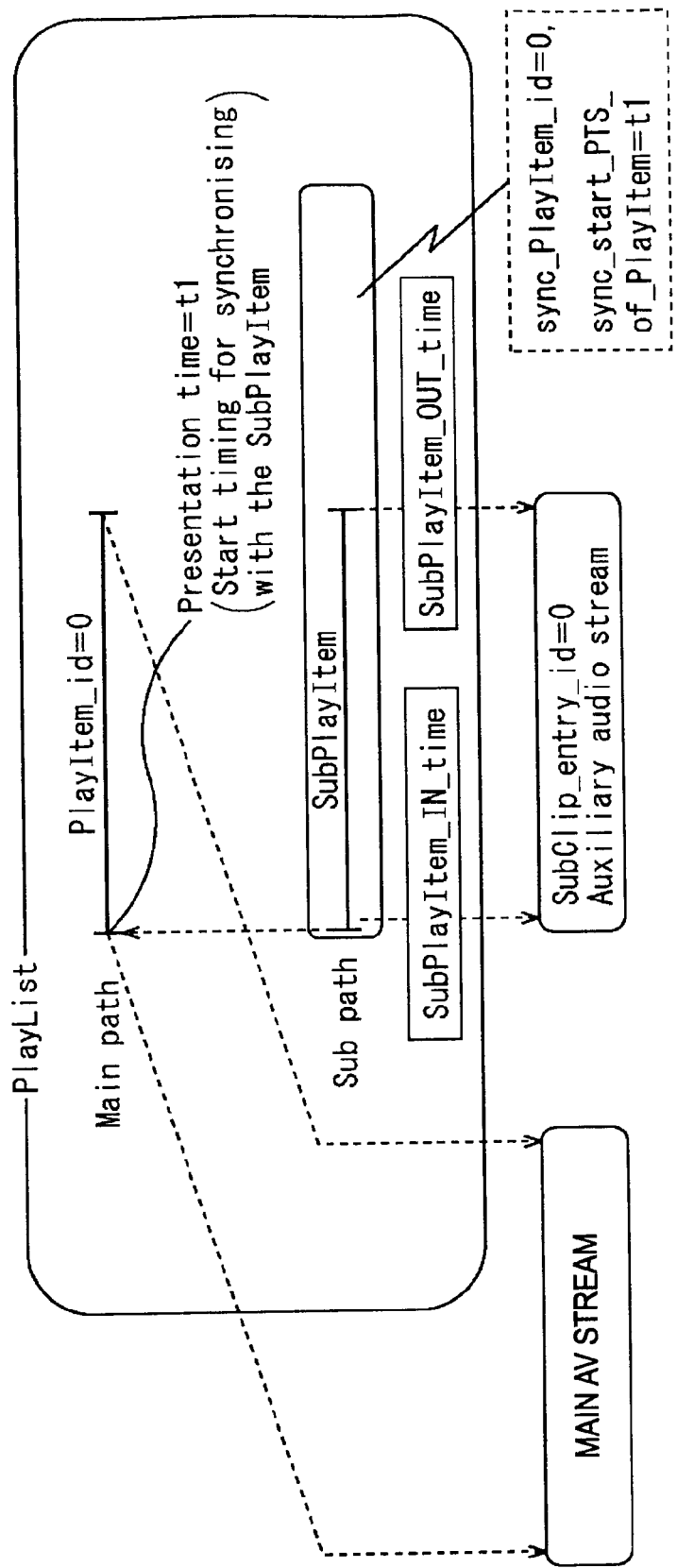
FIG. 7 illustrates an example of a main path and a sub-path.

FIG. 7 illustrates an example of a main path and an example of a sub-path. In FIG. 7, an audio playback path played back simultaneously with (in synchronization with) the main path is indicated by using the sub-path.

The playlist shown in FIG. 7 includes one play item, i.e., PlayItem_id=0, as the main path, and one sub-play item as the sub-path. PlayItem( ) which is PlayItem_id=0, refers to the main AV stream shown in FIG. 7. SubPlayItem( ) includes the following data. SubPlayItem( ) includes Clip_Information_file_name for specifying the clip referred to by the sub-path in the playlist. In the example in FIG. 7, the sub-play item refers to an auxiliary audio stream of SubClip_entry_id=0. SubPlayItem( ) also includes SubPlayItem_IN_time and SubPlayItem_OUT_time for specifying the playback zone of the sub-path contained in the designated clip (in this case, the auxiliary audio stream). SubPlayItem( ) also includes sync_PlayItem_id and sync_start_PTS_of_PlayItem for specifying the time at which the playback operation of the sub-path is started on the time axis of the main path. In FIG. 7, sync_PlayItem_id=0 and sync_start_PTS_of_PlayItem=t1. With this information, the time t1 at which the playback operation of the sub-path is started on the time axis of PlayItem=0 of the main path can be specified. That is, in the example in FIG. 7, the playback start time of the main path and the playback start time of the sub-path is the same, i.e., t1.

The clip AV audio stream referred to by the sub-path should not include system time base (STC) non-sequential points. The clip audio sample clock used for the sub-path is locked to the audio sample clock used for the main path.

In other words, SubPlayItem( ) includes information for specifying the clip referred to by the sub-path, information for specifying the playback zone of the sub-path, and information for specifying the time at which the playback operation of the sub-path is started on the time axis of the main path. Since the clip AV stream used for the sub-path does not include STC, the user can refer to a clip AV audio stream different from the clip AV stream (main AV stream) referred to by the main path on the basis of the information included in SubPlayItem( ) and plays back the clip AV audio stream.

As stated above, the play item and the sub-play item individually manage clip AV stream files. The clip AV stream file (main AV stream file) managed by the play item is different from the clip AV stream file managed by the sub-play item.

In a manner similar to the example shown in FIG. 7, a subtitle stream playback path played back simultaneously with the main path may be indicated by using a sub-path.

Figure 8:
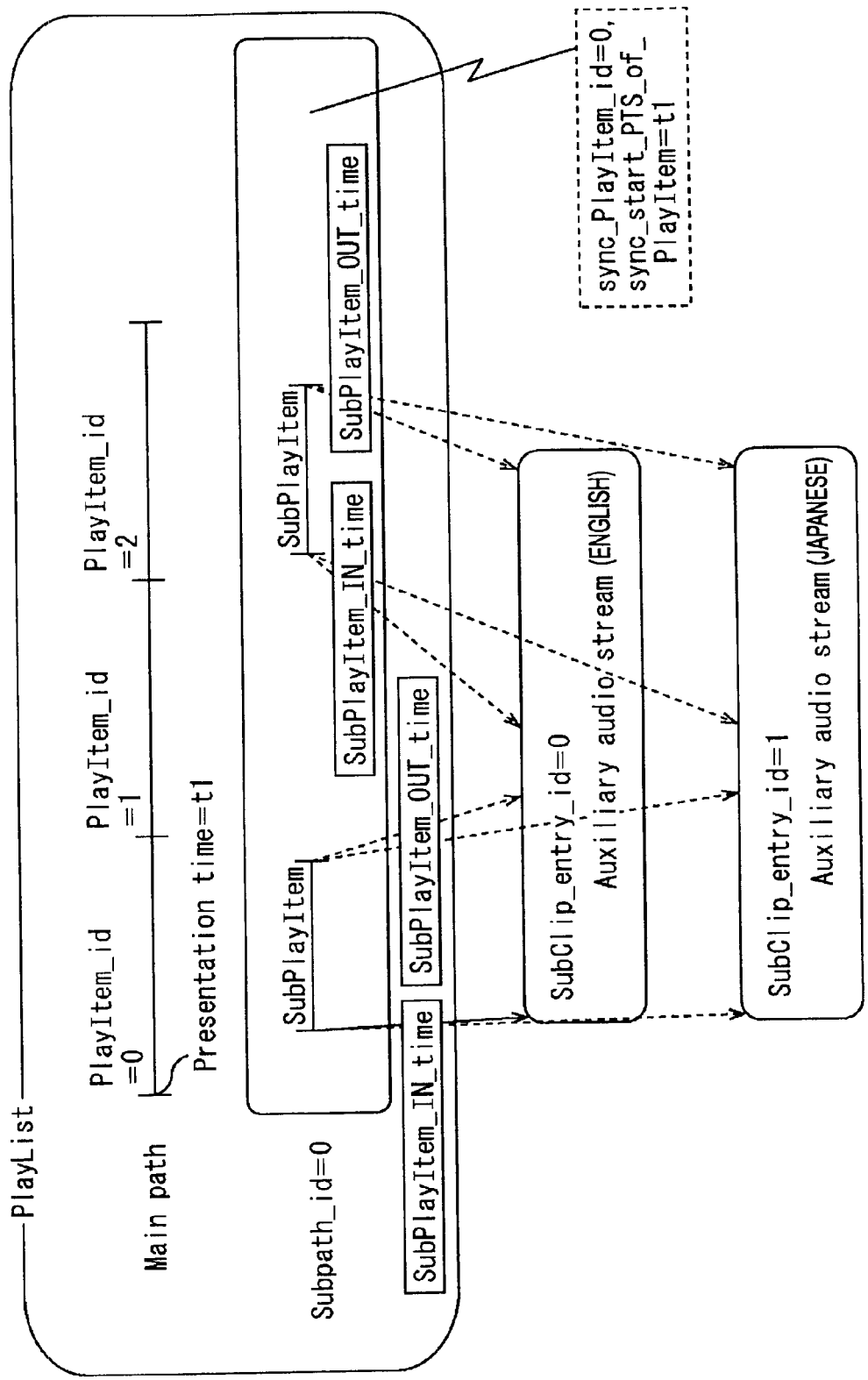
FIG. 8 illustrates another example of a main path and a sub-path.

FIG. 8 illustrates another example of a main path and another example of sub-paths. In FIG. 8, an audio playback path played back simultaneously with the main path is indicated by using a sub-path. The main AV stream file referred to by the play item of the main path is similar to that in FIG. 7, and an explanation thereof is thus omitted.

It is now assumed that the clip AV stream referred to by the main path is movie content (AV content), and the auxiliary audio stream referred to by the audio playback path of the sub-path is director's commentaries on that movie, and then, the auxiliary audio stream referred to by the sub-path is mixed into (overlaps with) the clip AV audio stream referred to by the main path. In this case, the configuration shown in FIG. 8 can be used. More specifically, the configuration shown in FIG. 8 can be used when the user inputs an instruction to listen to the director's commentaries on the movie into a player while watching the movie, for example, when the auxiliary audio stream referred to by the sub-path is mixed into the sound of the clip AV stream referred to by the main path.

In FIG. 8, three play items, i.e., PlayItem_id=0, PlayItem_id=1, and PlayItem_id=2, are disposed in the main path, and two sub-play items are disposed in the sub-path (Subpath_id=0). The sub-play item (discussed below with reference to FIG. 12) called by the sub-path (Subpath_id=0) (discussed below with reference to FIG. 10) includes SubPlayItem_IN_time and SubPlayItem_OUT_time for specifying the playback zones of the auxiliary audio streams (English auxiliary audio stream clip having SubClip_entry_id=0 and Japanese auxiliary audio stream clip having SubClip_entry_id=1) of the sub-path.

Comparing the example in FIG. 8 with that in FIG. 7, it can be seen that, in the example in FIG. 8, a sub-play item can refer to the auxiliary audio stream (English or Japanese audio stream) having SubClip_entry_id=0 or SubClip_entry_id=1. That is, the use of the sub-play item makes it possible to refer to a plurality of audio streams, and when playing back the sub-play item, an audio stream file can be selected from a plurality of audio stream files, i.e., in the example in FIG. 8, the English audio stream file or the Japanese audio stream file is selected. More specifically, one of SubClip_entry_id=0 and SubClip_entry_id=1 is selected based on, for example, an instruction from the user, and the auxiliary audio stream referred to by the selected ID is played back. If an instruction to play back the auxiliary audio stream together with the audio stream referred to by the main path is provided (for example, if an instruction to play back two audio streams together), an audio stream referred to by the main path and an audio stream referred to by the sub-path are mixed and played back.

The data structure (syntax) that implements the structure of the main path and sub-paths discussed with reference to FIGS. 6 through 8 is as follows.

FIG. 9 illustrates the syntax of PlayList( ).

The length field is a 32-bit unsigned integer indicating the number of bytes from immediately after the length field to the end of PlayList( ) i.e., a field indicating the number of bytes from reserved_for_future_use to the end of PlayList( ). After the length field, the 16-bit reserved_for-future-use field follows. The number_of_PlayItems is a 16-bit field indicating the number of play items contained in the playlist. In the case of the example in FIG. 6, the number of play items is three, and the numeric value is assigned to the play items as PlayItem_id from 0 in the order in which PlayItem( ) appears in the playlist. For example, PlayItem_id=0, 1, 2 are assigned, as shown in FIGS. 6 and 8.

The number_of_SubPath is a 16-bit field indicating the number of sub-paths (number of entries) contained in the playlist. In the case of the example in FIG. 6, the number of sub-paths is three, and the numeric value is assigned to the sub-play items as SubPath_id from 0 in the order in which SubPath( ) appears in the playlist. For example, Subpath_id=0, 1, 2 are assigned, as shown in FIG. 6. Then, in the subsequent FOR statement, the play items are referred to for the same number of times as the number of play items, and the sub-paths are referred to for the same number of times as the number of sub-paths.

FIG. 10 illustrates the syntax of SubPath( ).

The length field is a 32-bit unsigned integer indicating the number of bytes from immediately after the length field to the end of PlayList( ), i.e., a field indicating the number of bytes from reserved_for_future_use to the end of PlayList( ). After the length field, the 16-bit reserved_for_future_use field follows. The SubPath_type is an 8-bit field indicating the type of application of the sub-path, i.e., the type of sub-path, such as audio, bitmap subtitle, or text subtitle. An example of the SubPath_type is discussed below with reference to FIG. 11. After the SubPath_type, the 15-bit reserved_for_future_use field follows. The is_repeat_SubPath field is a one-bit field indicating the playback method for the sub-path, and more specifically, indicating whether the sub-path is played back repeatedly or only once while playing back the main path. This field is used when, for example, the playback timing of the clip specified by the sub-path is different from that of the main AV stream (when, for example, the main path is a still-image slideshow and the audio sub-path is background music (BGM) of the main path). After the is_repeat_SubPath field, the 8-bit reserved_for_future_use follows. The number_of_SubPlayItems is an 8-bit field indicating the number of sub-play items (number of entries) contained in one sub-path. For example, the number of sub-play items of SubPath_id=0 in FIG. 6 is one, and the number of sub-play items of SubPath_id=1 is 2. In the subsequent FOR statement, the sub-play items are referred to for the same number of times as the number of sub-play items.

The SubPath_type (sub-path type) is disclosed in, for example, FIG. 42 of Japanese Unexamined Patent Application Publication No. 2002-158965 or 2002-158972. In those publications, however, only one sub-path type is defined, and by the use of such SubPath_type, it is difficult to implement various processing operations and techniques described above or described below. In this embodiment, therefore, the SubPath_type shown in FIG. 11 or 45 is used.

Before explaining the SubPath_type shown in FIG. 45, the SubPath_type shown in FIG. 11 is defined.

FIG. 11 illustrates an example of the SubPath_type. The types of sub-paths can be defined, for example, as shown in FIG. 11.

In FIG. 11, SubPath_type=0 and SubPath_type=1 are reserved. The SubPath_type=2 is the audio presentation path of the browsable slideshow. In SubPath_type=2, the audio presentation path referred to by the sub-path is not synchronized with the main path referred to by the play items in the playlist.

The SubPath_type=3 is the interactive graphics presentation menu. In SubPath_type=3, the interactive graphics presentation menu referred to by the sub-path is not synchronized with the main path referred to by the play items in the playlist.

The SubPath_type=4 is the text subtitle presentation path. In SubPath_type=4, the text subtitle presentation path referred to by the sub-path is synchronized with the main path referred to by the play items in the playlist.

The SubPath_type=5 is the second audio presentation path (which is the path for referring to the second audio stream). In SubPath_type=5, the second audio presentation path referred to by the sub-path is synchronized with the main path referred to by the play items in the playlist. The second audio stream referred to by that sub-path is, for example, director's commentaries (sound) on a movie. For the sub-path represented by Subpath_id=0 in FIG. 8, the SubPath_type is SubPath_type=5 in FIG. 10.

The SubPath_type=6 is the second video presentation path (which is the path for referring to the second video stream). In SubPath_type=6, the second video presentation path referred to by the sub-path is synchronized with the main path referred to by the play items in the playlist. The second video stream referred to by that sub-path is, for example, director's commentaries (moving pictures) on a movie.

The SubPath_type=7 through SubPath_type=255 are reserved.

FIG. 12 illustrates the syntax of SubPlayItem(i).

The length field is a 16-bit unsigned integer indicating the number of bytes from immediately after the length field to the end of SubPlayItem( ).

In FIG. 12, the syntax is divided into two portions, and more specifically, a portion where the sub-play item refers to one clip and a portion where the sub-play item refers to a plurality of clips are shown.

The portion where the sub-play item refers to one clip is discussed first.

The SubPlayItem( ) includes Clip_Information_file_name [0] for specifying the clip, Clip_codec_identifier[0] for specifying the codec method for the clip, reserved_for_future_use, is_multi_Clip_entries, which is a flag indicating whether multi-clips are registered, and ref_to_STC_id[0], which is information concerning the STC non-sequential points (non-sequential points of the system time base). If the flag of is_multi_Clip_entries is ON, the syntax of the portion where SubPlayItem( ) refers to a plurality of clips is checked. The SubPlayItem( ) also includes SubPlayItem_IN_time and SubPlayItem_OUT_time for specifying the playback zone of the sub-path contained in the clip, and sync_PlayItem_id and sync_start_PTS_of_PlayItem for specifying the playback start time at which the playback operation of the sub-path is started on the time axis of the main path. The sync_PlayItem_id and sync_start_PTS_of_PlayItem are used when the playback timing of the main AV stream is the same as that of the stream contained in the file referred to by the sub-path, as shown in FIGS. 7 and 8, but are not used when the playback timing of the main AV stream is different from the file referred to by the sub-path (for example, still-image slideshow (main path) is not synchronized with BGM (sub-path) for the slideshow). The SubPlayItem_IN_time, SubPlayItem_OUT_time, sync_PlayItem_id, and sync_start_PTS_of_PlayItem are used in common for the clip referred to by SubPlay Item( ).

Next, the portion where the sub-play item refers to a plurality of clips (if (is_multi_Clip_entries==1b), as in the case shown in FIG. 8, is discussed.

The num_of_Clip_entries indicates the number of clips, and designates clips other than those having Clip_Information_file_name[0][SubClip_entry_id]. That is, num_of_Clip_entries designates clips, such as those having Clip_Information_file_name [1], Clip_Information-file-name [2], and so on, other than those having Clip_Information-file-name[0]. The SubPlayItem( ) also includes Clip_codec_identifier [SubClip_entry_id] for specifying the codec method for the clip, ref_to_STC_id[SubClip_entry_id], which is information concerning the STC non-sequential points, and reserved_for_future_use.

The SubPlayItem_IN_time, SubPlayItem_OUT_time, sync_PlayItem_id, and sync_start_PTS_of_PlayItem are used in common for the clips referred to by SubPlayItem( ). In the example in FIG. 8, SubPlayItem_IN_time, SubPlayItem_OUT_time, sync_PlayItem_id, and sync_start_PTS_of_PlayItem are used in common for SubClip_entry_id=0 and SubClip_entry_id=1. The text-based subtitle for the selected SubClip_entry_id is played back based on the SubPlayItem_IN_time, SubPlayItem_OUT_time, sync_PlayItem_id, and sync_start_PTS_of_PlayItem.

The numeric value is sequentially assigned to SubClip_entry_id from 1 in the order in which Clip_Information_file_name[SubClip_entry_id] in the SubPlayItem( ) appears. The SubClip_entry_id of Clip_Information_file_name[0] is 0.

FIG. 13 illustrates the syntax of PlayItem( ).

The length field is a 16-bit unsigned integer indicating the number of bytes from immediately after the length field to the end of PlayItem( ). Clip_Information_file_name[0] is a field for specifying the clip referred to by PlayItem( ). In the example in FIG. 7, the main AV stream is referred to by Clip_Information_file_name[0]. The PlayItem( ) also includes Clip_codec_identifier[0] specifying the codec method for the clip, reserved_for_future_use, is_multi_angle, connection_condition, and ref_to_STC_id[0], which is information concerning the STC non-sequential points. The PlayItem( ) also includes IN_time and OUT_time for specifying the playback zone of the play item in the clip. In the example in FIG. 7, IN_time and OUT_time specify the playback zone of the main clip AV stream file. The Play Item( ) also includes UO_mask_table( ), PlayItem_random_access_mode, and still_mode. A description of a case where is_multi_angle indicates a plurality of angles is not given here, since such a case is not directly related to the present invention.

The STN_table( ) provides a mechanism for allowing a user, if the target play item and at least one sub-path to be played back in association with the target play item are provided, to select from the streams contained in the clip referred to by the play item and the clips referred to by at least sub-path when the user switches sound or subtitles. The STN_table( ) provides a mechanism for allowing a user to implement mixing playback by selecting two audio streams.

FIG. 14 illustrates an example of the syntax of STN_table( ) (first STN_table( )). The first STN_table( ) is set as an attribute of PlayItem( ). The STN_table( ) is set as the attributes of a play item.

The length field is a 16-bit unsigned integer indicating the number of bytes from immediately after the length field to the end of STN_table( ). After the length field, a 16-bit reserved_for_future_use field follows. The number_of_video_stream_entries indicates the number of streams provided with video_stream_id entered (registered) in STN_table( ). The video_stream_id is information for identifying the video streams. The video_stream_number is the video stream number that can be seen by the user when switching video.

The number_of_audio_stream_entries indicates the number of first audio streams provided with audio_stream_id entered (registered) in STN_table( ). The audio_stream_id is information for identifying the audio streams. The audio_stream_number is the audio stream number that can be seen by the user when switching sound. The number_of_audio_stream2_entries indicate the number of second audio streams provided with audio_stream_id2 entered in the STN_( ). The audio_stream_id2 is information for identifying the second audio streams. The audio_stream_number is the audio stream number that can be seen from the user when switching sound. More specifically, the audio streams represented by number_of_audio_stream_entries entered in the STN-table( ) are audio streams decoded by the first audio decoder 75-1 of the playback apparatus 20 shown in FIG. 25 or the playback apparatus 401 shown in FIG. 49, which are discussed below. The audio streams represented by number_of_audio_stream2_entries entered in the third STN_table( ) are audio streams decoded by the second audio decoder 75-2 of the playback apparatus 20 shown in FIG. 25 or the playback apparatus 401 shown in FIG. 49. In this manner, in the STN_table( ) shown in FIG. 14, two types of audio streams decoded by the two decoders can be entered.

The audio streams represented by number_of_audio_stream_entries decoded by the first audio decoder 75-1 of the playback apparatus 20 or 401 are hereinafter referred to as "audio streams #1 or "primary audio streams". The audio streams represented by number_of_audio_stream2_entries decoded by the second audio decoder 75-2 of the playback apparatus 20 or 401 are hereinafter referred to as "audio streams #2" or "secondary audio streams". The audio streams #1 are played back preferentially over the audio streams #2.

The number_of_PG_txtST_stream_entries indicates the number of streams provided with PG_txtST_stream_id entered in the STN_table( ). In the STN_table( ) shown in FIG. 14, streams (presentation graphics streams (PG)) in which bitmap subtitles, such as DVD sub-pictures, are run-length coded, and text subtitle files (txtST) are entered. The PG_txtST_stream_id is information for identifying the subtitle streams, and PG_txtST_stream_number is the subtitle stream number (text subtitle stream number) that can be seen by the user when switching subtitles.

The number of IG stream entries indicates the number of streams provided with IG_stream_id entered in STN_table( ). In STN_( ) shown in FIG. 14, interactive graphics streams are entered. IG_stream_id is information for identifying the interactive graphics streams. The IG_stream_number is the graphics stream number that can be seen when switching graphics.

The syntax of stream_entry( ) is discussed below with reference to FIG. 15.

The length field is an 8-bit unsigned integer indicating the number of bytes from immediately after the length field to the end of stream_entry( ).

The type is an 8-bit field indicating the type of information required for uniquely specifying the stream provided with the above-described stream number.

If type=1, a 16-bit packet ID (PID) is designated for specifying one elementary stream from a plurality of elementary streams multiplexed into the main clip referred to by the play item. The ref_to_stream_PID_of_mainClip indicates this PID. That is, if type=1, the stream can be determined only by specifying the PID in the main clip AV stream file.

If type=2, to specify one elementary stream from a plurality of elementary streams multiplexed into one clip referred to by the sub-path including a plurality of clips, SubPath_id of the sub-path, Clip_id, and packet ID (PID) are designated. The ref_to_SubPath_id indicates the SubPath_id, the ref_to_SubClip_entry_id indicates the Clip_id, and the ref_to_stream_PID_of_SubClip indicates the PID. This field is used when a plurality of clips are referred to by a sub-play item and when a plurality of elementary streams are referred to by each clip.

In this manner, when a play item and at least one sub-path played back in association with the play item are provided, type (type 1 and type 2) can be used for specifying one elementary stream from the clip referred to by the play item and clips referred to by at least one sub-path. Type=1 indicates the main clip referred to by the main path and type=2 indicates a sub-clip referred to by a sub-path.

Referring back to a description of STN_table( ) in FIG. 14, in the FOR loop of the video stream ID (video_stream_id), video_stream_id is assigned from 0 to a video elementary stream specified for each stream_entry( ). Instead of the video stream ID (video_stream_id), the video stream number (video_stream_number) is used, in which case, the number is assigned from 1. That is, the number obtained by adding one to video_stream_id is the video_stream_number. The number is assigned from 1 since video_stream_number is the video stream number that can be seen by the user when switching video.

Similarly, in the FOR loop of the audio stream ID (audio_stream_id), audio_stream_id is assigned from 0 to an audio elementary stream specified for each stream_entry( ). As in the video stream, instead of the audio stream ID (audio_stream_id), the audio stream number (audio_stream_number) is used, in which case, the number is assigned from 1. That is, the number obtained by adding one to audio_stream id is the audio_stream_number. The number is assigned from 1 since audio_stream_number is the audio stream number that can be seen by the user when switching sound.

Similarly, in the FOR loop of the audio stream ID2 (audio_stream_id2), audio_stream_id2 is assigned from 0 to an audio elementary stream specified for each stream_entry( ). As in the video stream, instead of the audio stream ID2 (audio_stream_id2), the audio stream number 2 (audio_stream_number2) is used, in which case, the number is assigned from 1. That is, the number obtained by adding one to audio_stream_id2 is the audio_stream_number2. The number is assigned from 1 since audio_stream_number2 is the audio stream number 2 that can be seen by the user when switching sound.

That is, in the first STN_table( ) in FIG. 14, the audio streams #1 represented by number_of_audio_stream_entries and the audio streams #2 represented by number_of_audio_stream2_entries are defined. In other words, by using the first STN_table( ), the audio streams #1 and the audio streams #2 can be entered so that the user can select two audio streams to be played back simultaneously.

Similarly, in the FOR loop of the subtitle stream ID (PG_txtST_stream_id), PG_txtST_stream_id is assigned from 0 to a bitmap subtitle or text subtitle elementary stream specified for each stream_entry( ). As in the video stream, instead of the subtitle stream ID (PG_txtST_stream_id), the subtitle stream number (PG_txtST_stream_number) is used, in which case, the number is assigned from 1. That is, the number obtained by adding one to PG_txtST_stream_id is the PG_txtST_stream_number. The number is assigned from 1 since PG_txtST_stream_number is the bitmap subtitle or text subtitle stream number that can be seen by the user when switching subtitles.

Similarly, in the FOR loop of the graphics stream ID (IG_stream_id), IG_stream_id is assigned from 0 to an interactive graphics elementary stream specified for each stream_entry( ). As in the video stream, instead of the graphics stream ID (IG_stream_id), the graphics stream number (IG_stream_number) is used, in which case, the number is assigned from 1. That is, the number obtained by adding one to IG_stream_id is the IG_stream_number. The number is assigned from 1 since IG_stream_number is the graphics stream number that can be seen by the user when switching graphics.

The syntax of stream_attribute( ) is discussed below with reference to FIG. 16.

The length field is a 16-bit unsigned integer indicating the number of bytes from the length field to the end of stream_attribute( ).

The stream_coding_type indicates the coding type of elementary stream, as shown in FIG. 17. The coding types of elementary streams include video codec formats, such as MPEG2 video stream, audio codec formats, such as HDMV LPCM audio, Dolby AC-3 audio, dts audio, Presentation graphics stream, Interactive graphics stream, and Text subtitle stream.

The video_format indicates the video format of a video elementary stream, as shown in FIG. 18. The video formats of the video elementary streams include 480i, 576i, 480p, 1080i, 720p, and 1080p.

The frame_rate indicates the frame rate of a video elementary stream, as shown in FIG. 19. The frame rates of the video elementary streams include 24000/1001, 24, 25, 30000/1001, 50, and 60000/1001.

The aspect_ratio indicates the aspect ratio of a video elementary stream, as shown in FIG. 20. The aspect ratios of the video elementary streams include 4:3 display aspect ratio and 16:9 display aspect ratio.

The audio_presentation_type indicates the presentation type of an audio elementary stream, as shown in FIG. 21. The presentation types of audio elementary streams include single mono channel, dual mono channel, stereo (2-channel), and multi-channel.

The sampling_frequency indicates the sampling frequency of an audio elementary stream, as shown in FIG. 22. The sampling frequencies of the audio elementary streams include 48 kHz and 96 kHz.

The audio_language_code indicates the language code (for example, Japanese, Korean, or Chinese) of an audio elementary stream.

The PG_language_code indicates the language code (for example, Japanese, Korean, or Chinese) of a bitmap subtitle elementary stream.

The IG_language_indicates the language code (for example, Japanese, Korean, or Chinese) of an interactive graphics elementary stream.

The textST_language_code indicates the language code (for example, Japanese, Korean, or Chinese) of a text subtitle elementary stream.

The character_code indicates the character code of a text subtitle elementary stream, as shown in FIG. 23. The character codes of text subtitle elementary streams include Unicode V1.1 (ISO 10646-1), Shift JIS (Japanese), KSC 5601-1987 including KSC 5653 for Roman character (Korean), GB18030-2000 (Chinese), GB2312 (Chinese), and BIG5 (Chinese).

A specific example of the syntax of stream_attribute( ) shown in FIG. 16 is described below with reference to FIGS. 16, and 17 through 23.

If the coding type (stream_coding_type in FIG. 16) of the elementary stream is the MPEG2 video stream (FIG. 17), stream_attribute( ) includes the video format (FIG. 18), the frame rate (FIG. 19), and the aspect ratio (FIG. 20) of the elementary stream.

If the coding type (stream_coding_type in FIG. 16) of the elementary stream is the HDMV LPCM audio, Dolby AC-3 audio, or dts audio (FIG. 17), stream_attribute( ) includes the audio presentation type (FIG. 21), the sampling frequency (FIG. 22), and the language code of the audio elementary stream.

If the coding type (stream_coding_type in FIG. 16) of the elementary stream is the Presentation graphics stream (FIG. 17), stream_attribute( ) includes the language code of the bitmap subtitle elementary stream.

If the coding type (stream_coding_type in FIG. 16) of the elementary stream is the Interactive graphics stream (FIG. 17), stream_attribute( ) includes the language code of the interactive graphics elementary stream.

If the coding type (stream_coding_type in FIG. 16) of the elementary stream is the Text subtitle stream (FIG. 17), stream_attribute( ) includes the character code (FIG. 23) and the language code of the text subtitle elementary stream.

The attribute information is not restricted to the above-described types.

In this manner, if a play item and at least one sub-path played back in association with the play item are provided, by referring to the clip referred to by the play item and clips referred to by at least one sub-path, attribute information concerning an elementary stream specified by stream_entry( ) can be defined by stream_attribute( ).

By checking the attribute information (stream_attribute( )), the playback apparatus can determine whether it has a function of playing back the corresponding elementary stream. Also, by checking the attribute information, the playback apparatus can select the elementary streams in accordance with the initial information concerning the language set in the playback apparatus.

It is now assumed, for example, that the playback apparatus has a function of playing back bitmap subtitle elementary streams without a function of playing back text subtitle elementary streams. In this case, in response to an instruction to switch the languages from the user, the playback apparatus sequentially selects only bitmap subtitle elementary streams from the FOR loop of the subtitle stream ID (PG_txtST_stream_id) and plays back the selected elementary streams.

If the initial information concerning the language set in the playback apparatus is Japanese, in response to an instruction to switch from main audio to secondary audio or to mix main audio with secondary audio from the user, the playback apparatus sequentially selects only audio elementary stream whose language code is Japanese from the FOR loop of the audio stream ID (audio_stream_id) prepared as secondary audio and plays back the selected elementary streams.

If AV video streams and AV audio streams (movie) referred to by a main path are played back, in response to an instruction to switch sound and to mix an audio stream (director's or performers' commentaries) referred to by a sub-path with an AV stream referred to by the main path from the user, the playback apparatus mixes (superimposes) the second audio stream referred to by the sub-path with (on) the first audio stream referred to by the main path, and plays back the mixed audio streams together with the video streams.

The STN_table( ) shown in FIGS. 14 and 15 shows that both the audio stream #1 and the audio stream #2 may be audio streams contained in clips referred to by a main path. Alternatively, one of the audio stream #1 and the audio stream #2 may be an audio stream contained in a clip referred to by a main path, and the other audio stream may be an audio stream contained in a clip referred to by a sub-path. In this manner, two audio streams superimposed on main AV streams referred to by the main path may be selected and mixed.

As described above, by the provision of STN_table( ) in PlayItem( ), if a play item and at least one sub-path played back in association with the play item are provided, the user can select a stream to be played back from the clip referred to by the play item and clips referred to by at least one sub-path when switching sound or subtitles. Thus, interactive operations can be performed for streams or data files different from an AV stream to be played back.

Since one playlist includes a plurality of sub-paths and each sub-path refers to a sub-play item, AV streams having high extensibility and high flexibility are implemented. That is, sub-play items can be added afterwards to the content played back by using the playlist. For example, if a playlist including a clip AV stream file referred to by the main path is replaced by a playlist including the clip AV stream file and a new sub-path, the user can select based on the new playlist, not only from the clip AV stream file referred to by the main path, but also from the clip AV stream file referred to by the sub-path. Thus, the AV streams have high extensibility.

Figure 25:
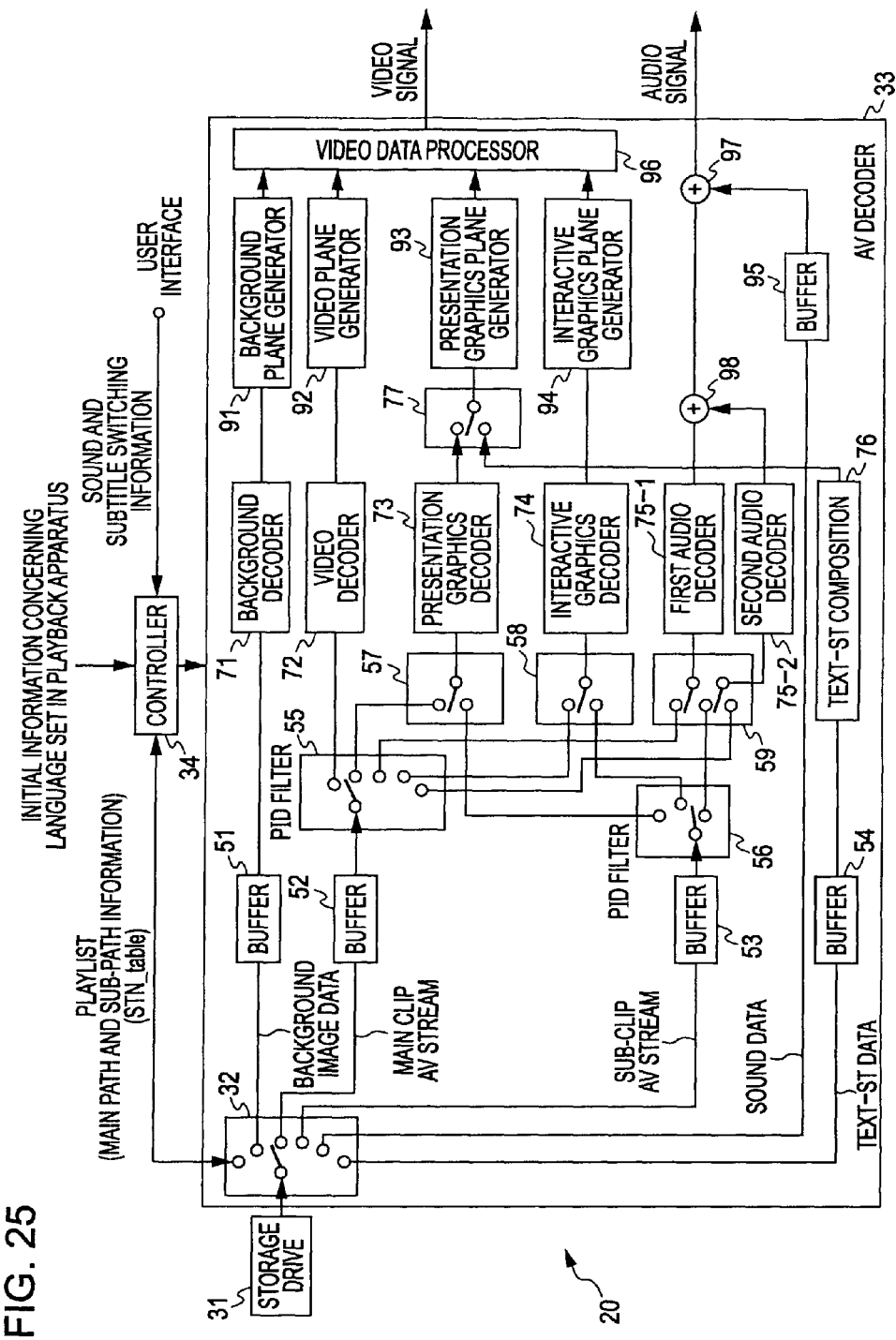
FIG. 25 is a block diagram illustrating an example of the configuration of a playback apparatus according to an embodiment of the present invention.
Figure 49:
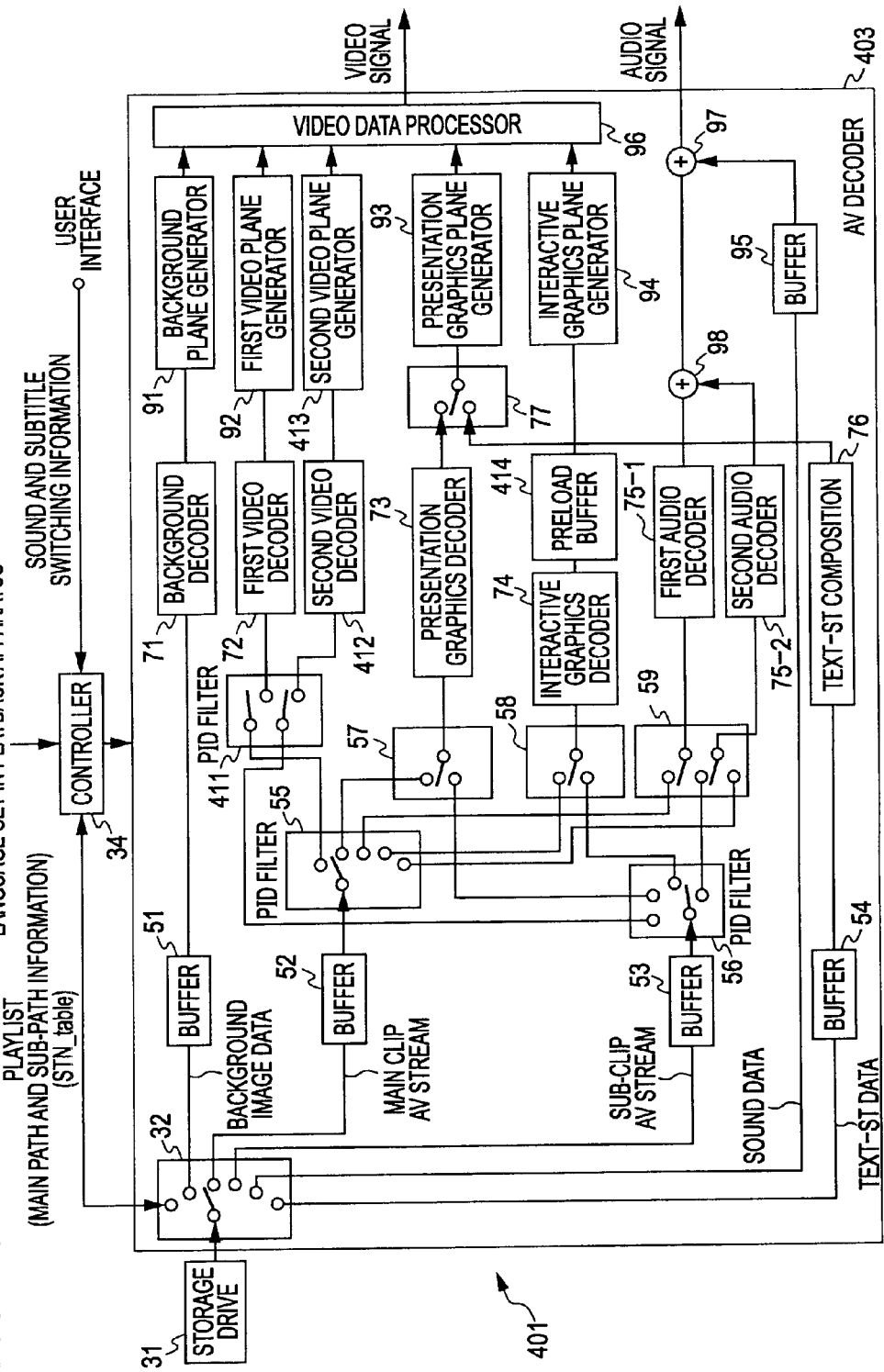
FIG. 49 is a block diagram illustrating another example of the configuration of a playback apparatus according to an embodiment of the present invention.

By the provision of the STN_table( ) in PlayItem( ), the audio stream #1 decoded by a first audio decoder 75-1 of the playback apparatus 20 in FIG. 25 or the playback apparatus 401 in FIG. 49 can be mixed with the audio stream #2 decoded by a second audio decoder 75-2 of the playback apparatus 20 or 401. For example, if PlayItem( ) and at least one sub-path played back in association with PlayItem( ) are provided, an audio stream contained in the clip referred to by the play item is set to be the audio stream #1, and an audio stream contained in the clip referred to by the sub-path is set to be the audio stream #2, and then, the audio stream #1 and the audio stream #2 are mixed and played back. Alternatively, two audio streams contained in the main clip referred to by the play item may be set as the audio stream #1 and the audio stream #2 and are mixed and played back. With this configuration, an audio stream (for example, director's commentaries) different from the main audio stream can be superimposed on the main audio stream. Additionally, two audio streams #1 and #2 superimposed on the main clip AV stream can be superimposed and played back.

A specific example is given with reference to FIG. 24. FIG. 24 illustrates an example of the stream number table indicating sound numbers and subtitle numbers provided to users.

In FIG. 24, the sound numbers are referred to as "A_SN" and A_SN2 and the subtitle numbers are referred to as "S_SN". In FIG. 24, each of the plurality of audio streams #1 entered in STN_table( ) of the play item forming the main path of the playlist (audio stream entered as audio_stream_id) is provided with A_SN, and each of the plurality of audio streams #2 entered in STN_table( ) of the play item forming the main path of the playlist (audio stream entered as audio_stream_id2) is provided with A_SN2.

That is, audio 2 is assigned to A_SN=1, audio 1 is assigned to A_SN=2, and audio 3 is assigned to A_SN=3. Audio 4 is assigned to A_SN2=1, and audio 5 is assigned to A_SN2=2.

The user selects an audio stream #1 to be played back from among the audio streams assigned to A_SN, and selects an audio stream #2 to be mixed with the selected audio stream #1 from among the audio streams assigned to A_SN2. For example, the user selects audio 1 assigned to A_SN=2 and audio 5 assigned to A_SN2=2.

More specifically, if the user gives an instruction to switch audio streams while audio 2 assigned to A_SN=1 is being selected, audio 2 is switched to audio 1 assigned to A_SN=2. If the user further gives an instruction to switch audio streams, audio 1 is switched to audio 3 assigned to A_SN=3. If the user further gives an instruction to switch audio streams, audio 3 is switched back to audio 2 assigned to A_SN=1. Also, if the user gives an instruction to switch audio streams while audio 4 assigned to A_SN2=1 is being selected, audio 4 is switched to audio 5 assigned to A_SN2=2. If the user further gives an instruction to switch audio streams, audio 5 is switched back to audio 4 assigned to A_SN2=1. In this manner, A_SN for selecting audio stream #1 and A_SN2 for selecting audio stream #2 are independent of each other. That is, the user selects one audio stream from A_SN=1 through A_SN=3 and selects one audio stream from A_SN2=1 through A_SN2=2.

Each of a plurality of sub-picture streams of the main AV stream referred to by the main path is provided with S_SN. More specifically, sub-picture 3 is assigned to S_SN=1, sub-picture 1 is assigned to S_SN=2, and sub-picture 2 is assigned to S_SN=3.

In this case, as A_SN, A_SN2, or S_SN indicates a smaller number, the corresponding audio stream or sub-picture stream is provided to the user with higher priority. Streams provided by A_SN has higher priority over streams provided by A_SN2. That is, A_SN=1 is an audio stream played back as a default, and S_SN=1 is a sub-picture stream played back as a default.

More specifically, sound played back based on the initial information concerning the language set in the playback apparatus is audio 2 (FIG. 24), which is A_SN=1, and sound played back after being switched from audio 2 is audio 1, which is A_SN=2 (FIG. 24).

To provide such a stream number table, in STN_table( ) (FIG. 14) in PlayItem( ) referred to by PlayList( ), for the entry of audio stream #1, audio_stream_id=0 (A_SN=1) is assigned to audio 2, audio_stream_id=1 (A_SN=2) is assigned to audio 1, audio_stream_id=2 (A_SN=3) is assigned to audio 3. Then, in STN_table( ) (FIG. 14), for the entry of audio stream #2, audio_stream_id2=0 (A_SN2=1) is assigned to audio 4, and audio_stream_id2=1 (A_SN2=2) is assigned to audio 5.

That is, by separately defining two types of audio streams (audio stream #1 and audio stream #2) to be played back, the user can select two audio streams as desired from the defined streams. Accordingly, the flexibility in selecting audio streams becomes high. For example, the user can select a combination of audio 2 and audio 4 (A_SN=1 and A_SN2=1) or a combination of audio 2 and audio 5 (A_SN=1 and A_SN2=2).

As described above, in stream_entry( ) (FIG. 15) of the STN_table( ) (FIG. 14) in PlayItem( ), two audio streams can be entered so that two audio streams can be mixed and played back. That is, two streams of the same type (in this case, audio streams) can be selected from streams of different types so that they can be mixed (superimposed or combined) and played back simultaneously. The user can give an instruction to mix and play back the streams.

A playback apparatus according to an embodiment of the present invention is discussed below with reference to the block diagram of FIG. 25. The playback apparatus 20 shown in FIG. 25 plays back a playlist including the above-described main path and sub-path.

The playback apparatus 20 includes a storage drive 31, a switch 32, an AV decoder 33, and a controller 34.

The controller 34 controls the storage drive 31 to read a playlist file and to read AV streams or AV data from a recording medium, such as an HDD, Blu-ray disc™, or a DVD, based on information stored in the playlist file. The user instructs the controller 34 to switch sound or subtitles by using a user interface. Initial information concerning the language set in the playback apparatus 20 is supplied to the controller 34 from a storage unit (not shown).

The playlist file includes, not only information concerning a main path and information concerning sub-paths, but also STN_table( ). The controller 34 reads a main clip AV stream file referred to by a play item contained in the playlist file, a sub-clip AV stream file referred to by a sub-play item, and text subtitle data referred to by a sub-play item via the storage drive 31. In this case, the main clip AV stream referred to by the play item and the sub-clip AV stream referred to by the sub-play item may be recorded on different recording media. For example, the main clip AV stream may be recorded on the recording medium, and the corresponding sub-clip AV stream may be supplied via a network (not shown) and stored in an HDD. The controller 34 controls the playback apparatus 20 to select and play back elementary streams in accordance with the playback function of the playback apparatus 20 or to select and play back elementary streams in accordance with the initial information concerning the language set in the playback apparatus 20. Generally, since a stream referred to by a play item includes a video stream, a clip including a stream referred to by the play item (main path) is referred to as a "main clip". Streams other than the main clip are referred to as "sub-clips". Sub-clips are streams referred to by sub-paths, and a clip including at least one stream of a video stream substituting a video stream referred to by a play item, a video stream combined with the video stream referred to by the play item, an audio stream without a video stream, an IG stream, and a PG stream.

The AV decoder 33 includes buffers 51 through 54, PID filters 55 and 56, switches 57 through 59, a background decoder 71, s video decoder 72, a presentation graphics decoder 73, an interactive graphics decoder 74, the first audio decoder 75-1, the second audio decoder 75-2, a text subtitle (ST) composition 76, a switch 77, a background plane generator 91, a video plane generator 92, a presentation graphics plane generator 93, an interactive graphics plane generator 94, a buffer 95, a video data processor 96, and mixing processors 97 and 98. The first and second audio decoders 75-1 and 75-2 decode audio stream #1 and audio stream #2, respectively. More specifically, in STN_table( ) shown in FIG. 14, the decoder that decodes the audio stream represented by audio_stream_id is the first audio decoder 75-1, and the decoder that decodes the audio stream represented by audio_stream_id2 is the second audio decoder 75-2.

As described above, the playback apparatus 20 includes two audio decoders, i.e., the first audio decoder 75-1 and the second audio decoder 75-2, for decoding two audio streams. Hereinafter, the first and second audio decoders 75-1 and 75-2 are simply referred to as the "audio decoder 75" unless they have to be distinguished from each other.

File data read by the controller 34 is demodulated by a demodulator, and the demodulated multiplexed streams are then subjected to error correction by an error-correcting code (ECC) decoder. The switch 32 then divides the multiplexed streams according to the stream types and supplies the divided streams to the corresponding buffers 51 through 54 under the control of the controller 34. More specifically, under the control of the controller 34, the switch 32 supplies background image data to the buffer 51, main clip AV stream data to the buffer 52, sub-clip AV stream data to the buffer 53, and text-ST data to the buffer 54. Then, the buffers 51 through 54 buffer the background image data, main clip AV stream data, sub-clip AV stream data, and text-ST data, respectively, therein.

The main clip AV stream is a stream (for example, a transport stream) in which at least one stream of video, audio, bitmap subtitle (presentation graphics), and interactive graphics streams is multiplexed together with a video stream. The sub-clip AV stream is a stream in which at least one stream of audio, bitmap subtitle (presentation graphics), and interactive graphics streams is multiplexed. The text subtitle data file may be a multiplexed stream, such as a transport stream, but this is not essential.

When reading the main clip AV stream, the sub-clip AV stream, and the text subtitle data from the storage drive 31 or the recording medium, they can be alternately read in a time-division manner. Alternatively, the sub-clip AV stream or the text subtitle data may be entirely preloaded to the buffer 53 or 54, respectively.

The playback apparatus 20 reads those data from the recording medium 11 via the storage drive 31 to play back video, bitmap subtitle, interactive graphics, and audio.

More specifically, stream data read out from the buffer 52, which serves as the clip AV stream read buffer, is output to the PID filter 55 at a predetermined time. The PID filter 55 allocates streams contained in the main clip AV stream file to the corresponding elementary stream decoders according to the PIDs. More specifically, the PID filter 55 supplies video streams to the video decoder 72, presentation graphics streams to the switch 57, which supplies the graphics streams to the presentation graphics decoder 73, interactive graphics streams to the switch 58, which supplies the graphics streams to the interactive graphics decoder 74, and audio streams to the switch 59, which supplies the audio streams to the first audio decoder 75-1.

The presentation graphics streams are, for example, bitmap subtitle data, and the interactive graphics streams are, for example, text subtitle data.

Stream data read out from the buffer 53, which serves as the sub-clip AV stream read buffer, is output to the PID filter 56 at a predetermined time. The PID filter 56 allocates streams contained in the sub-clip AV stream to the corresponding elementary stream decoders according to the PIDs. More specifically, the PID filter 56 supplies presentation graphics streams to the switch 57, which supplies the graphics streams to the presentation graphics decoder 73, interactive graphics streams to the switch 58, which supplies the graphics streams to the interactive graphics decoder 74, and sub-clip audio streams to the switch 59, which supplies the audio streams to the first audio decoder 75-1 and the second audio decoder 75-2.

Data read out from the buffer 51, which serves as the background image data buffer, is supplied to the background decoder 71 at a predetermined time. The background decoder 71 decodes the background image data, and then supplies the decoded data to the background plane generator 91.

The video streams allocated by the PID filter 55 are supplied to the video decoder 72. The video decoder 72 decodes the video streams and supplies the decoded video streams to the video plane generator 92.

The switch 57 selects one of the presentation graphics streams contained in the main clip AV stream supplied from the PID filter 55 and the presentation graphics streams contained in the sub-clip AV stream supplied from the PID filter 56, and supplies the selected presentation graphics streams to the presentation graphics decoder 73. The presentation graphics decoder 73 decodes the presentation graphics streams and supplies them to the switch 77, which further supplies them to the presentation graphics plane generator 93.

The switch 58 selects one of the interactive graphics streams contained in the main clip AV stream supplied from the PID filter 55 and the interactive graphics streams contained in the sub-clip AV stream supplied from the PID filter 56, and supplies the selected interactive graphics streams to the interactive graphics stream decoder 74. That is, the interactive graphics streams simultaneously input into the interactive graphics decoder 74 are streams separated from the main clip AV stream file or the sub-clip AV stream file. The interactive graphics decoder 74 decodes the interactive graphics streams, and supplies the decoded streams to the interactive graphics plane generator 94.

The switch 59 selects one of the audio streams contained in the main clip AV stream supplied from the PID filter 55 and the audio streams contained in the sub-clip AV stream supplied from the PID filter 56 and supplies the selected audio streams to the first audio decoder 75-1 or the second audio decoder 75-2. The audio streams simultaneously input into the first audio decoder 75-1 are streams separated from the main clip or the sub-clip. The audio streams simultaneously input into the second audio decoder 75-2 are streams separated from the sub-clip AV stream file. If the main clip AV stream includes the audio streams #1 and the audio streams #2, the PID filter 161 filters the audio streams #1 and the audio streams #2 according to the PIDs of the audio streams, and supplies them to the switch 59.

The switch 59 selects the audio streams #1 supplied from the PID filter 55 to the first audio decoder 75-1 and the audio streams #2 supplied from the PID filter 55 to the second audio decoder 75-2.

The first audio decoder 75-1 decodes the audio streams and supplies the decoded audio streams to the mixing processor 98. The second audio decoder 75-2 decodes the audio streams #2 and supplies the decoded audio streams to the mixing processor 98.

If an instruction to superimpose the audio stream #1 on the audio stream #2 and play back the superimposed stream is given (if two audio streams are selected), the specified audio stream #1 decoded by the first audio decoder 75-1 and the specified audio stream #2 decoded by the second audio decoder 75-2 are supplied to the mixing processor 98.

The mixing processor 98 mixes (superimposes) the audio data from the first audio decoder 75-1 with the audio data from the second audio decoder 75-2, and supplies the resulting data to the mixing processor 97. In this embodiment, mixing (superimposing) of the audio data output from the first audio decoder 75-1 and the audio data output from the second audio decoder 75-2 is also referred to as "combining". That is, to combine two audio data is to mix two audio data.

Sound data selected by the switch 32 is supplied to the buffer 95 and is buffered therein. The buffer 95 supplies the sound data to the mixing processor 97 at a predetermined time. The sound data is, for example, effect sound that can be selected from a menu. The mixing processor 97 mixes (superimposes or combines) the audio data mixed by the mixing processor 98 (audio data obtained by mixing the audio data output from the first audio decoder 75-1 with the audio data output from the second audio decoder 75-2) with the sound data supplied from the buffer 95, and outputs the resulting data as an audio signal.

Data read from the buffer 54, which serves as the text subtitle read buffer, is output to the text subtitle composition 76 at a predetermined time. The text subtitle composition 76 decodes the text-ST data and supplies the decoded data to the switch 77.

The switch 77 selects one of the presentation graphics streams decoded by the presentation graphics decoder 73 and the text subtitle data decoded by the text subtitle composition 76, and supplies the selected data to the presentation graphics plane generator 93. That is, subtitle images simultaneously supplied to the presentation graphics plane generator 93 are those output from the presentation graphics decoder 73 or from the text subtitle composition 76. Presentation graphics streams simultaneously input into the presentation graphics decoder 73 are streams separated from the main clip AV stream or from the sub-clip AV stream (selected by the switch 57). Accordingly, the subtitle images simultaneously input into the presentation graphics plane generator 93 are presentation graphics streams from the main clip AV stream file, presentation graphics streams from a sub-clip AV stream file, or text subtitle data.

The background plane generator 91 generates a background plane, which serves as, for example, a wallpaper image when a video image is displayed by reducing the size thereof, on the basis of the background image data supplied from the background decoder 71, and supplies the generated background plane to the video data processor 96. The video plane generator 92 generates a video plane based on the video data supplied from the video decoder 72, and supplies the generated video plane to the video data processor 96. The presentation graphics plane generator 93 generates a presentation graphics plane, which serves as, for example, a rendering image, on the basis of the data (presentation graphics streams or text subtitle data) selected by the switch 77, and supplies the generated presentation graphics plane to the video data processor 96. The interactive graphics plane generator 94 generates an interactive graphics plane based on the interactive graphics stream data supplied from the interactive graphics decoder 74, and supplies the generated interactive graphics plane to the video data processor 96.

The video data processor 96 combines the background plane from the background plane generator 91, the video plane from the video plane generator 92, the presentation graphics plane from the presentation graphics plane generator 93, and the interactive graphics plane from the interactive graphics plane generator 94, and outputs the combined plane as a video signal. The mixing processor 97 mixes (superimposes or combines) the audio data supplied from the mixing processor 98 and the sound data supplied from the buffer 95, and outputs the resulting data as an audio signal.

The switches 57 through 59 and the switch 77 select data according to the selection by the user via a user interface or depending on the type of file containing target data. For example, if audio streams are contained only in sub-clip AV stream files, the switch 59 changes the selection to the PID filter 56, which supplies data contained in the sub-clip AV stream files.

The playback processing performed by the playback apparatus 20 shown in FIG. 25 is described below with reference to the flowcharts in FIGS. 26 through 28. This processing is started when an instruction to play back a predetermined AV stream is given from a user via a user interface.

In step S11, the controller 34 reads a playlist file, such as that shown in FIG. 9, recorded on a recording medium or an HDD (not shown) via the storage drive 31.

In step S12, the controller 34 reads a main clip AV stream, a sub-clip AV stream, and text subtitle data (text-ST data). More specifically, the controller 34 reads the corresponding main clip AV stream from the main clip based on the play item contained in the playlist shown in FIG. 9, and also reads a sub-clip AV stream and text subtitle data based on a sub-play item shown in FIGS. 10 through 12, which is referred to by a sub-path contained in the playlist.

In step S13, the controller 34 controls the switch 32 to supply the read data (main clip AV stream, sub-clip AV stream, and text subtitle data) to the corresponding buffers 51 through 54. More specifically, the controller 34 controls the switch 32 to supply the background image data to the buffer 51, the main clip AV stream data to the buffer 52, the sub-clip AV stream data to the buffer 53, and the text subtitle data to the buffer 54.

In step S14, the switch 32 supplies the corresponding data as described above under the control of the controller 34.

In step S15, the buffers 51 through 54 buffer the supplied data therein. More specifically, the buffer 51 buffers the background image data, the buffer 52 buffers the main clip AV stream data, the buffer 53 buffers the sub-clip AV stream data, and the buffer 54 buffers the text subtitle data.

In step S16, the buffer 51 outputs the background image data to the background decoder 71.

In step S17, the buffer 52 outputs the stream data of the main clip AV stream to the PID filter 55.

In step S18, the PID filter 55 allocates the elementary streams to the corresponding elementary stream decoders based on the PIDs attached to the transport stream packets forming the main clip AV stream file. More specifically, the PID filter 55 supplies video streams to the video decoder 72, presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the first audio decoder 75-1. As discussed above, the video streams, presentation graphics streams, interactive graphics streams, and audio streams are provided with different PIDs.

In step S19, the buffer 53 outputs the stream data of the sub-clip AV stream to the PID filter 56.

In step S20, the PID filter 56 allocates the elementary streams to the corresponding decoders based on the PIDs. More specifically, the PID filter 56 supplies presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the first audio decoder 75-1 or the second audio decoder 75-2.

In step S21, the switches 57 through 59 select one of the main clip AV stream and the sub-clip AV stream under the control of the controller 34 via a user interface. More specifically, the switch 57 selects presentation graphics streams of the main clip AV stream or those of the sub-clip AV stream supplied from the PID filter 55, and supplies the selected streams to the presentation graphics decoder 73. The switch 58 selects interactive graphics streams of the main clip AV stream or those of the sub-clip AV stream supplied from the PID filter 55, and supplies the selected streams to the interactive graphics decoder 74. The switch 59 selects audio streams of the main clip AV stream or those of the sub-clip AV stream supplied from the PID filter 55, and supplies the selected streams to the first audio decoder 75-1. If an instruction to switch sound is given from the user, the switch 59 supplies audio streams of a sub-clip AV stream to the second audio decoder 75-2. However, an explanation thereof is not given here since switching sound is not considered in this processing.

In step S22, the buffer 54 outputs text subtitle data to the text subtitle composition 76.

In step S23, the background decoder 71 decodes background image data and supplies the decoded data to the background plane generator 91.

In step S24, the video decoder 72 decodes the video streams and supplies the decoded streams to the video plane generator 92.

In step S25, the presentation graphics decoder 73 decodes the presentation graphics streams selected by the switch 57, and outputs the decoded streams to the switch 77.

In step S26, the interactive graphics decoder 74 decodes the interactive graphics streams selected by the switch 58, and outputs the decoded streams to the interactive graphics plane generator 94.

In step S27, the first audio decoder 75-1 decodes the audio stream (audio stream #1) selected by the switch 59 and outputs the decoded data to the mixing processor 98. In the playback processing shown in FIGS. 26 through 28 when an instruction to switch sound is not given from the user, audio data is not output from the second audio decoder 75-2. Accordingly, the mixing processor 98 directly supplies the audio data output from the first audio decoder 75-1 to the mixing processor 97.

In step S28, the text subtitle composition 76 decodes text subtitle data and outputs the decoded data to the switch 77.

In step S29, the switch 77 selects data from the presentation graphics decoder 73 or the text subtitle composition 76. More specifically, the switch 77 selects the presentation graphics streams decoded by the presentation graphics decoder 73 or the text subtitle data from the text subtitle composition 76, and supplies the selected data to the presentation graphics plane generator 93.

In step S30, the background plane generator 91 generates a background plane based on the background image data supplied from the background decoder 71.

In step S31, the video plane generator 92 generates a video plane based on the video data supplied from the video decoder 72.

In step S32, the presentation graphics plane generator 93 generates a presentation graphics plane based on the data selected by the switch 77 in step S29 and supplied from the presentation graphics decoder 73 or the text subtitle composition 76.

In step S33, the interactive graphics plane generator 94 generates an interactive graphics plane based on the interactive graphics stream data supplied from the interactive graphics decoder 74.

In step S34, the buffer 95 buffers the sound data selected in step S14 and supplies it to the mixing processor 97 at a predetermined time.

In step S35, the video data processor 96 combines the planes and outputs the combined data. More specifically, the video data processor 96 combines the data from the background plane generator 91, the video plane generator 92, the presentation graphics plane generator 93, and the interactive graphics plane generator 94, and outputs the combined data as video data.

In step S36, the mixing processor 97 mixes (combines) the audio data output from the mixing processor 98 with the sound data, and outputs the resulting data. The processing is then completed.

Figure 26:
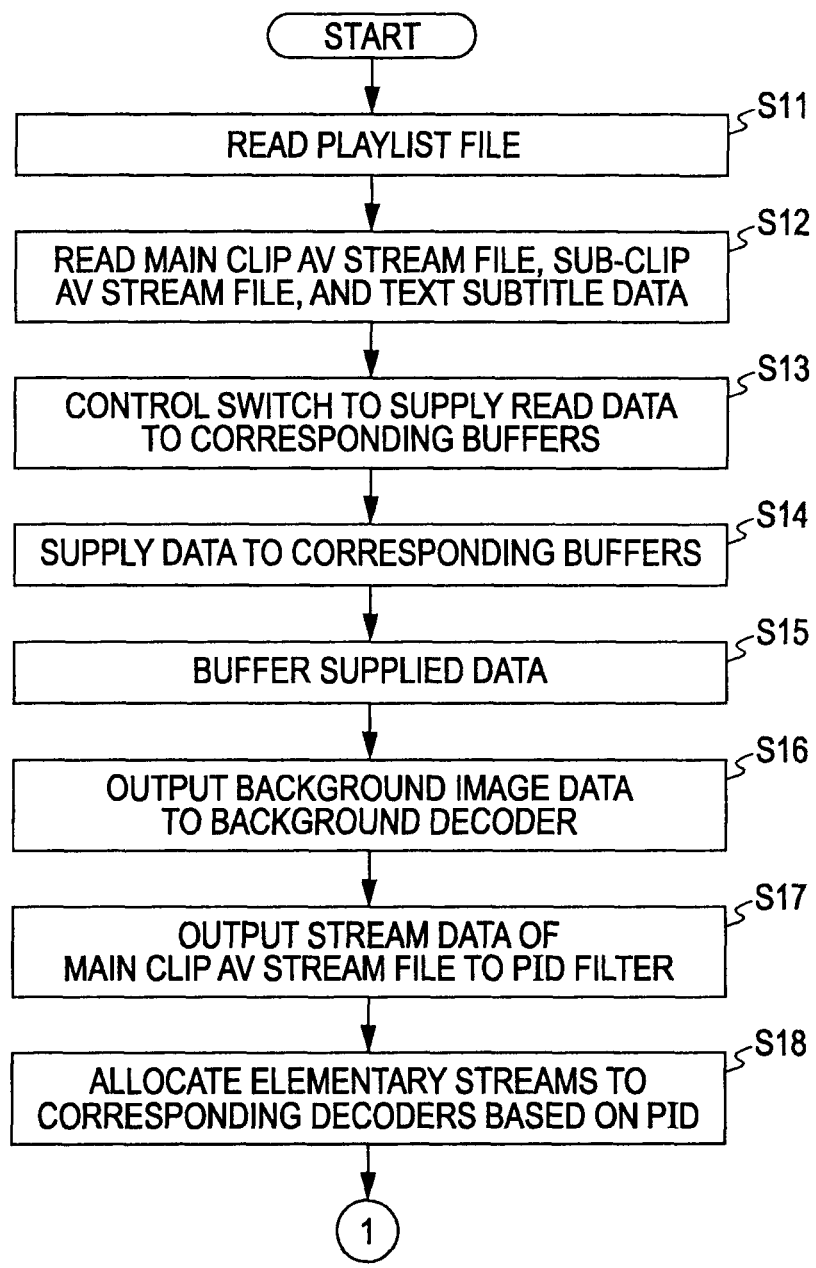
FIGS. 26, 27, and 28 are flowcharts illustrating playback processing performed by the playback apparatus shown in FIG. 25.
Figure 27:
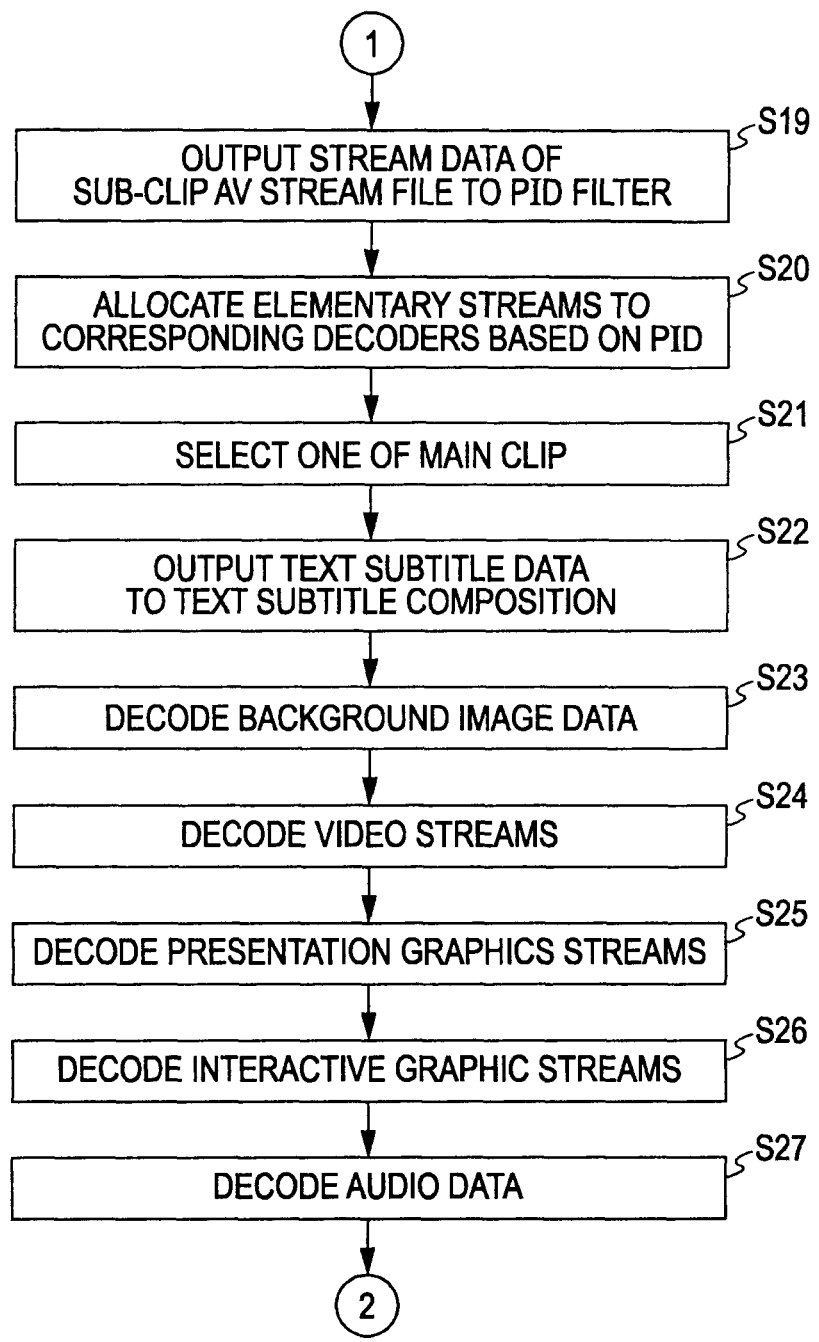
Figure 28:
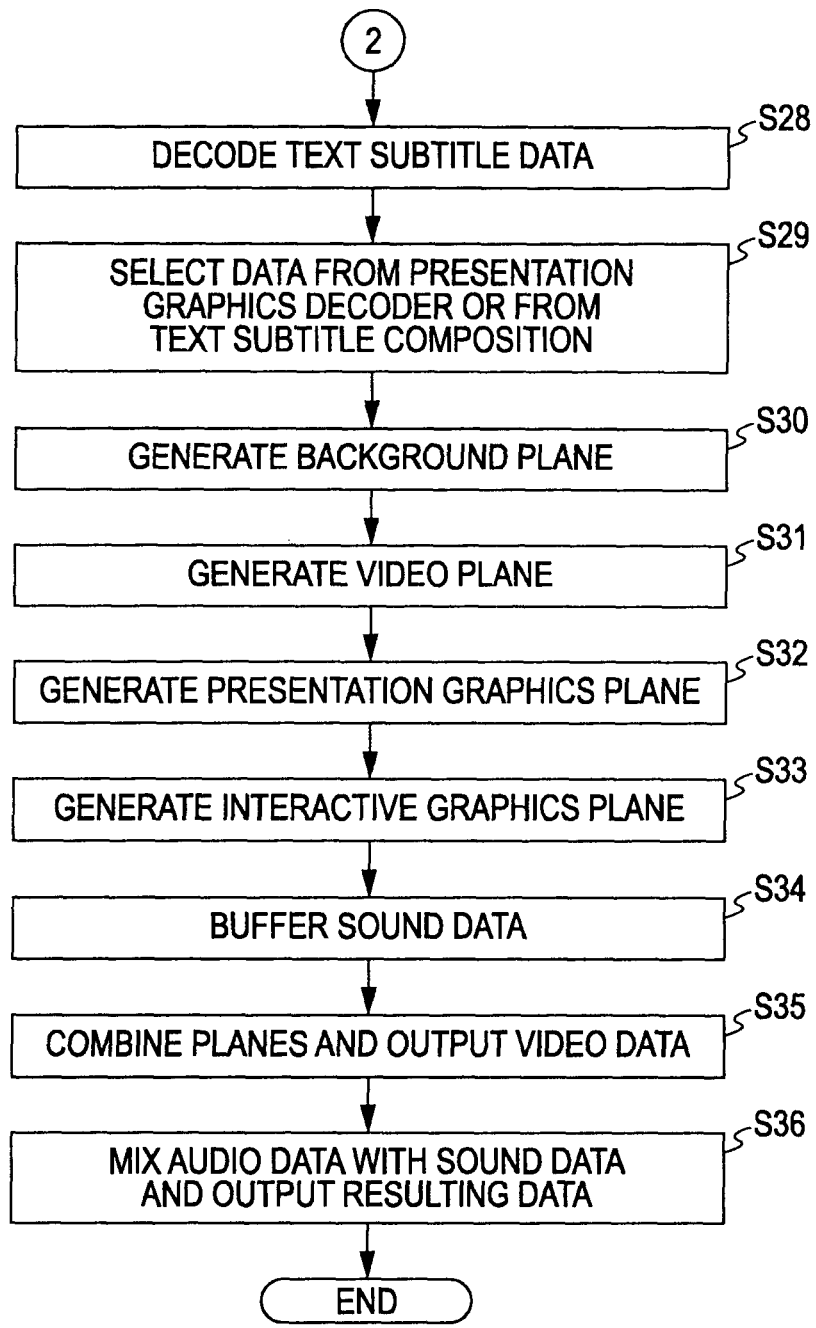

According to the processing shown in FIGS. 26 through 28, by referring to the main clip AV stream referred to by the main path included in the playlist, a sub-clip AV stream referred to by the corresponding sub-path included in the playlist, and the text subtitle data, the corresponding data is played back. By providing the main path and the sub-path in the playlist, a clip AV stream, which is different from the main clip AV stream specified by the main path, can be specified by the sub-path. Thus, data of a sub-clip AV stream file, which is different from the main clip specified by the play item of the main path, can be played back together with (in synchronization with) the data of the main clip AV stream file contained in the main clip.

In FIGS. 26 through 28, the order of steps S16 and S17 may be reversed or steps S16 and S17 may be executed in parallel. Similarly, the order of steps S18 and S20 may be reversed or steps S18 and S20 may be executed in parallel. The order of steps S23 through S28 may be reversed or steps S23 through S28 may be executed in parallel. The order of steps S30 through S33 may be reversed or steps S30 through S33 may be executed in parallel. The order of steps S35 and S36 may be reversed or steps S35 and S36 may be executed in parallel. That is, in FIG. 25, the elements disposed vertically on the same layer, i.e., the processing jobs of the buffers 51 through 54, those of the switches 57 through 59, those of the decoders 71 through 76, those of the plane generators 91 through 94, and those of the video data processor 96 and the mixing processor 97 may be executed in parallel, and the order thereof is not particularly restricted.

Figure 29:
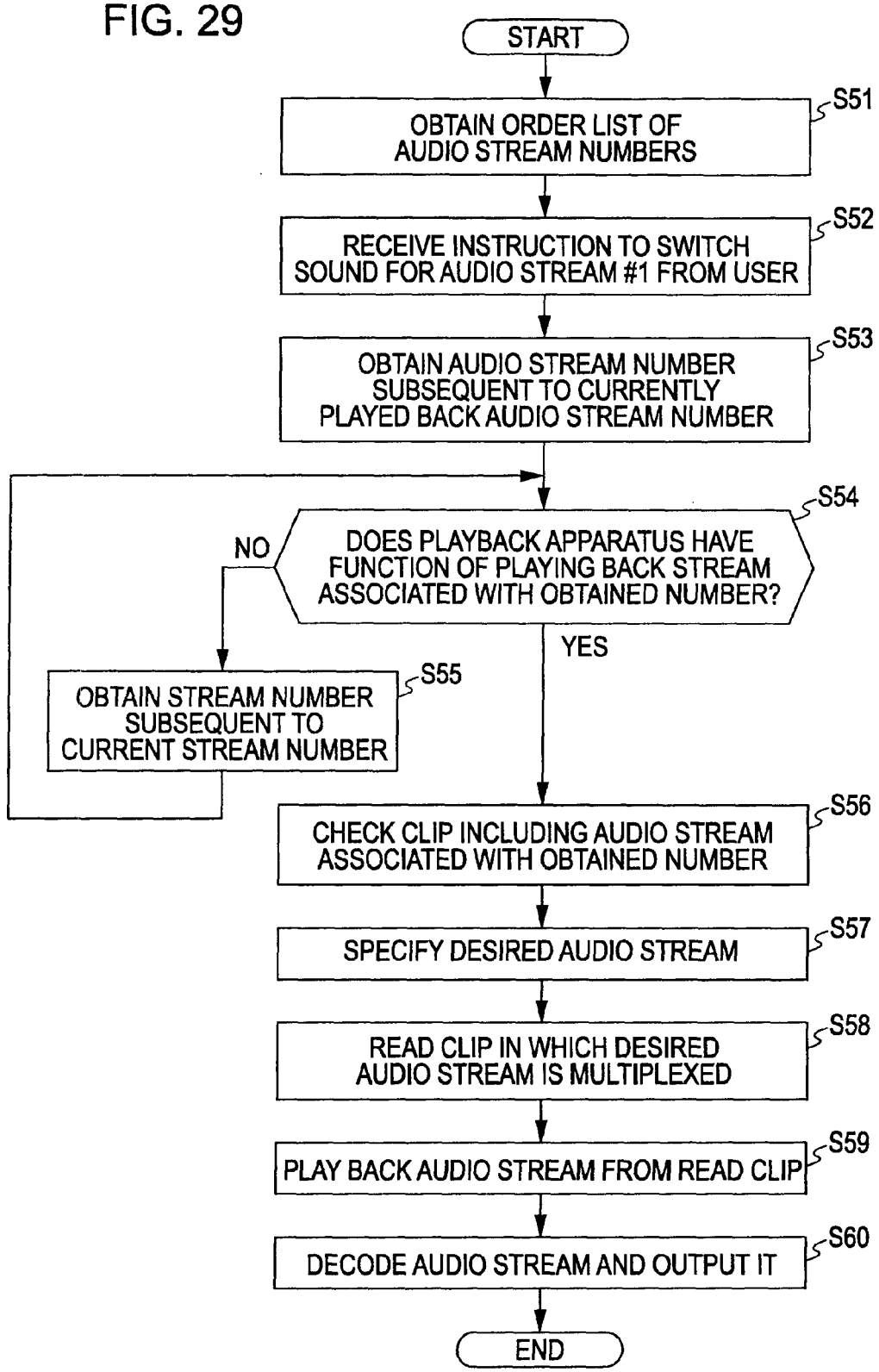
FIG. 29 is a flowchart illustrating processing in response to an instruction to switch sound for audio stream #1 from a user.
Figure 30:
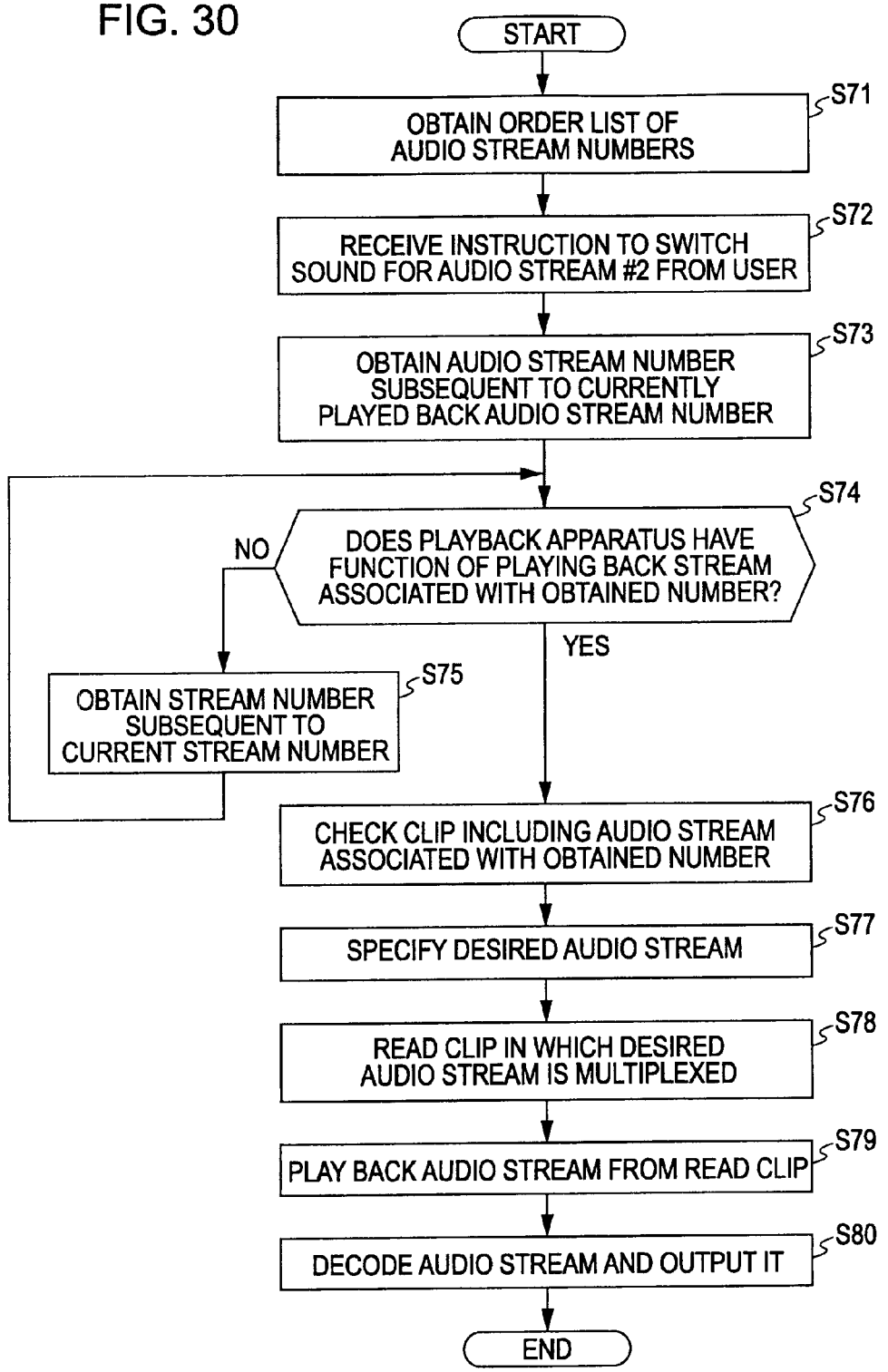
FIG. 30 is a flowchart illustrating processing in response to an instruction to switch sound for audio stream #2 from a user.

Processing performed by the playback apparatus 20 when an instruction to switch sound is given is now described with reference to the flowchart in FIGS. 29 and 30. Reference is first given to the flowchart in FIG. 29 to describe processing when an instruction to switch sound for audio streams #1 is given. Processing when an instruction to switch sound for audio streams #2 is given is discussed below with reference to FIG. 30. The processing shown in FIGS. 29 and 30 is executed while performing, for example, the playback processing shown in FIGS. 26 through 28.

In step S51, the controller 34 obtains an order list of audio stream numbers (may be audio stream IDs). More specifically, the controller 34 refers to STN_table( ) of PlayItem( ) discussed with reference to FIG. 13 to obtain the order list of audio stream numbers (IDs) entered in STN_table( ) discussed with reference to FIG. 14. This step is executed when the playback processing shown in FIGS. 26 through 28 is started.

In response to an instruction to switch sound for audio streams #1 given from the user via a user interface, in step S52, the controller 34 receives the instruction. In this case, the controller 34 may control a display device (not shown) to display a stream number table, such as that shown in FIG. 24, on the display device. Since the processing shown in FIG. 29 is to perform sound switching for the audio streams #1, the user gives an instruction to switch sound of A_SN=1, A_SN=2, or A_SN=3, and more specifically, to switch from audio 2 (A_SN=1) to audio 1 (A_SN=2). The controller 34 receives an instruction to switch from audio 2 to audio 1 from the user. In FIG. 29, step S51 has been executed, and in response to an instruction to switch sound for the audio stream #1 from the user, step S52 is executed.

In step S53, the controller 34 obtains the audio stream number subsequent to the audio stream number which is currently played back. For example, if the audio stream file corresponding to audio 2 (A_SN=1) shown in FIG. 24 is currently played back in step S52, the subsequent audio stream is audio 1 (A_SN=2). Accordingly, the controller 34 obtains the audio stream number corresponding to audio 1.

In step S54, the controller 34 determines whether the playback apparatus 20 has a function of playing back the audio stream (audio stream #1) associated with the obtained number. More specifically, the controller 34 makes this determination based on the information indicated in stream_attribute( ) shown in FIG. 16. For example, if type=1 in stream_entry( ) in FIG. 15, the controller 34 determines whether the function of playing back the audio stream of the main clip AV stream associated with the obtained number is provided. Since the audio stream associated with the obtained number are the audio stream #1 decoded by the first audio decoder 75-1, it is determined whether the audio decoder 75-1 can decode the audio stream #1.

If it is determined in step S54 that the function of playing back the audio stream associated with the obtained number is not provided, the process proceeds to step S55 in which the controller 34 obtains the stream number subsequent to the current stream number. That is, the current stream number is skipped and is not played back. Then, after step S55, the process returns to step S54. That is, the processing is repeated until the controller 34 obtains an audio stream (audio stream #1) number that can be played back by the playback apparatus 20.

If it is determined in step S54 that the function of playing back the audio stream associated with the obtained number is provided, the process proceeds to step S56. In step S56, the controller 34 checks, based on the type shown in FIG. 15, the audio streams of the main clip AV stream contained in the main clip associated with the obtained number (type=1) and the audio streams of the sub-clip AV stream file contained in the sub clip associated with the obtained number (type=2). If type=1 in stream_entry( ) in FIG. 15, the controller 34 can determine that the audio stream associated with the obtained number is contained in the main clip. If type=2 in stream_entry( ) in FIG. 15, the controller 34 can determine that the audio stream associated with the obtained number is contained in the sub-clip.

In step S57, the controller 34 specifies a desired audio stream. More specifically, the controller 34 specifies a desired audio stream contained in the main clip associated with the obtained number or the sub-clip associated with the obtained number. If it is determined in step S54 that the audio stream associated with the obtain number is contained in the main clip, the controller 34 specifies the predetermined audio stream contained in the main clip based on information (ref_to_stream_PID_of_mainClip) entered in stream_entry( ) as type=1. If it is determined in step S54 that the audio stream associated with the obtained number is contained in a sub-clip, the controller 34 specifies the predetermined audio stream contained in the sub-clip based on information (ref_to_SubPath_id, ref_to_SubPath_entry_id, and ref_to_stream_PID_of_SubClip) entered in stream_entry( ) as type=2. The specified audio stream serves as the audio stream #1 decoded by the first audio decoder 75-1.

In step S58, the controller 34 instructs the storage drive 31 to read the clip AV stream (main clip AV stream or sub-clip AV stream) corresponding to the clip into which the desired audio stream is multiplexed. In response to this instruction, the storage drive 31 reads the target clip AV stream. More specifically, the controller 34 instructs the storage drive 31 to read the clip AV stream specified in step S57.

In step S59, the controller 34 instructs the AV decoder 33 to play back the audio stream from the read clip AV stream. More specifically, the controller 34 instructs the audio decoder 75-1 to decode the desired audio stream (i.e., audio stream #1) contained in the read clip AV stream.

In step S60, the AV decoder 33 decodes the audio stream (audio stream #1) and outputs it. More specifically, the audio decoder 75-1 of the AV decoder 33 decodes the audio stream #1 (target audio stream in step S58) and outputs the decoded stream to the mixing processor 98. If the audio stream #2 is decoded by the second audio decoder 75-2 in the processing shown in FIG. 30, which is described below, the mixing processor 98 mixes the audio stream #1 with the audio stream #2, and supplies the mixed stream to the mixing processor 97. If the audio stream #2 is not decoded by the second audio decoder 75-2 in the processing shown in FIG. 30, the mixing processor 98 directly supplies the audio stream #1 to the mixing processor 97. The mixing processor 97 then mixes the supplied audio data from the mixing processor 98 with the sound data output from the buffer 95, and outputs the resulting data as an audio signal. Details of step S60 are given below with reference to the flowchart in FIG. 31.

The processing performed in response to an instruction to perform sound switching for the audio stream #2 is described below with reference to the flowchart in FIG. 30. The playback apparatus 20 executes this processing while performing the playback processing shown in FIGS. 26 through 28. Generally, when the audio stream #2 is played back, the audio stream #1 is also played back. Accordingly, the processing shown in FIG. 30 is executed in parallel with the playback processing for the audio stream #1 shown in FIG. 29, and when the audio stream #2 is not selected by the user, only the playback processing for the audio stream #1 shown in FIG. 29 is performed without performing the processing shown in FIG. 30.

In step S71, the controller 34 obtains an order list of audio stream numbers (may be audio stream IDs). More specifically, the controller 34 refers to STN_table( ) of PlayItem( ) discussed with reference to FIG. 13 to obtain the order list of audio stream numbers (IDs) entered in STN_table( ) discussed with reference to FIG. 14. This step is executed when the playback processing shown in FIGS. 26 through 28 is started.

In response to an instruction to switch sound for audio streams #2 given from the user via a user interface, in step S72, the controller 34 receives the instruction. In this case, the controller 34 may control a display device (not shown) to display a stream number table, such as that shown in FIG. 24, on the display device. Since the processing shown in FIG. 30 is to perform sound switching for the audio streams #2, the user gives an instruction to switch sound between A_SN2=1 and A_SN=2, and more specifically, to switch from audio 4 (A_SN2=1) to audio 5 (A_SN2=2). The controller 34 receives an instruction to switch from audio 4 to audio 5 from the user. In FIG. 30, step S71 has been executed, and in response to an instruction to switch sound for the audio streams #2 from the user, step S72 is executed.

In step S73, the controller 34 obtains the audio stream number subsequent to the audio stream number which is currently played back. For example, if the audio stream file represented by SubClip_entry_id=0 shown in FIG. 8 is currently played back in step S72, the subsequent audio stream represented by the subsequent SubClip_entry_id=1 is obtained. For example, if the audio stream file corresponding to audio 4 (A_SN2=1) shown in FIG. 24 is currently played back in step S72, the subsequent audio stream is audio 5 (A_SN2=2). Accordingly, the controller 34 obtains the audio stream number corresponding to audio 5.

In step S74, the controller 34 determines whether the playback apparatus 20 has a function of playing back the audio stream (audio stream #2) associated with the obtained number. More specifically, the controller 34 makes this determination based on the information indicated in stream_attribute( ) shown in FIG. 16. For example, if type=1 in stream_entry( ) in FIG. 15, the controller 34 determines whether the function of playing back the audio stream of the main clip AV stream associated with the obtained number is provided. Since the audio stream associated with the obtained number are the audio stream #2 decoded by the first audio decoder 75-2, it is determined whether the audio decoder 75-2 can decode the audio stream #2.

This processing may be omitted if the audio streams #1 decoded by the first audio decoder 75-1 have higher extensibility (as in multi-streams) than the audio streams #2 decoded by the second audio decoder 75-2. For example, if the first audio decoder 75-1 has higher performance than the second audio decoder 75-2 (if, for example, the audio streams #1 are normal movie sound and the audio streams #2 are director's commentaries on that movie), it is highly likely that a certain restriction is imposed on the audio streams #2 decoded by the second audio decoder 75-2. Accordingly, the possibility of streams that cannot be decoded by the second audio decoder 75-2 being set as the audio streams #2 is low.

If it is determined in step S74 that the function of playing back the audio stream associated with the obtained number is not provided, the process proceeds to step S75 in which the controller 34 obtains the stream number subsequent to the current stream number. That is, the current stream number is skipped and is not played back. Then, after step S75, the process returns to step S74. That is, the processing is repeated until the controller 34 obtains an audio stream (audio stream #2) number that can be played back by the playback apparatus 20.

If it is determined in step S74 that the function of playing back the audio stream associated with the obtained number is provided, the process proceeds to step S76. In step S76, the controller 34 checks, based on the type shown in FIG. 15, the audio streams of the main clip AV stream contained in the main clip associated with the obtained number (type=1) and the audio streams of the sub-clip AV stream file contained in the sub clip associated with the obtained number (type=2). If type=1 in stream_entry( ) in FIG. 15, the controller 34 can determine that the audio stream associated with the obtained number is contained in the main clip. If type=2 in stream_entry( ) in FIG. 15, the controller 34 can determine that the audio stream associated with the obtained number is contained in the sub-clip.

In step S77, the controller 34 specifies a desired audio stream. More specifically, the controller 34 specifies a desired audio stream contained in the main clip associated with the obtained number or the sub-clip associated with the obtained number. If it is determined in step S74 that the audio stream associated with the obtain number is contained in the main clip, the controller 34 specifies the predetermined audio stream contained in the main clip based on information (ref_to_stream_PID_of_mainClip) entered in stream_entry( ) as type=1. If it is determined in step S74 that the audio stream associated with the obtained number is contained in a sub-clip, the controller 34 specifies the predetermined audio stream contained in the sub-clip based on information (ref_to_SubPath_id, ref_to_SubPath_entry_id, and ref_to_stream_PID_of_SubClip) entered in stream_entry( ) as type=2. The specified audio stream serves as the audio stream #2 decoded by the first audio decoder 75-2.

In step S78, the controller 34 instructs the storage drive 31 to read the clip AV stream (main clip AV stream or sub-clip AV stream) corresponding to the clip into which the desired audio stream) is multiplexed. In response to this instruction, the storage drive 31 reads the target clip AV stream. More specifically, the controller 34 instructs the storage drive 31 to read the clip AV stream specified in step S77.

In step S79, the controller 34 instructs the AV decoder 33 to play back the audio stream from the read clip AV stream. More specifically, the controller 34 instructs the audio decoder 75-2 to decode the desired audio stream (i.e., audio stream #2) contained in the read clip AV stream.

In step S80, the AV decoder 33 decodes the audio stream (audio stream #2) and outputs it. More specifically, the audio decoder 75-2 of the AV decoder 33 decodes the audio stream #2 (target audio stream in step S78) and outputs the decoded stream to the mixing processor 98. The audio stream #2 is decoded by the second audio decoder 75-2 in the processing shown in FIG. 30. This means that the audio stream #1 is decoded by the audio decoder 75-1 in the processing shown in FIG. 29, and the decoded audio stream #1 is output to the mixing processor 98. The mixing processor 98 mixes the audio stream #1 with the audio stream #2, and supplies the mixed stream to the mixing processor 97. The mixing processor 97 then mixes the supplied audio data from the mixing processor 98 with the sound data output from the buffer 95, and outputs the resulting data as an audio signal. Details of step S80 (and step S60 in FIG. 20) are given below with reference to the flowchart in FIG. 31.

Figure 31:
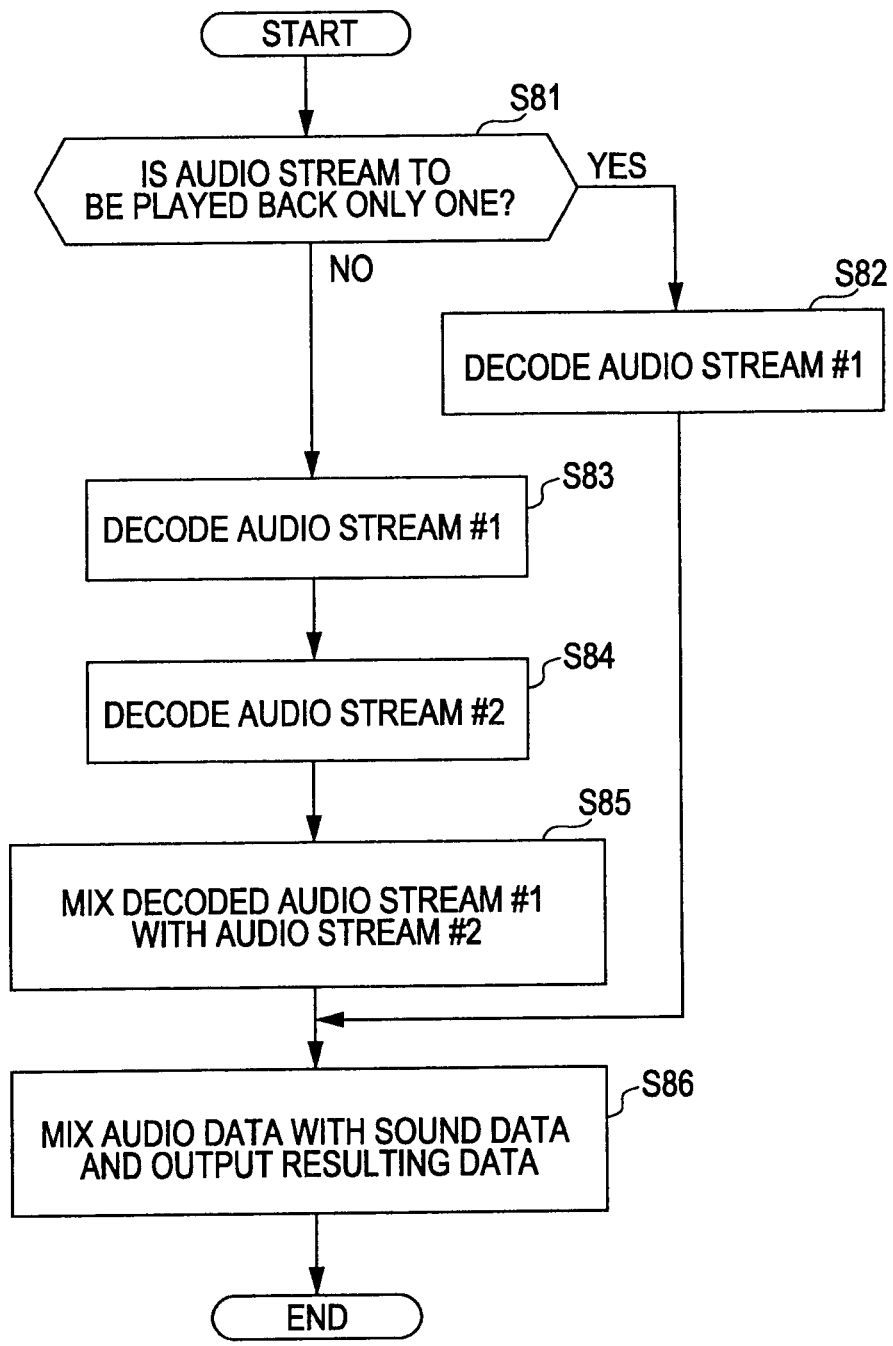
FIG. 31 is a flowchart illustrating details of step S60 in FIG. 29.

FIG. 31 illustrates an example of processing for outputting an audio stream by the AV decoder 33, that is, FIG. 31 is a flowchart illustrating details of step S60 in FIG. 29 or step S80 in FIG. 30.

In step S81, the AV decoder 33 determines under the control of the controller 34 whether the number of audio stream to be played back is only one. More specifically, the AV decoder 33 determines under the control of the controller 34 whether the user has selected audio stream #1 and audio stream #2. For example, if an instruction to switch sound for the audio streams #1 or audio streams #2 in step S52 in FIG. 29 or step S72 in FIG. 30, respectively, has been given from the user, or if an instruction to play back the audio stream #1 and audio stream #2 has been given from the user, the AV decoder 33 determines in step S81 that the number of audio streams is not one, but two. If an instruction to play back the audio stream #1 has been given from the user, or if an instruction to switch sound for the audio streams #1 has been given from the user without an instruction to switch sound for the audio streams #2 in step S52 in FIG. 29, the AV decoder 33 determines in step S81 that the number of audio stream to be played back is only one.

If it is determined in step S81 that the number of audio stream to be played back is one, the process proceeds to step S82 in which the first audio decoder 75-1 decodes that audio stream, i.e., audio stream #1. For example, if the audio stream to be played back is an audio stream of a main clip AV stream, the audio stream selected by the PID filter 55 and selected by the switch 59 is supplied to the first audio decoder 75-1. Then, the first audio decoder 75-1 decodes the audio stream of the main clip AV stream (in this case, audio stream #1), and supplies the decoded audio stream #1 to the mixing processor 98. The mixing processor 98 then directly outputs the audio data to the mixing processor 97.

If it is determined in step S81 that the number of audio streams to be played back is not one, but two, between the two audio streams, the audio stream #1 is supplied to the audio decoder 75-1 and the audio stream #2 is supplied to the audio decoder 75-2. That is, the switch 59 is changed so that the audio stream #1 supplied from the PID filter 55 or 56 can be supplied to the first audio decoder 75-1 and so that the audio stream #2 supplied from the PID filter 55 or 56 can be supplied to the second audio decoder 75-2.

Then, in step S83, the first audio decoder 75-1 decodes the audio stream #1. For example, if the audio stream #1 to be played back is an audio stream of the main clip AV stream, the audio stream selected by the PID filter 55 is selected by the switch 59 and is supplied to the first audio decoder 75-1. Then, the first audio decoder 75-1 decodes the main clip audio stream (audio stream #1). The first audio decoder 75-1 supplies the decoded audio stream #1 to the mixing processor 98.

In step S84, the second audio decoder 75-2 decodes the audio stream #2. For example, if the audio stream #2 to be played back is an audio stream of a sub-clip AV stream, the audio stream selected by the PID filter 56 is selected by the switch 59 and is supplied to the second audio decoder 75-2. Then, the second audio decoder 75-2 decodes the sub-clip audio stream (audio stream #2). The second audio decoder 75-2 supplies the decoded audio stream #2 to the mixing processor 98. The order of steps S83 and S84 may be reversed or steps S83 and S84 may be executed in parallel.

In step S85, the mixing processor 98 mixes (combines or superimposes) the audio stream #1 decoded by the first audio decoder 75-1 and the audio stream #2 decoded by the second audio decoder 75-2. Then, the mixing processor 98 supplies the mixed audio data to the mixing processor 97.

After step S82 or S85, the process proceeds to step S86. In step S86, the mixing processor 97 mixes the supplied audio data with the sound data supplied from the buffer 95, and outputs the resulting data. In step S86 after step S82, the mixing processor 97 mixes the audio data decoded from the audio stream #1 with the sound data. In step S86 after step S85, the mixing processor 97 mixes the audio data, which is generated by mixing the audio data decoded from the audio stream #1 with the audio data decoded from the audio stream #2, with the sound data. Then, the process is completed.

According to the processing shown in FIG. 31, two audio streams can be mixed and played back.

According to the processing discussed with reference to FIG. 31, the selection of the switch 59 in FIG. 25 in step S21 in FIG. 27 can be determined. More specifically, if it is determined in step S81 in FIG. 31 that the number of audio stream to be played back is one, the switch 59 is changed so that the audio stream supplied from the PID filter 55 or 56 can be supplied to the first audio decoder 75-1 (outcome of step S81 is YES). If it is determined in step S81 in FIG. 31 that the number of audio streams to be played back is two, the switch 59 is changed so that the audio stream supplied from the PID filter 55 or 56 can be supplied to the second audio decoder 75-2 (outcome of step S81 is YES).

As described above, the controller 34 can control the switching of sound (audio) based on STN_table( ) of PlayItem( ). The controller 34 can also select streams only that can be played back by the playback apparatus 20 by referring to_stream_attribute of STN_table( ). Based on STN_table( ), the controller 34 also control two audio streams to be superimposed and played back. The controller 34 can also perform control so that the audio stream #1, which serves as a main stream, is mixed with the audio stream #2, which is a stream of the same type (in this case, an audio stream) of the audio stream #1 and play them back simultaneously.

Although in the processing shown in FIG. 29 audio streams are switched based on the audio stream numbers, they may be switched based on the audio stream IDs (audio_stream_id). In this case, the numbers obtained by subtracting one from the audio stream numbers are audio stream IDs.

In this embodiment, two audio streams are mixed (combined) and played back. However, the type of stream is not restricted to audio, and various streams can be mixed and played back as long as they are the same stream type. For example, video streams may be combined and played back (picture-in-picture display).

The configuration as described above can be used for so-called "picture-in-picture (PinP)" display, and more specifically, a video stream (video stream #1) referred to by a main path is displayed as a main screen and a video stream (video stream #2) referred to by a sub-path (or a main path) is displayed inside the main screen as a sub-screen.

A stream or a data file, which contains audio or subtitle data, different from a main AV stream, is provided, and the playlist includes a main path and a sub-path. With this configuration, the user can select from streams contained in the main clip and the streams contained in the sub-clips different from the main clip when switching sound or subtitles.

In a play item in the main path, the stream number definition table defining the type of data multiplexed into an AV stream file and the type of data referred to by a sub-path is provided. Accordingly, streams having high extensibility can be implemented.

By referring to stream_attribute of STN_table( ), the playback apparatus 20 can sequentially select and play back streams only that can be played back by the playback apparatus 20.

The processing performed by the playback apparatus 20 can be summarized as follows.

The playback apparatus 20 obtains a playlist as playback management information. The playlist includes a main path, which is a playback path indicating the position of a main clip AV stream file containing at least one stream, and a plurality of sub-paths, each indicating the position of a sub-clip AV stream file played back in synchronization with the main stream file. Based on STN_table( ), the selection of a stream to be played back is received. On the basis of STN_table( ), which serves as information for selecting a predetermined stream (for example, audio stream #1) of the main clip AV stream file and a stream of the same type (for example, audio stream #2) of the main stream file, which is played back in synchronization with the main stream file, the selection of a stream to be played back is received.

In response to an instruction to select two streams (audio streams) of the same type, the playback apparatus 20 reads the files containing the selected two streams. The mixing processor 98 then combines the two audio streams and the mixing processor 97 (AV decoder 33) plays back (outputs) the combined streams.

With this operation, when two streams, i.e., audio 1 (A_SN=2) and audio 5 (A_SN2=2), are selected by the user, as shown in FIG. 32, the audio 1 and audio 5 can be mixed (combined) and played back.

In this manner, a playlist includes a main path and sub-paths, and the main path and sub-paths refer to different clips. Accordingly, streams having high extensibility can be implemented. Additionally, since one sub-path can refer to a plurality of files (for example, FIG. 8), the user can select from a plurality of different streams.

A play item of the main path includes the STN_table( ) discussed with reference to FIG. 14 as a table for defining data (for example, audio streams) multiplexed into an AV stream file referred to by the main path and data referred to by sub-paths. Thus, streams having high extensibility can be implemented. Additionally, sub-paths can be easily extended by entering additional data into STN_table( ).

Stream-attribute( ) shown in FIG. 16, which is stream attribute information, is provided in STN_table( ). This enables the playback apparatus 20 to determine whether it has a function of playing back a selected stream. By referring to stream_attribute( ), the playback apparatus 20 can select streams only that can be played back.

In STN_table( ) (FIG. 14), two stream files of the same type (in this case, audio stream files) are defined, and the playback apparatus 20 includes two audio decoders, i.e., the first audio decoder 75-1 and the second audio decoder 75-2, and the mixing processor 98 for mixing the decoded audio data. Thus, two streams of the same type can be combined and played back simultaneously.

A sub-path includes SubPath_type indicating the type of sub-path (such as audio or subtitles), as shown in FIG. 11, Clip_Information_file_name indicating the name of the sub-clip referred to by the sub-path, as shown in FIG. 12, and SubPlayItem_IN_time and SubPlayItem_OUT_time indicating the IN point and the OUT point of the clip referred to by the sub-path, as shown in FIG. 12. Accordingly, data referred to by the sub-path can be precisely specified.

The sub-path also includes sync_PlayItem_id (for example, sync_PlayItem_id shown in FIGS. 7 and 8), which is information for specifying the AV stream file on the main path so that the sub-path can be played back simultaneously with the main path, and sync_start_PTS_of_PlayItem (for example, sync_start_PTS_of_PlayItem in FIGS. 7 and 8), which is the time on the main path at which the IN point of the data referred to by the sub-path is started simultaneously on the time axis of the main path. Accordingly, data (file) referred to by the. sub-path can be played back, as shown in FIGS. 7 and 8, in synchronization with the main clip AV stream file referred to by the main path.

The data read by the storage drive 31 shown in FIG. 25 may be data recorded on a recording medium, such as a DVD, or an HDD, data downloaded via a network (not shown), or a combination of such data. For example, data may be played back based on a playlist and a clip including a sub-clip AV stream recorded on an HDD and a clip including a main clip AV stream recorded on a DVD. Alternatively, if a playlist referring to a clip recorded on a DVD as a clip containing a sub-clip AV stream and a clip containing a main clip AV stream are recorded on an HDD, based on the playlist recorded on the HDD, the main clip AV stream and the sub-clip AV stream may be read from the HDD and the DVD, respectively, and are played back.

To mix and play back two audio streams, the first audio decoder 75-1 decodes the audio stream #1, while the second audio decoder 75-2 decodes the audio stream #2. A determination may be made in step S54 in FIG. 29 or step S74 in FIG. 30 as to whether the coding type of the audio stream #1 and audio stream #2 is the same (from example, Dolby AC-3 audio in FIG. 17). The reason for this is as follows. If the coding type is the same, two streams which are in process of being decoded by the first audio decoder 75-1 and the second audio decoder 75-2 can be mixed by the mixing processor 98 since the data type of audio streams which are being decoded is the same.

In the above-described example, the audio stream #1 decoded by the first audio decoder 75-1 and the audio stream #2 decoded by the second audio decoder 75-2 can be selected separately by the user. Alternatively, combinations of audio streams #1 and audio streams #2 that can be mixed may be determined, and the user is instructed to select a combination of audio streams to be mixed. Two examples of this case are described below with reference to FIGS. 33 through 37.

The first example is discussed below. FIG. 33 illustrates a second example of the syntax of STN_table( ) (second STN_table( )) when combinations of audio streams #1 and audio streams #2 are defined. In FIG. 33, portions similar to those in FIG. 14 are not explained.

In the FOR loop of the audio stream ID2 (audio_stream_id2), audio_stream_id2 is assigned from 0 to one audio elementary stream specified for each stream entry( ). In this case, for audio_stream_id2, in addition to stream_entry( ) and stream_attributes( ), a new field, i.e., Combination_of_Primary_and_Secondary, is defined. Combination_of_Primary_and_Secondary is information for defining combinations of audio streams #1 (primary streams) and audio streams #2 (secondary streams). That is, information indicating which audio streams #1 can be combined with audio streams #2 represented by the audio stream ID2 (audio_stream_id2) is defined in the FOR loop of the audio stream ID2. In other words, audio streams #2 that can be combined with audio streams #1 can be defined in Combination_of_Primary_and_Secondary. Instead of defining audio streams ID2 to be combined with audio streams ID1 in the FOR loop of the audio streams ID1, audio streams ID1 and audio streams ID2 are defined separately, and combination of audio streams #1 and audio streams #2 are defined in the FOR loop of the audio streams ID2. With this configuration, even if the number of audio streams ID1 to be registered is fixed, combinations of audio streams ID1 with audio streams ID2 do not count toward the number of registrations. Thus, the number of audio streams that can be registered can be used effectively.

As described with reference to FIG. 14, instead of the audio stream ID2 (audio_stream_id2), the audio stream number 2 (audio_stream_number2) may be used, in which case, audio_stream_number 2 is assigned from 1. That is, the number obtained by adding one to audio_stream_id2 is audio_stream_number2. The number is assigned from 1 since the audio stream number 2 is the number that can be seen from the user when switching sound.

An example of the bitmap syntax of Combination_of_Primary_and_Secondary shown in FIG. 33 is described below with reference to FIG. 34.

The bitmap syntax of Combination_of_Primary_and_Secondary shown in FIG. 34 is 32 bits. In FIG. 34, audio_stream_id indicates the audio_stream_id (audio stream ID) defined in the fourth STN_table( ) in FIG. 33, and the indicator designates a flag indicating audio_stream_id specifying the audio stream #1 that can be combined with the audio stream #2 specified by the corresponding audio_stream_id2 (audio stream ID2). That is, by a combination of audio_stream_id and indicator, audio_stream_id of the audio stream #1 that can be combined with the audio stream #2 represented by audio_stream_id2 can be specified.

As Combination_of_Primary_and_Secondary specified in the FOR loop of audio_stream_id2 in FIG. 33, Combination_of_Primary_and_Secondary is defined for each audio_stream_id2, and the audio stream #1 that can be combined with a certain audio stream #2 represented by audio_stream_id2 can be specified by audio_stream_id designated by the indicator.

More specifically, if the indicator is 0, the corresponding audio_stream_id2 is not associated with the audio stream #1 specified by audio_stream_id. If the indicator is 1, the corresponding audio_stream_id2 is associated with the audio stream #1 specified by audio_stream_id.

FIG. 34 shows that two audio streams (audio streams #1) specified by audio_stream_id=0 and audio_stream_id=1 can be combined with the audio stream #2 specified by audio_stream_id2 (audio stream ID2).

Although in FIG. 34 the audio stream #1 is specified by audio_stream_id, the audio stream number may be used, in which case, the audio stream number is assigned from 1.

Since Combination_of_Primary_and_Secondary is defined by the 32-bit bitmap syntax, as shown in FIG. 34, an audio stream #2 can be defined for each of the 32 audio streams #1.

According to FIGS. 33 and 34, combinations of audio streams #1 and audio streams #2 can be defined by using audio_stream_id, audio_stream_id2, and Combination_of_Primary_and_Secondary. That is, the user can select a combination of audio streams that can typically be played back without selecting inconsistent combinations.

A specific example is discussed below with reference to FIG. 35 illustrating an example of a stream number table indicating audio stream numbers and subtitle stream numbers. A description of subtitle stream numbers (sub-pictures) is similar to that in FIG. 24, and an explanation thereof is thus omitted.

In FIG. 35, each of the audio streams #1 (audio streams specified by audio_stream_id) entered in the STN_table( ) of PlayItem( ) forming the main path of a playlist is provided with A_SN.

More specifically, audio 2 is assigned to A_SN=1, audio 1 is assigned to A_SN=2, and audio 3 is assigned to A_SN=3.

In this case, audio 4 (audio_stream_id2=0, i.e., audio stream number 2 is 1) can be combined with audio 2 associated with A_SN=1. Audio 4 (audio_stream_id2=1, i.e., audio stream number 2 is 1) and audio 5 (audio_stream_id2=1, i.e., audio stream number 2 is 2) can be combined with audio 1 associated with A_SN=2.

More specifically, for audio 4 (audio_stream_id2=0), in the bitmap syntax of Combination_of_Primary_and_Secondary in FIG. 34, the indicator values for audio_stream_id=0 and audio_stream_id=1 are 1, and the indicator values for audio_stream_id=2 through audio_stream_id=31 are all 0. For audio 5 (audio_stream_id2=1), in the bitmap syntax of Combination_of_Primary-and_Secondary in FIG. 34, the indicator value for audio_stream_id=1 is 1, and the indicator values for audio_stream_id=0, and audio_stream_id=2 through audio_stream_id=31 are all 0.

The user selects audio stream #1 to be played back from audio streams provided with A_SN, and selects audio stream #2 from audio streams indicated at the right side in FIG. 35. In the example in FIG. 35, if the user selects audio 2 (A_SN=1) as the audio stream #1, the audio stream #2 that can be mixed with the audio stream #1 is only audio 4, and thus, the user determines whether to select audio 4 to be combined with audio 2. In FIG. 35, audio 4 associated with audio 2 is indicated by X, which means that it is not combined with audio 2. If it is switched to O, audio 4 can be combined with audio 2.

In FIG. 35, if the user selects audio 1 (A_SN=2) as audio stream #1, the audio stream #2 that can be mixed with audio #1 can be selected from audio 4 and audio 5 indicated at the right side in FIG. 35. Accordingly, the user determines whether to select audio 4 or audio 5. In FIG. 35, audio 4 and audio 5 associated with audio 1 are indicated by X, which means that neither of them is combined with audio 1. If one of them is switched to O, audio 4 or audio 5 can be combined with audio 1.

A specific example of an instruction to select audio streams is given below. If the user gives an instruction to switch audio streams while selecting audio 2 associated with A_SN=1, the playback operation is switched to a combination of audio 2 and audio 4 (audio 4 is changed to O in FIG. 35). If the user further gives an instruction to switch audio streams, the playback operation is switched to audio 1 associated with A_SN=2 (audio 4 is changed to X in FIG. 35). If the user further gives an instruction to switch audio streams, the playback operation is switched to a combination of audio 1 and audio 4 (audio 4 is changed to O). If the user further gives an instruction to switch audio streams, the playback operation is switched to a combination of audio 1 and audio 5 (audio 4 is changed to X and audio 5 is changed to O in FIG. 35).

By switching the selection of audio streams to be played back, the user can select a combination of audio 1 associated with A_SN=2 and audio 5, as shown in FIG. 36. Accordingly, audio 1 (audio stream #1) and audio 5 (audio stream #2) can be mixed and played back.

By using audio_stream_id, audio_stream_id2, and Combination_of_Primary_and_Secondary, a combination of audio stream #1 and audio stream #2 can be defined. This enables the user to select a combination of audio streams that can typically be played back without selecting inconsistent combinations. That is, in the example in FIG. 35, the user can select audio streams without selecting an inconsistent combination, such as audio 2 and audio 5.

In other words, in the second STN_table( ) (FIG. 33) in PlayItem( ), a combination of the audio stream #1 decoded by the first audio decoder 75-1 and the audio stream #2 decoded by the second audio decoder 75-2 shown in FIG. 25 can be defined by using Combination_of_Primary_and_Secondary. Accordingly, two audio streams can be mixed and played back. That is, from a plurality of types of streams, streams of the same type (in this case, audio streams) can be mixed (combined or superimposed) and played back simultaneously.

With this configuration, the user can select audio streams from a predetermined combination without the need to individually select two audio streams.

A description is now given, with reference to FIG. 37, a second example in which the user is instructed to select a combination of audio stream #1 and audio stream #2 from defined combinations. In other words, FIG. 37 shows a second example in which audio streams that can be mixed with audio streams #1 are defined as audio streams #2.

FIG. 37 illustrates a third example of the syntax of STN_table( ) (third STN_table( )) for defining combinations of audio streams #1 and audio streams #2. In FIG. 37, portions similar to those in FIG. 14 or 33 not explained.

In FIG. 37, in the FOR loop of the audio stream ID2 (audio_stream_id2), audio_stream_id2 is assigned from 0 to one audio elementary stream whose recording position is specified for each stream_entry( ). In this case, number_of_combinations is defined for audio stream_id2, and in the FOR statement after number_of_combinations, the same number of audio_stream_id as the number of number_of_combinations is given. The number_of_combinations and the FOR statement after number_of_combinations are information for defining combinations of audio streams #1 and audio streams #2, and the number of audio streams #1 that can be combined with the audio streams #2 specified by audio_stream_id2 is the number_of_combinations. The audio_stream_id specifying the audio streams #1 that can be combined with the audio streams #2 specified by the audio_stream_id2 is defined in the FOR statement after number_of_combinations.

That is, unlike the fourth STN_table( ) in FIG. 33, in the FOR statement of audio stream ID2 (audio_stream_id2) in the third STN_table( ) in FIG. 37, the number of audio streams #1 that can be combined with the audio streams #2 specified by the audio stream ID2 is defined by number_of_combinations, and in the FOR statement after number_of_combinations, audio_stream_id specifying the audio streams #1 is directly defined.

In this manner, in the third STN_table( ), information indicating which audio streams #1 are combined with the audio streams #2 specified by the audio stream ID2 (audio_stream_id2) is defined in the FOR statement after number_of_combinations of the audio stream ID2. In other words, in the FOR statement after number_of_combinations of the audio stream ID2, the audio streams #2 that can be combined with the audio streams #1 are defined.

As discussed with reference to FIG. 14 or 33, instead of the audio stream ID2 (audio_stream_id2), the audio stream number 2 (audio_stream_number2) may be used. Instead of the audio stream number 2 (audio_stream_id), the audio stream number (audio_stream_number) may be used. That is, the audio stream number may substitute the audio_stream_id defined in the FOR statement after number_of_combinations.

In FIG. 37, by using number_of_combinations and the subsequent FOR statement, combinations of audio streams #1 and audio streams #2 can be defined. That is, the user can select a combination of audio streams that can typically be played back without selecting inconsistent combinations.

A specific example of the stream number table is similar to that discussed with reference to FIGS. 35 and 36.

If the stream number table shown in FIG. 35 is applied to the third STN_table( ) in FIG. 37, as the audio streams #1 that can be combined with audio 4 (audio_stream_id2=0, i.e., audio stream number 2 is 1), audio 2 (audio_stream_id=0) associated with A_SN=1 and audio 1 (audio_stream_id=1) associated with A_SN=2 are defined. In this case, the number_of_combinations corresponding to audio_stream_id2=0 is 2, and the defined audio_stream_id is audio_stream_id=0 and audio_stream_id=1. Also, as the audio streams #1 that can be combined with audio 5 (audio_stream_id2=1, i.e., audio stream number 2 is 2), audio 1 (audio_stream_id=1) associated with A_SN=2 is defined. In this case, the number_of_combinations corresponding to audio_stream_id2=1 is 1, and the defined audio_stream_id is audio_stream_id=1.

By switching audio streams to be played back shown in FIG. 35, the user selects, for example, a combination of audio 1 and audio 5 associated with A_SN=2, as shown in FIG. 36. Then, the audio 1 (audio stream #1) and audio 5 (audio stream #2) can be mixed and played back.

As described above, by using number_of_combinations and the subsequent FOR statement, combinations of audio streams #1 and audio streams #2 can be defined. Then, the user can select a combination of audio streams that can typically be played back without selecting inconsistent selections. For example, in FIG. 35, an inconsistent combination, e.g., audio 2 and audio 5, is not defined.

In other words, in the third STN_table( ) (FIG. 37) in PlayItem( ), combinations of audio streams #1 decoded by the first audio decoder 75-1 and audio streams #2 decoded by the second audio decoder 75-2 are defined in number_of_combinations and the subsequent FOR statement. Thus, two audio streams can be mixed and played back. That is, from a plurality of types of streams, streams of the same type (in this case, audio streams) can be mixed (combined or superimposed) and played back simultaneously.

By using the third STN_table( ), the user can select audio streams to be played back from a predetermined combination without the need to individually select two audio streams.

FIG. 38 illustrates a fourth example of the syntax of STN_table( ) (fourth STN_table( )) defining combinations of audio streams #1 and audio streams #2. In FIG. 38, portions similar to those in FIG. 14, 33, or 37 are not explained.

In the FOR loop of the audio stream ID (audio_stream_id) in FIG. 38, audio_stream id is assigned from 0 to one audio stream #1 specified for each stream_entry( ), as in the first STN_table( ) shown in FIG. 14. The stream_attributes( ) after the FOR loop of the audio stream ID is similar to that in the third STN_table( ) in FIG. 14.

In the fourth STN_table( ) in FIG. 38, however, the following information for defining combinations of audio streams #1 and audio streams #2 is included in the FOR loop of the audio stream ID (audio_stream_id). If number_of_audio_stream2_entries is not 0 (if (number_of_audio_stream2_entries!=0), number_of audio stream2_ref_entries is given. The number_of_audio_stream2_ref_entries indicates the number of audio streams #2 that can be combined with the audio streams #1 specified by audio_stream_id. The audio_stream2_id_ref specifying the audio streams #2 that can be combined with the stream #1 is defined after the FOR statement of number_of_audio_stream2_ref_entries.

As in the other examples of STN_table( ), the audio stream number 2 ref (audio_stream_number2_ref) may be used instead of the audio stream ID2 ref (audio_stream_id2_ref), and the audio stream number (audio_stream_number) may be used instead of the audio stream ID (audio_stream_id).

In this manner, combinations of the audio streams #1 and the audio streams #2 can be defined by referring to the fourth STN_table( ) in FIG. 38. Accordingly, the user can select a combination of audio streams that can typically be played back without selecting inconsistent audio streams.

As stated above, an application format of data recorded on a recording medium installed in the playback apparatus of an embodiment of the present invention is formed of two layers, i.e., a playlist layer and a clip layer. The playlist includes a main path having at least one play item (sequential if there are more than one), and at least one sub-path having at least one sub-play item (may be sequential or non-sequential if there are more than one) disposed in parallel with the main path.

With this configuration, as shown in FIG. 39, content, such as a movie, corresponding to AV streams (a video stream 311 indicated by primary video in FIG. 39 and an audio stream 312 indicated by primary audio in FIG. 39) referred to by the main path can be played back in a main screen 301, and content different from the AV streams referred to by the main path, for example, director's commentaries on the movie (a video stream 313 indicated by secondary video in FIG. 39 and an audio stream 314 indicated by secondary audio in FIG. 39) corresponding to AV streams referred to by a sub-path, can be played back in a sub-screen 302 contained in the main screen 301.

That is, different content items can be simultaneously played back in the main screen 301 and the sub-screen 302.

This technique is referred to as the "picture-in-picture" technique.

The sound corresponding to the audio stream (primary audio) 312 and the sound corresponding to the audio stream (secondary audio) 314 can be mixed and played back, as discussed above.

The real subject to be played back is sound or images corresponding to streams, as stated above. For the sake of simple description, however, it may be said that "a predetermined stream is played back" in the following description.

To implement an application using the picture-in-picture technique, the following syntax, for example, is necessary. In this embodiment, the number of video streams (hereinafter referred to as "primary video streams", for example, the video stream 311 shown in FIG. 39 is referred to as the "primary video stream") defined by video_stream_id in STN_table( ) shown in FIGS. 40 and 41 is one. By considering this fact, if a syntax defining combinations of streams that can be played back simultaneously with the primary video stream is prepared, the picture-in-picture technique, i.e., an application using the picture-in-picture technique, can be implemented.

In this embodiment, as the streams that can be played back simultaneously with the primary video stream by the picture-in-picture technique, the following four streams, i.e., the first through fourth types of streams, are prepared.

The streams of the first type are audio streams defined by audio_stream_id in STN_table( ) shown in FIGS. 40 and 41, that is, the above-described audio streams #1 (hereinafter referred to as "primary audio streams", for example, the audio stream 312 shown in FIG. 39 is referred to as the "primary audio stream").

The streams of the second type are video streams defined by video_stream_id2 in STN_table( ) shown in FIGS. 40 and 41 (hereinafter referred to as "secondary video streams", for example, the video stream 313 shown in FIG. 39 is referred to as the "secondary video stream").

The streams of the third type are audio streams defined by audio_stream_id2 in STN_table( ) shown in FIGS. 40 and 41, that is, the above-described audio streams #2, (hereinafter referred to as "secondary audio streams", for example, the audio stream 314 shown in FIG. 39 is referred to as the "secondary audio stream").

The streams of the fourth type are text subtitle streams (txtST) or streams (PG and presentation graphics streams) obtained by run-length-coding bitmap subtitles, such as DVD sub-pictures, referred to by a sub-path. For example, a subtitle stream 315 in FIG. 39 is an example of the streams of the fourth type. The streams of the fourth type (txtST and PG) are referred to as "subtitle streams". It is not necessary that subtitle streams be displayed in the sub-screen, and may be displayed at any position in the main screen. Accordingly, the subtitle stream 315 is outside the sub-screen 302 in FIG. 39.

As discussed above, to implement an application using the picture-in-picture technique, it is necessary to define combinations of streams, i.e., secondary video streams, primary audio streams, secondary audio streams, and subtitle streams, that can be played back simultaneously with a primary video stream.

By defining a plurality of combinations, not only the primary video stream 311 or the primary audio stream 312 displayed on the main screen 301, secondary video streams or subtitle streams displayed in the sub-screen 302 can be easily switched. An example of the switching operation is discussed below with reference to FIGS. 42 and 43.

The definition of combinations of streams that can be played back simultaneously with a primary video stream can be provided in, for example, a fifth STN_table( ) shown in FIGS. 40 and 41. FIGS. 40 and 41 illustrate a fifth example of the syntax of STN_table( ) (fifth STN_table( )) for defining combinations of secondary video streams, primary audio streams, secondary audio streams, and subtitle streams that can be played back together with a primary video stream. In FIGS. 40 and 41, portions similar to those of the other examples of STN_table( ) are not explained.

In the example shown in FIGS. 40 and 41, combinations of secondary video streams, primary audio streams, secondary audio streams, and subtitle streams that can be played back together with a primary video stream are defined as follows. First, at least one secondary video stream that can be played back simultaneously with the primary video stream is defined. Then, audio streams (primary audio streams and secondary audio streams) and subtitle streams that can be played back simultaneously with each of the secondary video streams are defined.

More specifically, in FIG. 40, number_of_video_stream2_entries indicates the number of streams provided with video_stream_id2 and entered (registered) in the fifth STN_table( ). The video_stream_id2 is information for identifying secondary video streams, and video_stream_number2 is the secondary video stream number that can be seen from the user when switching video.

In FIG. 41, in the FOR loop of the video stream ID2 (video_stream_id2), video_stream_id2 is assigned from 0 to one secondary video elementary stream (serves as a secondary video stream) specified for each stream_entry( ).

For video_stream_id2, the number_of_Audio_combinations_for_video2 is provided. In the subsequent FOR statement, the same number of audio_stream_id and audio_stream_id2 as that of number_of_Audio_combinations_for_video2 are provided. The number_of_Audio_combinations_for_video2 and the subsequent FOR statement serve as information for defining combinations of primary audio streams specified by audio_stream_id and the secondary audio streams specified by audio_stream_id2 that can be played back simultaneously with the second video stream. The number of audio streams (primary audio streams and secondary audio streams) that can be combined with the secondary video stream specified by video_stream_id2 is number_of_Audio_combinations_for_video2. Then, in the FOR statement after number_of_Audio_combinations_for_video2, audio_stream_id specifying the primary audio streams and audio_stream_id2 specifying the secondary audio streams that can be combined with the secondary video stream are defined.

For the same video_stream_id2, number_of_Subtitle_combinations_for_video2 is provided. In the subsequent FOR statement, the same number of PG_textST_stream_id as the number of number_of_Subtitle_combinations for_video2 are provided. The number_of_Subtitle_combinations_ for_video2 and the subsequent FOR statement serve as information for defining combinations of subtitle streams that can be played back simultaneously with the secondary video stream. The number of subtitle streams that can be combined with the secondary video stream specified by video_stream_id2 is number_of_Subtitle_combinations_for video2. Then, in the FOR statement after number_of_Subtitle_combinations_for_video2, PG_textST_stream_id specifying subtitle streams that can be combined with the secondary video stream specified by video_stream_id2 is defined.

As in the other examples of STN_table( ), the audio stream number (audio_stream_number) may be used instead of audio stream_id, and the audio stream number 2 may be used instead of audio_stream_id2. The same applies to video streams and subtitle streams.

According to the fifth STN_table( ) shown in FIGS. 40 and 41, secondary video streams that can be played back together with the primary video stream can be defined by video_stream_id2. Then, by using video_stream_id2, audio_stream_id, audio_stream_id2, and PG_textST_stream_id, primary audio streams, secondary audio streams, and subtitle audio streams that can be played back simultaneously with each of the secondary video streams can be defined. That is, combinations of the secondary video streams, primary audio streams, secondary audio streams, and subtitle audio streams that can be played back simultaneously with the primary video stream can be defined.

With this configuration, inconsistent combinations of the primary video stream and secondary video streams, primary audio streams, secondary audio streams, and subtitle audio streams that can be played back simultaneously with the primary video stream are not defined. Accordingly, the user can easily select a stream that can be combined with the primary video stream.

A specific example is described below with reference to FIGS. 42 and 43. FIG. 42 illustrates a stream number table, provided to users, indicating combinations of sound numbers (audio signals) associated with primary audio streams or secondary audio streams, video numbers (video signals) associated with secondary video streams, and subtitle numbers (subtitle signals) associated with subtitle streams when the fifth STN_table( ) shown in FIGS. 40 and 41 is used. The sound numbers and subtitle numbers are similar to those discussed with reference to FIG. 24 or 35, and an explanation thereof is thus omitted.

In FIG. 42, each of the secondary video streams specified by video_stream_id2 entered in the fifth STN_table( ) of a play item forming the main path of the playlist is provided with V2_SN (video2 stream number (secondary video stream number)).

More specifically, video 2 is assigned to V2_SN=1, and video 1 is assigned to V2_SN=2.

In this case, for video 2 associated with V2_SN=1, audio 2 (primary audio stream entered in audio_stream_id in the FOR statement when video_stream_id2 specifies video 2 in FIG. 41) as a primary audio stream, audio 4 (secondary audio stream entered in audio_stream_id2 in the FOR statement when video_stream_id2 specifies video 2 in FIG. 41) as a secondary audio stream, and sub-picture 3 (subtitle stream entered in PG_textST_stream_id in the FOR statement when video_stream_id2 specifies video 2 in FIG. 41) as a subtitle stream can be combined.

For video 1 associated with V2_SN=2, audio 1 (primary audio stream entered in audio_stream_id in the FOR statement when video_stream_id2 specifies video 1 in FIG. 41) as a primary audio stream, audio 4 or audio 5 (each of secondary audio streams entered in audio_stream_id2 in the FOR statement when video_stream_id2 specifies video 1 in FIG. 41) as a secondary audio stream, and sub-picture 1 (subtitle stream entered in PG_textST_stream_id in the FOR statement when video_stream_id2 specifies video 1 in FIG. 41) as a subtitle stream can be combined.

In the FOR statement when video_stream_id2 is video 1 in FIG. 41, a first combination and a second combination are defined as combinations of audio streams that can be played back simultaneously with video 1 associated with V2_SN=2. The first combination is audio 1 as the primary audio stream and audio 4 as the secondary audio stream. The second combination is audio 1 as the primary audio stream and audio 5 as the secondary audio stream.

When the stream number table shown in FIG. 42 is provided (how to provide to the user is not restricted), the user first selects one of video 2 (VS_SN=1) or video 1 (VS_SN=2) as the secondary video stream associated with video, for example, director's commentaries that are played back simultaneously with a movie, as the secondary video stream corresponding to video displayed on the sub-screen (sub-screen 302 in FIG. 39).

If, for example, the video 2 (VS_SN=1) is selected as the secondary video stream, the combination of primary and secondary audio streams and subtitle streams that can be played back at the same time with video 2 is, as shown in FIG. 42, the combination of audio 2, audio 4, and sub-picture 3 only. Accordingly, when video 2 (VS_SN=1) is selected as the secondary video stream, the user does not perform selection any further.

Figure 43:
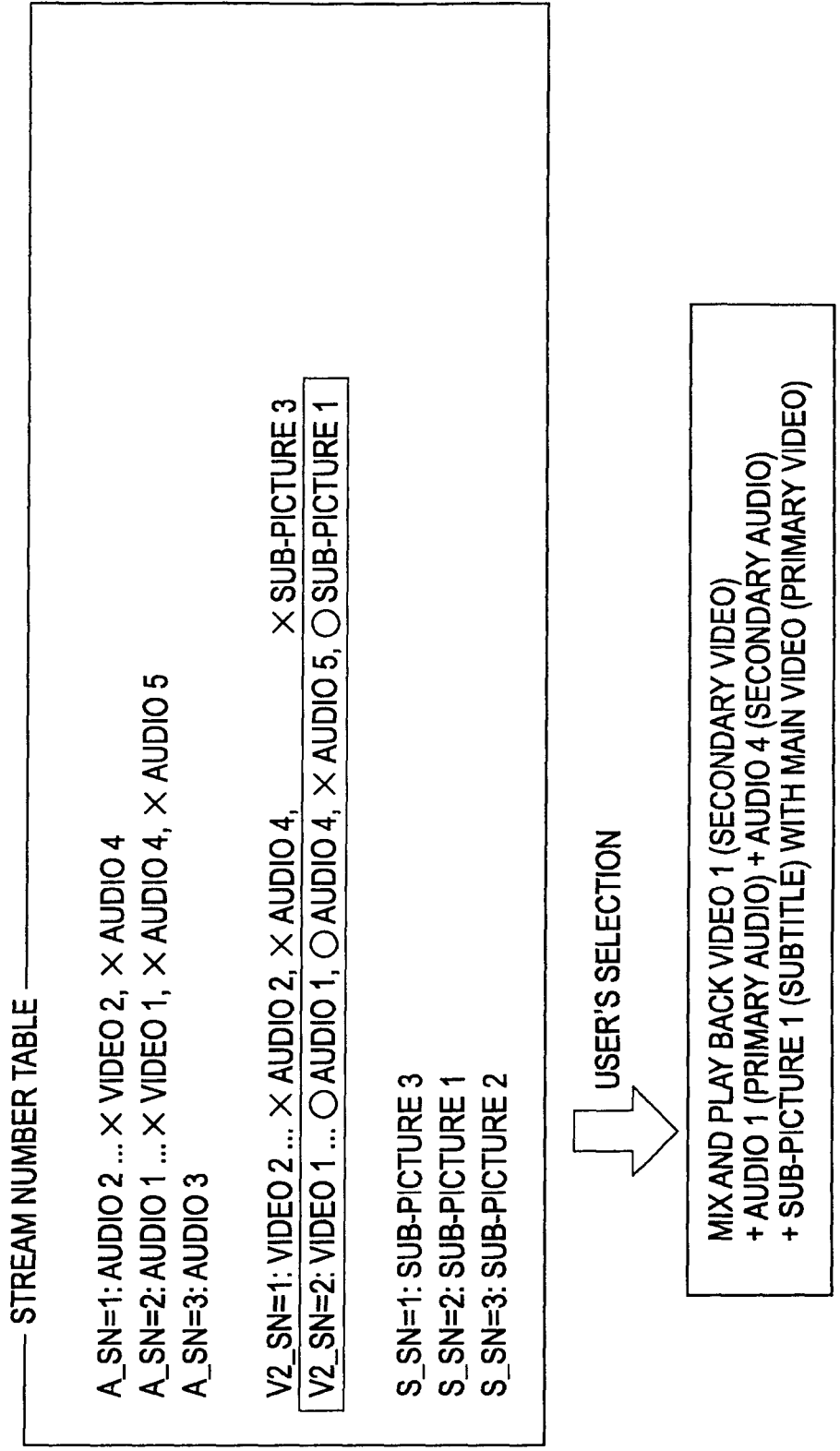
FIG. 43 illustrates a user selection operation for selecting a combination of a secondary video stream, a primary audio stream, a secondary audio stream, and a subtitle stream that can be played back together with a primary video stream.

On the other hand, if, for example, video 1 (VS_SN=2), is selected as the secondary video stream, as the combinations of primary and secondary audio streams and subtitle streams that can be played back at the same time with video 1 is, as shown in FIG. 43, there are two combinations, i.e., a first combination of audio 1, audio 4, sub-picture 1 and a second combination of audio 1, audio 5, and sub-picture 1. Accordingly, when video 1 (VS_SN=2) is selected, the user can select one of the first combination and the second combination.

More specifically, in a manner similar to the selection operation discussed with reference to FIG. 35, when the user selects a stream to be played back simultaneously with video 1 (VS_SN=2), the user changes the symbol X to O, and when the user does not select that stream, the user maintains the symbol X. As discussed with reference to FIG. 35, O is a symbol indicating that the user has selected the corresponding stream to be played back, and X is a symbol indicating that the user has not selected the corresponding stream to be played back.

FIG. 43 illustrates an example in which the first combination of audio 1, audio 4, and sub-picture 1 has been selected. More specifically, since audio 1 is selected, as shown in FIG. 43, as the primary audio stream that is played back simultaneously with video 1 (V2_SN=2), the selection state of audio 1 is changed from X to O. Since audio 4 is selected as the secondary audio stream that is played back simultaneously with video 1, the selection state of audio 4 is changed from X to O. In contrast, audio 5 is not selected, the selection state of audio 5 is maintained at X. Since sub-picture 1 is selected as the subtitle stream that is played back simultaneously with video 1, the selection state of sub-picture 1 is changed from X to O.

According to the above-described series of selection operations, video 1, audio 1, audio 4, and sub-picture 1 are selected and are ready to be played back with the main video (primary video stream).

In the above-described example, as the selection operation for streams that can be played back simultaneously with a primary video stream, a secondary video stream is selected first, and then, a primary audio stream, a secondary audio stream, and a subtitle stream are selected based on the secondary video stream.

However, the selection operation is not restricted to the above type. For example, a primary audio stream may be selected first, and then, a secondary video stream, a secondary audio stream, and a subtitle stream may be selected. More specifically, in the stream number table shown in FIG. 43, audio 2 associated with A_SN=1, audio 1 associated with A_SN=2, or audio 3 associated with A_SN=3 is first selected as the primary audio stream, and then, a secondary video stream, a secondary audio stream, and a subtitle stream may be selected, as in the selection operation discussed with reference to FIG. 35.

Alternatively, a subtitle stream may be selected first, and then, a primary audio stream, a secondary video stream, and a secondary audio stream may be selected. More specifically, in the stream number table shown in FIG. 43, sub-picture 3 associated with S SN=1, sub-picture 1 associated with S_SN=2, or sub-picture 2 associated with S_SN=3 is first selected as the subtitle stream, and then, a secondary video stream, a primary audio stream, and a secondary audio stream are selected although this selection operation is not shown in FIG. 43.

In this embodiment, the user is prohibited to switch secondary audio streams. Accordingly, in the example in FIG. 43, the secondary audio streams are not provided with A_SN. That is, audio 1, audio 2, and audio 3 are used as primary audio streams, and audio 4 and audio 5 are used as secondary audio streams.

Figure 44:
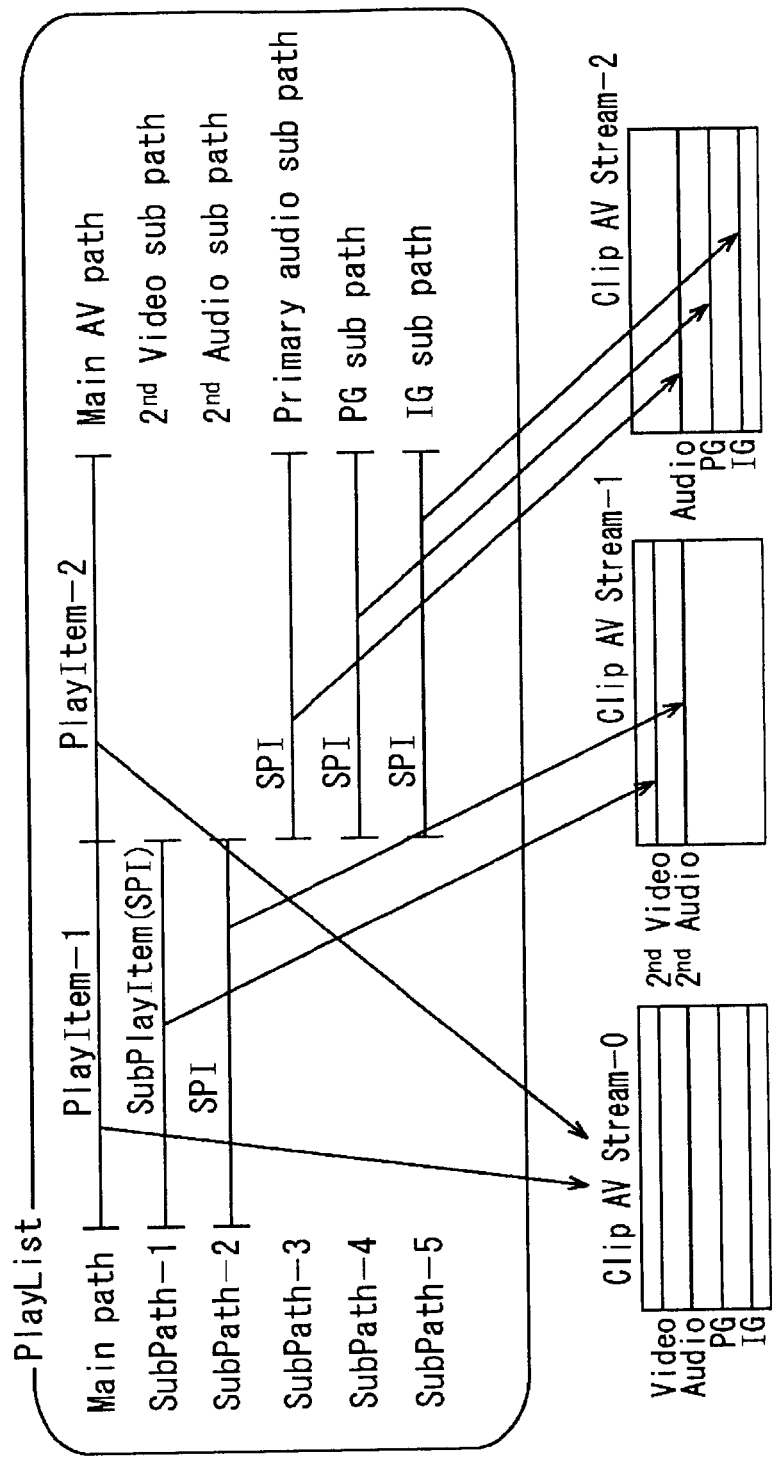
FIG. 44 illustrates a playlist generated by using SubPath_type shown in FIG. 11 to implement the picture-in-picture technique.

If the picture-in-picture technique is implemented by using the syntax of the fifth STN_table( ) shown in FIGS. 40 and 41, a playlist shown in FIG. 44 can be generated if Subpath_type shown in FIG. 11 is used.

In FIG. 44, a video stream and an audio stream included in a clip AV stream-0 (main clip AV stream) referred to by play item 1 (PlayItem-1) forming the main path are used as the primary video stream and the primary audio stream, respectively. In the example in FIG. 39, the video stream and the audio stream contained in the clip AV stream-0 are the primary video stream 311 and the primary audio stream 312, respectively. The primary video stream 311 is played back in the main screen 301, and at the same time, the primary audio stream 312 is played back (output).

A secondary video stream contained in a clip AV stream-1 (sub-clip AV stream) referred to by a sub-play item (SPI) contained in sub-path 1 is used as the secondary video stream, and a secondary audio stream contained in the clip AV stream-1 (sub-clip AV stream) referred to by a sub-play item (SPI) contained in sub-path 2 is used as the secondary audio stream. In the example in FIG. 39, the secondary video stream and the secondary audio stream contained in the main clip AV stream-1 are the secondary video stream 313 and the secondary audio stream 314, respectively. The secondary video stream 313 is played back in the sub-screen 302, and at the same time, the secondary audio stream 314 is played back (output).

Playing back the primary audio stream contained in the main clip AV stream-0 in the main screen 301 and playing back the secondary audio stream contained in the sub-clip AV stream-1 in the sub-screen 302 means that the two audio streams are mixed and played back, as described above.

As described above, in the example in FIG. 44, the example shown FIG. 11 is used as SubPath_type, and as a result, the picture-in-picture technique is implemented by the main path, sub-path 1, and sub-path 2.

In the example in FIG. 44, the secondary video stream and the secondary audio stream that are played back simultaneously with the primary video stream contained in the main clip AV stream-0 are defined by different sub-paths, i.e., the sub-path 1 and sub-path 2, even though they are contained in the same clip AV stream-1. This is because, in FIG. 11, only sub-path types indicating that only one elementary stream (ES) can be referred to by each sub-path are prepared. That is, in SubPath_type in FIG. 11, one sub-path type is assigned to each ES of a plurality of ESs, such as audio, IG, text, and video ESs, regardless of whether they are contained in the same clip AV stream file.

Accordingly, by the use of SubPath_type shown in FIG. 11, if there are two or more ESs to be played back, such ESs are referred to by different sub-paths, i.e., they are defined as different sub-play items.

In this case, the two or more ESs should define certain information, such as SubPlayItem_IN_time and SubPlayItem_OUT_time, separately from each other even though such information is the same since they are contained in the same clip AV stream file. As a result, the information, such as SubPlayItem_IN_time and SubPlayItem_OUT_time, becomes redundant.

Additionally, a sub-path should be defined for each elementary path to be played back, which makes the structure of the playlist complicated.

Moreover, in this embodiment, a restriction is imposed on the playback apparatus (playback apparatus 20 shown in FIG. 25 or playback apparatus 401 shown in FIG. 49) such that it can read only two transport streams (TSs) (i.e., TSs contained in two clips) simultaneously. Under this restriction, when playing back a playlist having a complicated structure, the playback apparatus cannot decide immediately which sub-path should be combined with the main path defined in the playlist. In other words, to decide a combination of the main path and a sub-path, processing becomes complicated.

Accordingly, to solve the above-described problems, in an embodiment of the present invention, a sub-path type that allows a plurality of ESs to be handled, i.e., that allows a plurality of ESs to be referred to at the same time, is added as SubPath_type. An example of such SubPath_type is shown in FIG. 45.

That is, in the example in FIG. 45, sub-path types that can solve the above-described problems are added to the sub-path types shown in FIG. 11.

In FIG. 45, SubPath_type=0 through SubPath_type=4 are the same as those of FIG. 11, and an explanation thereof is thus omitted.

However, in the meaning of SubPath_type=2 through SubPath_type=4 in FIG. 45, "out-of-mux", which is not explained in FIG. 11, is contained. The "out-of-mux" means that a TS containing the ES referred to by a sub-path is different from a TS containing the ES referred to by the main path, that is, the ES referred to by a sub-path is not multiplexed into the TS contained in a play item referred to by the main path. Such a sub-path type is referred to as a "main-path-TS non-multiplexed type".

As in SubPath_type=2 or 3, when the ES referred to by the main path is not synchronized with the ES referred to by a sub-path, such a sub-path type is hereinafter referred to as an "AV non-synchronized type". On the other hand, as in SubPath_type=4 or 5, when the ES referred to by the main path is synchronized with the ES referred to by a sub-path, such a sub-path type is hereinafter referred to as an "AV synchronized type".

SubPath_type=5 indicates "out-of-mux and AV synchronized type of one or more elementary streams path (primary audio/PG/IG/secondary audio path)" and "out-of-mux and AV synchronized type of picture-in-picture presentation path which contains one or more elementary stream paths". That is, SubPath_type=5 is the main-path-TS non-multiplexed type and AV synchronized type of at least one elementary stream path (primary audio/PG/IG/secondary audio path) or a picture-in-picture presentation path.

That is, SubPath_type=5 encompasses the types indicated by SubPath_type=5 and SubPath_type=6 shown in FIG. 11, and thus includes the secondary audio presentation path (path for referring to the secondary audio stream) and the secondary video presentation path (path for referring to the secondary video stream).

The picture-in-picture presentation path includes at least one path referring to a primary audio stream, a secondary video stream, a secondary audio stream, and a subtitle stream that is combined with a predetermined video stream.

SubPath_type=6 indicates "out-of-mux and AV non-synchronized type of picture-in-picture presentation path which contains one or more elementary stream paths". That is, SubPath_type=6 is the main-path-TS non-multiplexed type and AV non-synchronized type of a picture-in-picture presentation path (including at least one ES).

SubPath_type=7 indicates "in-mux type and AV synchronized type of picture-in-picture presentation path which contains one or more elementary stream paths". In this case, "in-mux" indicates that a TS containing the ES referred to by a sub-path is the same sub-path type as a TS containing at least one ES referred to by the main path. In other words, the main clip AV stream and a sub-clip AV stream are contained in the main TS included in the main clip. Such a type is referred to as the "main-path-TS multiplexed type".

That is, SubPath_type=7 is the main-path-TS multiplexed type and AV synchronized type of a picture-in-picture path (including at least one ES).

SubPath_type=8 through SubPath_type=255 are reserved.

In SubPath_type shown in FIG. 45, new types, i.e., SubPath_type=5, 6, and 7 can be used. In SubPath_type=7, the main TS referred to by the play item, i.e., the main clip AV stream, includes a sub TS referred to by a sub-path. Accordingly, instead of stream_entry( ) discussed with reference to FIG. 15, the second stream_entry( ) shown in FIG. 46 in which type=3 is defined.

Type=3 defined in the second stream_entry( ) is used for identifying an elementary stream referred to by a sub-path and contained in the main clip when SubPath_type=7.

In FIG. 46, portions similar to those in FIG. 15 are not explained.

When type=3, a sub-path refers to the same clip as that referred by the main path, in other words, a plurality of elementary streams are multiplexed into the main clip, and both the main path and sub-path refer to one of the elementary streams. In this case, when SubPath_type=7, for specifying the elementary stream referred to by the sub-path from the plurality of elementary streams multiplexed into the main clip, the PID of the main clip is designated by ref_to_stream_PID_of_MainClip. Then, SubPath_id is specified by ref_to_SubPath_id, and the sub-path defined in PlayList( ) shown in FIG. 9 is specified by SubPath_id. The corresponding sub-play item (FIG. 10) is called from the sub-path so that the playback time of the elementary stream (IN_time and OUT_time) can be specified (FIG. 12).

As discussed above, by using the three types (type 1 through type 3), when a play item and at least one sub-path played back in association with the play item are provided, one elementary stream can be specified from the clip referred to by the play item even when the clip is also referred to by the sub-path.

Figure 47:
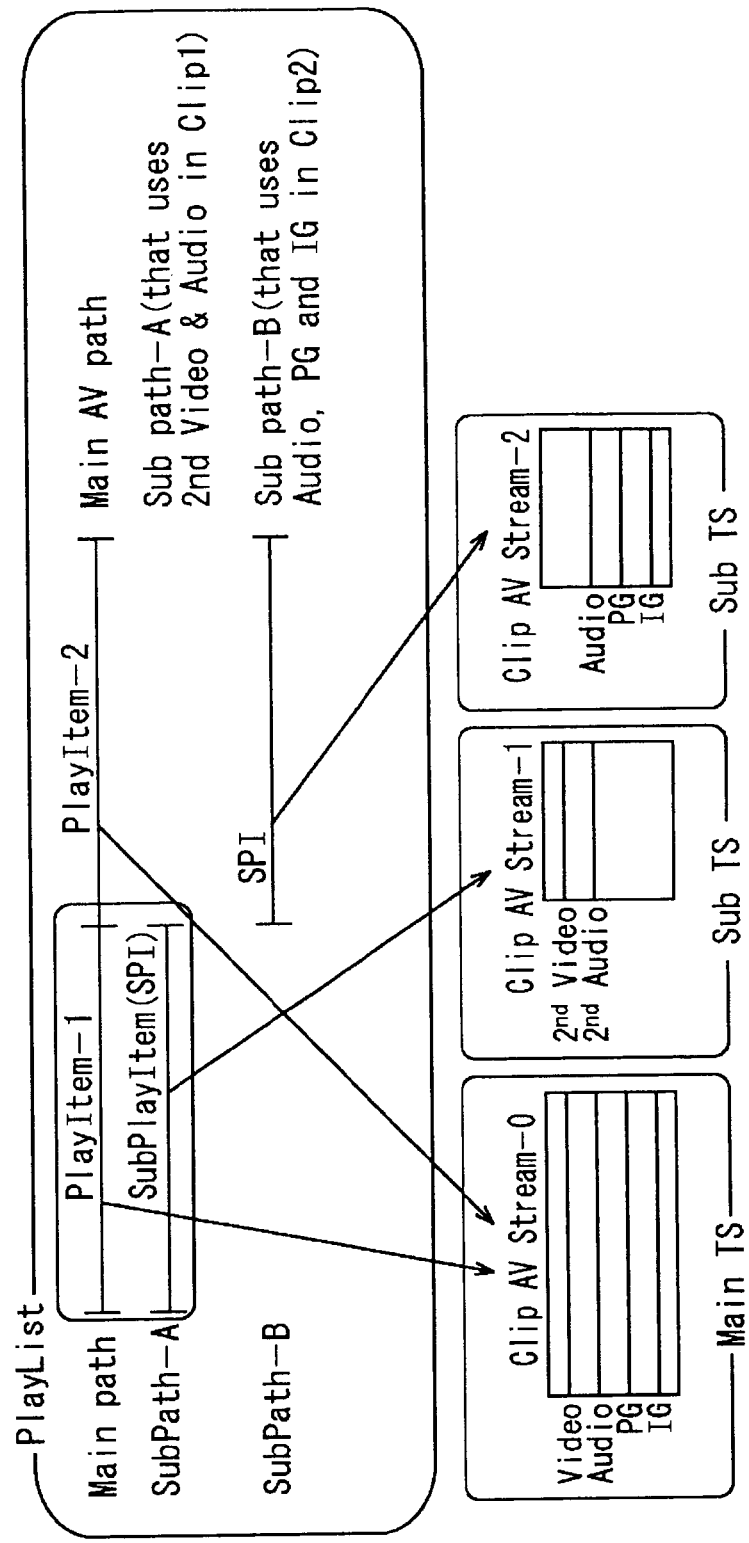
FIGS. 47 and 48 illustrate examples of playlists generated by using SubPath_type shown in FIG. 45 to implement the picture-in-picture technique.

By using SubPath_type shown in FIG. 45, i.e., by using SubPath_type 5, 6, and 7 in addition to SubPath_type=1 through 4, which are contained in the SubPath_type in FIG. 11, a simple playlist, such as that shown in FIG. 47, can be created and used instead of a complicated playlist, such as that shown in FIG. 44, to implement the picture-in-picture technique (see FIG. 39).

In the example in FIG. 47, a video stream and an audio stream contained in the clip AV stream-0 referred to by play item 1 (PlayItem 1) contained in the main path are used as the primary video stream and the primary audio stream, respectively. In the example in FIG. 39, the video stream and the audio stream contained in the clip AV stream-0 correspond to the primary video stream 311 and the primary audio stream 312, respectively. The primary video stream 311 is played back in the main screen 301, and at the same time, the primary audio stream 312 is played back (output).

As in the example in FIG. 44, in the example in FIG. 47, the secondary video stream and the secondary audio stream that are played back simultaneously with the primary video stream in the clip AV stream-0 are contained in the same clip AV stream-1.

In the example in FIG. 47, as the sub-path A(subPath-A) type, SubPath_type=5 is used, and more specifically, the main-path-TS non-multiplexed type and AV synchronized type of the picture-in-picture presentation path is used. Accordingly, the sub-play item referred to by the sub-path A(SubPath-A) can refer to the secondary video stream and the secondary audio stream contained in the clip AV stream-1 at the same time. In the example in FIG. 39, the secondary video stream and the secondary audio stream contained in the clip AV stream-1 referred to by the only sub-path A(SubPath-A) correspond to the secondary video stream 313 and the secondary audio stream 314, respectively. Then, the secondary video stream 313 is played back in the sub-screen 302, and at the same time, the secondary audio stream 314 is played back (output).

In this case, if SubPath_type=5 is used as the sub-path A(SubPath-A), the secondary video stream 313 and the secondary audio stream 314 are played back in synchronization with the primary video stream 311.

In other words, if it is desired or necessary that the secondary video stream 313 and the secondary audio stream 314 be played back asynchronously with the primary video stream 311, SubPath_type=6, i.e., the main-path-TS non-multiplexed and AV non-synchronized type of a picture-in-picture presentation path (including at least one ES), is selected as the sub-path A(SubPath-A).

As discussed above, by using SubPath_type in FIG. 45, the picture-in-picture technique can be implemented by using only the main path and one sub-path.

More specifically, to implement the picture-in-picture technique in which the secondary video stream and the secondary audio stream contained in the same clip AV stream-1 are used as the secondary video stream 313 and the secondary audio stream 314, respectively, the secondary video stream 313 and the secondary audio stream 314 are referred to by two different sub-paths in the playlist shown in FIG. 44 generated by using SubPath_type shown in FIG. 11. In contrast, according to the playlist shown in FIG. 47 generated by using SubPath_type shown in FIG. 45, the secondary video stream and the secondary audio stream contained in the same clip AV stream-1 can be referred to by one sub-path.

As a result, the secondary video stream and the secondary audio stream can share the same information, such as SubPlayItem-IN_time and SubPlayItem_OUT_time.

Additionally, upon comparing the playlist in FIG. 47 with that in FIG. 44, it is seen that the structure of the playlist can be simplified.

Figure 48:
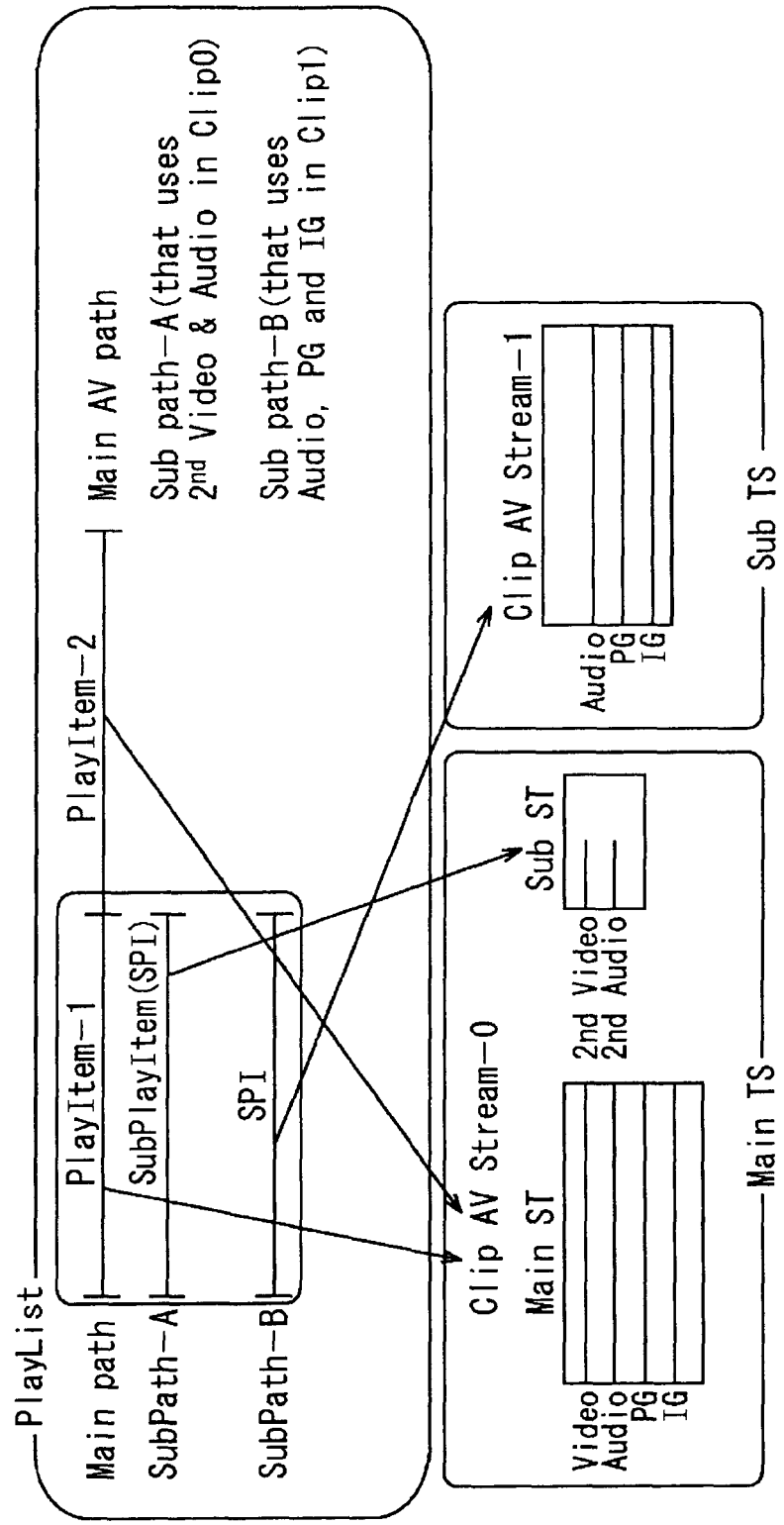

By using SubPath_type=7 in FIG. 45, i.e., the main-path-TS multiplexed type and AV synchronized type of a picture-in-picture presentation path (including at least one ES), a playlist shown in FIG. 48 can be generated. As a result, the picture-in-picture technique using the playlist shown in FIG. 48 can be easily implemented.

In the playlist in FIG. 48, the clip AV stream-0 (which is different from the clip AV stream-0 shown in FIG. 47) is contained in the main TS referred to by play item 1 (PlayItem1) contained in the main path. The clip AV stream file-0 includes the main stream referred to by play item 1 and a sub-stream referred to by a sub-play item (SPI). The video stream and the audio stream contained in the main stream are used as the primary video stream and the primary audio stream, respectively. In the example in FIG. 39, the video stream and the audio stream of the main stream contained in the clip AV stream file-0 correspond to the primary video stream 311 and the primary audio stream 312, respectively. The primary video stream 311 is played back in the main screen 301, and at the same time, the primary audio stream 312 is played back (output).

In the playlist shown in FIG. 48, the secondary video stream and the secondary audio stream that are played back simultaneously with the primary video stream of the main stream are the secondary video stream and the secondary audio stream, respectively, contained in the clip AV stream-0 in the same main TS.

In this case, to create the playlist shown in FIG. 48, SubPath_type=7 is used as the type of sub-path A(SubPath-A).

Accordingly, two ESs, such as the secondary video stream and the secondary audio stream, contained in the clip AV stream-0 of the main TS, which are referred to by the main path, can also be referred to by the sub-play item of the sub-path A(SubPath-A). In the example in FIG. 39, the secondary video stream and the secondary audio stream contained in the clip AV stream-0, which are referred to by the sub-path A(SubPath-A), correspond to the secondary video stream 313 and the secondary audio stream 314, respectively, and the secondary video stream 313 can be played back in the sub-screen 302, and at the same time, the secondary audio stream 314 can be played back (output). That is, since one file includes a main path and a sub-path, streams contained in another file can also be played back.

In FIG. 48, as sub-paths associated with play item 1, in addition to the sub-path A(SubPath-A), sub-path B(SubPath-B) referring to the clip AV stream-1 (different from clip AV stream-1 shown in FIG. 44) contained in a sub-TS different from the main TS including the clip AV stream-0 is defined. As discussed above, the playback apparatus can read two TSs (clips) at the same time. Accordingly, the playback apparatus can read, for example, PG contained in the sub-stream together with the primary video, primary audio, secondary video, or secondary audio contained in the main stream.

Examples of the syntaxes necessary to implement the picture-in-picture technique (FIG. 39), i.e., the fifth STN_table( ) shown in FIGS. 40 and 41 and SubPath_type in FIG. 45, have been discussed.

To implement the picture-in-picture technique, a playback apparatus having a function of playing back a primary video stream and a secondary video stream simultaneously, for example, the playback apparatus shown in FIG. 49, is necessary.

Another example of the playback apparatus according to an embodiment of the present invention is described below. The playback apparatus 401 shown in FIG. 49 is basically similar to the playback apparatus 20 shown in FIG. 25.

The playback apparatus 401 shown in FIG. 49 can perform a playback operation in accordance with a playlist including the above-described main-path and sub-paths and implementing the picture-in-picture technique, for example, the playlist shown in FIG. 47 or 48.

In FIG. 49, elements corresponding to those in FIG. 25 are designated by like reference numerals, and an explanation thereof is thus omitted.

The playback apparatus 401 shown in FIG. 49 is provided with the storage drive 31, the switch 32, and the controller 34 having functions and configurations similar to those of the playback apparatus 20 shown in FIG. 25. However, the controller 34 has additional functions. Details of the additional functions are given below. The playback apparatus 401 is also provided with the AV decoder 403 having functions and configurations slightly different from those of the AV decoder 33.

The elements forming the AV decoder 403 are substantially similar to those of the AV decoder 33 shown in FIG. 25, except that the first video decoder 72 substitutes the video decoder 72 of the AV decoder 33, the first video plane generator 92 substitutes the video plane generator 92, and the number of output terminals of the PID filter 56 is greater than that of the PID filter 56 of the AV decoder 33 by one. Additionally, the AV decoder 403 is provided with a PID filter 411, a second video decoder 412, a second video plane generator 413, and a preload buffer 414, which are not provided for the AV decoder 33.

More specifically, to implement the picture-in-picture technique, it is necessary to decode primary video streams and secondary video streams. The first video decoder 72 and the second video decoder 412 having functions and configurations similar to each other decode the primary video streams and the secondary video streams, respectively. The first video plane generator 92 and the second video plane generator 413 having functions and configurations similar to each other are provided in association with the first video decoder 72 and the second video decoder 412, respectively.

The PID filter 411 receives video streams of main clip AV streams or video streams of sub-clip AV streams from the PID filter 55 or the PID filter 56, respectively. Then, the PID filter 411 allocates the input video streams to the first video decoder 72 or the second video decoder 412 according to the PIDs. More specifically, if primary video streams are supplied, the PID filter 411 supplies them to the first video decoder 72. If secondary video streams are supplied, the PID filter 411 supplies them to the second video decoder 412.

In this embodiment, only video streams in the main clip AV stream are used as primary video streams, and video streams in sub-clip AV streams are not used as primary video streams. However, by considering the use of video streams in sub-clip AV streams as primary video streams in the future, the PID filter 411 is configured such that video streams in sub-clip AV streams from the PID filter 56 can also be supplied to the first video decoder 72.

The preload buffer 414 temporarily stores interactive graphics streams supplied from the interactive graphics decoder 74. As described above, in this embodiment, a restriction is imposed on the playback apparatus 401 such that it can read only two TSs (clips) at the same time. Accordingly, the playback apparatus 401 has the function of obtaining interactive graphics streams in advance (preloading them) to play back preloaded interactive graphics streams simultaneously with other streams. To implement this function, the preload buffer 414 is disposed for storing preloaded interactive graphics streams until they can be played back with video streams or audio streams.

An example of processing performed by the playback apparatus 401 shown in FIG. 49 according to the picture-in-picture technique, and more specifically, processing for switching secondary video streams to be played back while a primary video stream is being played back (hereinafter simply referred to as the "secondary video switching processing") is described below with reference to the flowchart in FIGS. 50 and 51.

Figure 50:
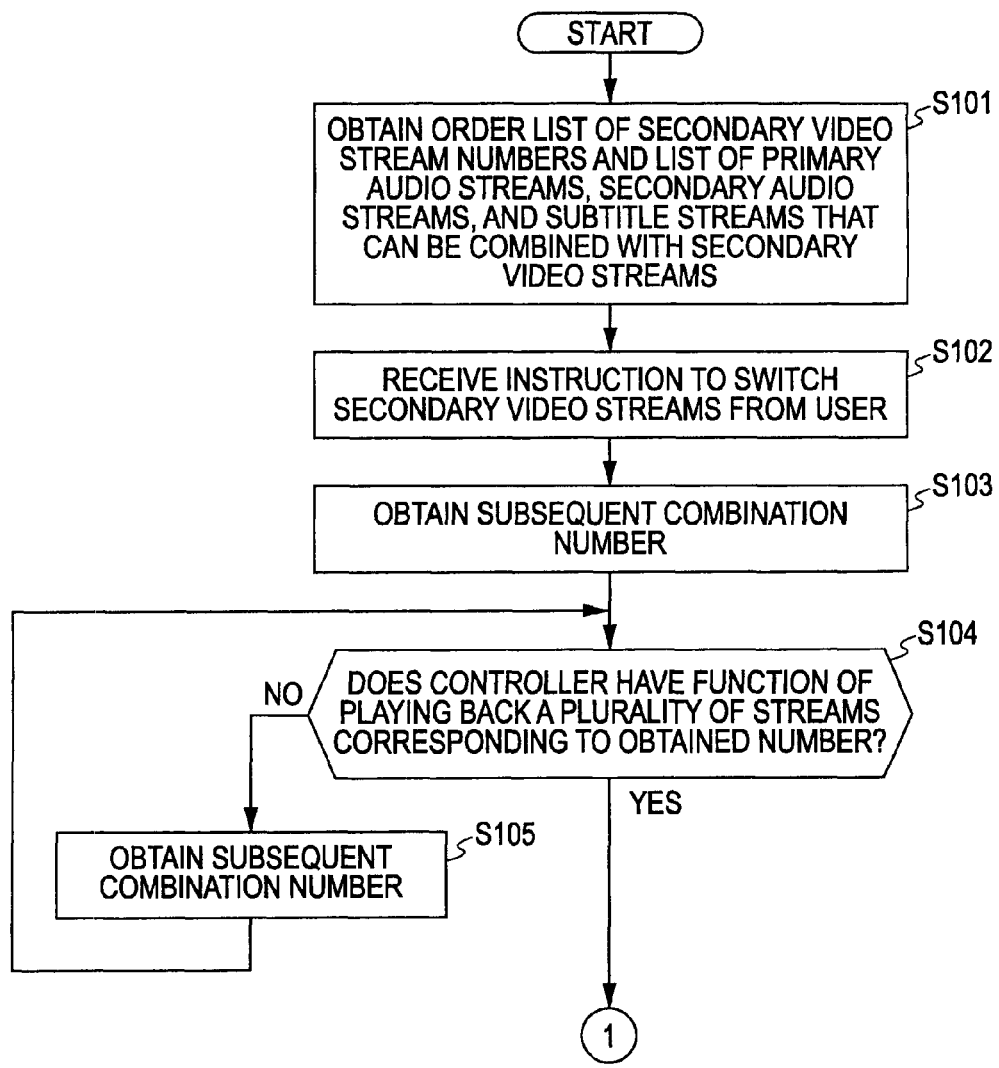
FIGS. 50 and 51 are flowcharts illustrating secondary video switching processing performed by the playback apparatus shown in FIG. 49.
Figure 51:
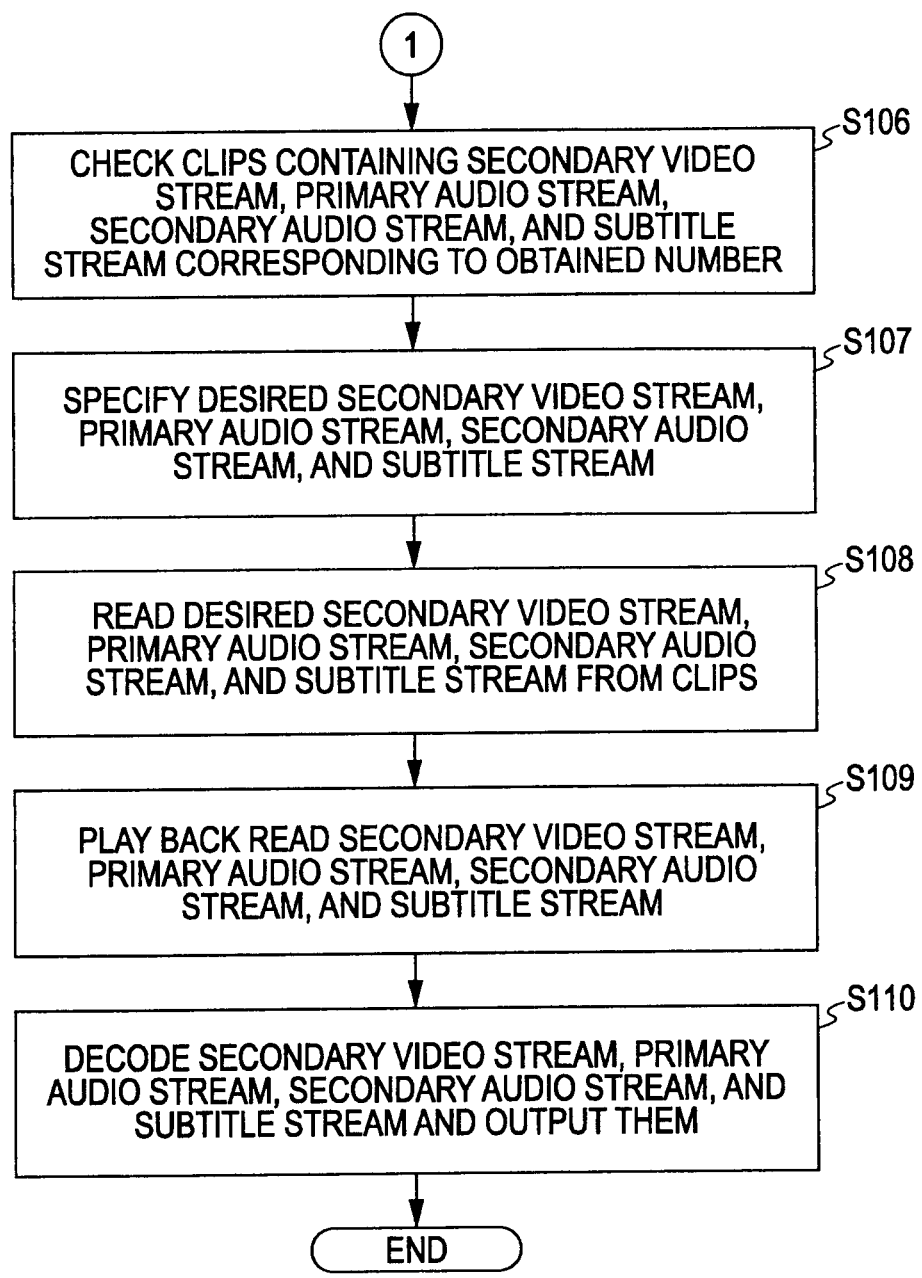

In step S101 in FIG. 50, the controller 34 obtains an order list of secondary video stream numbers (may be IDs) and a list of primary audio streams, secondary audio streams, and subtitle streams that can be combined with secondary video streams from the fifth STN_table( ) shown in FIGS. 40 and 41.

It is now assumed that, after step S101, a stream number table, such as that shown in FIG. 42, is generated based on the obtained list, and the stream number table or a predetermined graphical user interface (GUI) image generated based on the stream number table is presented to the user. The process then proceeds to step S102.

In step S102, the controller 34 receives an instruction to switch secondary video streams from the user.

More specifically, in step S102, the switching operation performed by the user discussed with reference to FIGS. 42 and 43 is received by the controller 34 as an instruction to switch secondary video streams.

In step S103, the controller 34 obtains a combination number subsequent to the current combination number of a secondary video stream, a primary audio stream, a secondary audio stream, and a subtitle stream.

More specifically, if the stream number table shown in FIG. 42 is presented to the user, there are three combinations, i.e., the first combination through third combination, of a secondary video stream, a primary audio stream, a secondary audio stream, and a subtitle stream. The first combination is a combination of video 2, audio 2, audio 4, and sub-picture 3. The second combination is a combination of video 1, audio 1, audio 4, and sub-picture 1. The third combination is a combination of video 1, audio 1, audio 5, and sub-picture 1. It is now assumed that 1, 2-1, and 2-2 are assigned to the first, second, and third combinations, respectively, as combination numbers. It is also assumed that an instruction to select the second combination shown in FIG. 43 is received by the controller 34. In this case, in step S103, the controller 34 obtains 2-1 as the subsequent combination number.

In step S104, the controller 34 then determines by referring to stream_attribute( ) whether it has a function of playing back a plurality of streams associated with the obtained number (in this case, the number obtained in step S103).

More specifically, since an instruction to select the second combination is received by the controller 34 in step S103, the controller 34 determines in step S104 whether it has a function of playing back audio 1 and audio 4.

A specific example of a determination as to whether the function of playing back audio streams has been discussed in the description of step S74 in FIG. 30, and thus, an explanation thereof is omitted here.

In step S104, a determination as to whether the function of playing back other types of streams, such as video streams, may also be made.

If it is determined in step S104 that the function of playing back a plurality of streams associated with the obtained number is not provided, the process proceeds to step S105. In step S105, the controller 34 obtains the subsequent combination number. That is, the current combination number is skipped and is not played back. The process then returns to step S104, and steps S104 and S105 are repeated. That is, steps S104 and S105 are repeated until a combination number having audio streams that can be played back by the playback apparatus 401 is obtained.

If it is determined in step S104 that the function of playing back a plurality of streams associated with the obtained number (number obtained in step S103 or S105) is provided, the process proceeds to. step S106.

In step S106, the controller 34 checks, based on the type of stream_entry( ), clips containing the secondary video stream, primary audio stream, secondary audio stream, and subtitle stream associated with the obtained number. That is, the controller 34 checks whether each of the secondary video stream, primary audio stream, secondary audio stream, and subtitle stream is contained in the main clip or a sub-clip. A specific example of step S106 has been discussed in the description of step S76 in FIG. 30, and thus, an explanation thereof is omitted here.

In step S107, the controller 34 specifies the desired secondary video stream, primary audio stream, secondary audio stream, and subtitle stream. That is, in step S107, the desired streams associated with the obtained number in the main clip or a sub-clip are specified. A specific example of step S107 has been discussed in the description of step S77 in FIG. 30, and thus, an explanation thereof is omitted here.

In step S108, the controller 34 instructs the storage drive 31 to read the specified secondary video stream, primary audio stream, secondary audio stream, and subtitle stream from the clips containing those streams. In response to this instruction, the storage drive 31 reads the specified streams from the target clip. More specifically, in step S108, the controller 34 instructs the storage drive 31 to read the streams specified in step S107 from the clip specified in step S106.

Then, in step S109, the controller 34 instructs the AV decoder 403 to play back the read streams. More specifically, the controller 34 instructs the second video decoder 412 to decode the secondary video stream, the first audio decoder 75-1 to decode the primary audio stream, the second audio decoder 75-2 to decode the secondary audio stream, and the presentation graphics decoder 73 to decode the subtitle stream.

In step S110, the AV decoder 403 decodes the secondary video stream, primary audio stream, secondary audio stream, and subtitle stream and outputs the decoded streams. The processing is then completed.

In this case, as stated above, for the primary audio stream and the secondary audio stream, an audio signal generated by mixing and playing back the primary audio stream and the secondary audio stream is output, as discussed in the description of step S80 in FIG. 30.

As a result of the secondary video switching processing, the picture-in-picture technique discussed with reference to FIG. 39 is implemented. More specifically, in FIG. 39, while video corresponding to the primary video stream 311 is being displayed in the main screen 301, video corresponding to the secondary video stream 313 output in step S110 is displayed in the sub-screen 302, subtitles corresponding to the subtitle stream 315 output in step S110 are displayed at a predetermined position of the main screen 301, and sound generated by mixing the primary audio stream 313 and the secondary audio stream 314 is output from a speaker (not shown).

As discussed above, by using the fifth STN_table( ) shown in FIGS. 40 and 41, the picture-in-picture technique can be implemented.

To perform the picture-in-picture technique, it is possible that the playlist (FIG. 44) generated by using SubPath_type shown in FIG. 11 be used. As stated above, by using such a playlist, however, a secondary video stream and a secondary audio stream contained in the same clip AV stream are referred to by different sub-paths, i.e., they are defined as different sub-play items. As a result, the structure of the playlist becomes complicated, as described above.

To solve this problem, as stated above, SubPath_type, such as SubPath_type shown in FIG. 45, can be used so that two or more elementary streams in the same clip AV stream can be referred to by one sub-path, i.e., two or more ESs in the same clip AV stream can be defined as one sub-play item.

From the viewpoint of the creators of a playlist, however, even though the structure of the playlist becomes simple by using SubPath_type shown in FIG. 45, the creator still has to determine which combinations of streams are possible and which combinations of streams are not possible, i.e., to determine which sub-paths are included, to implement the picture-in-picture technique. Accordingly, there is still a demand for simply creating a playlist.

To respond to such a demand, in an embodiment of the present invention, sub-paths that can be included in a playlist are restricted by SubPath_type shown in FIG. 45 depending on the type of playlist. Such a technique is referred to as the "sub-path restriction technique".

According to the sub-path restriction technique, the sub-paths that can be included in a playlist are restricted, which enables the user to determine which sub-paths are included in the playlist, thereby facilitating the creation of the playlist.

Details of the sub-path restriction technique are given below.

In the sub-path restriction technique, the type of restriction varies depending on the number of TSs that can be read at the same time by the playback apparatus. In this embodiment, as stated above, the number of TSs that can be read simultaneously is two. Accordingly, the sub-path restriction technique when the number of TSs that can be read simultaneously is two is described below.

In this embodiment, the playlist can be largely divided into two types, i.e., browsable slideshow (non-synchronized) and movie-type/time-based slideshow (synchronized). The type of playlist can be determined by application_type contained in clip_Information type of the clip referred to by the playlist.

The application_type is indicated in ClipInfo( ) in a clip information file of a clip. For the sake of simple description, however, the syntax of ClipInfo( ) is not mentioned here, and only application_type indicated in ClipInfo( ) is discussed below with reference to FIG. 52.

In FIG. 52, application_type=0 is reserved. The application_type=1 is used for main TSs for movie applications. The main TS is a transport stream as a play item referred to by the main path in the playlist. The application_type=2 is used for main TSs for time-based slideshow, i.e., main TSs for still image slideshow. The application_type=3 is used for TSs for browsable slideshow, i.e., TSs for video slideshow.

The application_type=4 is used for sub-path TSs for browsable slideshow, which is indicated in ClipInfo( ) for, for example, clip AV streams containing BGM that is played back asynchronously with application_type=3. The application_type=5 is used for sub-path TSs for interactive graphics. The application_type=6 is used for sub-path TSs for text subtitles. The application_type=7 is used for sub-path TSs including at least one ES. The application_type=8 through application_type=255 are reserved.

In this embodiment, when application_type=3 in application type indicated in ClipInfo( ) of a main TS referred to by a playlist, the playlist is classified into browsable slideshow (non-synchronized type). When playlist=1 or 2 in application_type indicated in ClipInfo( ), the playlist is classified into movie-type/time-based slideshow (synchronized).

Figure 57:
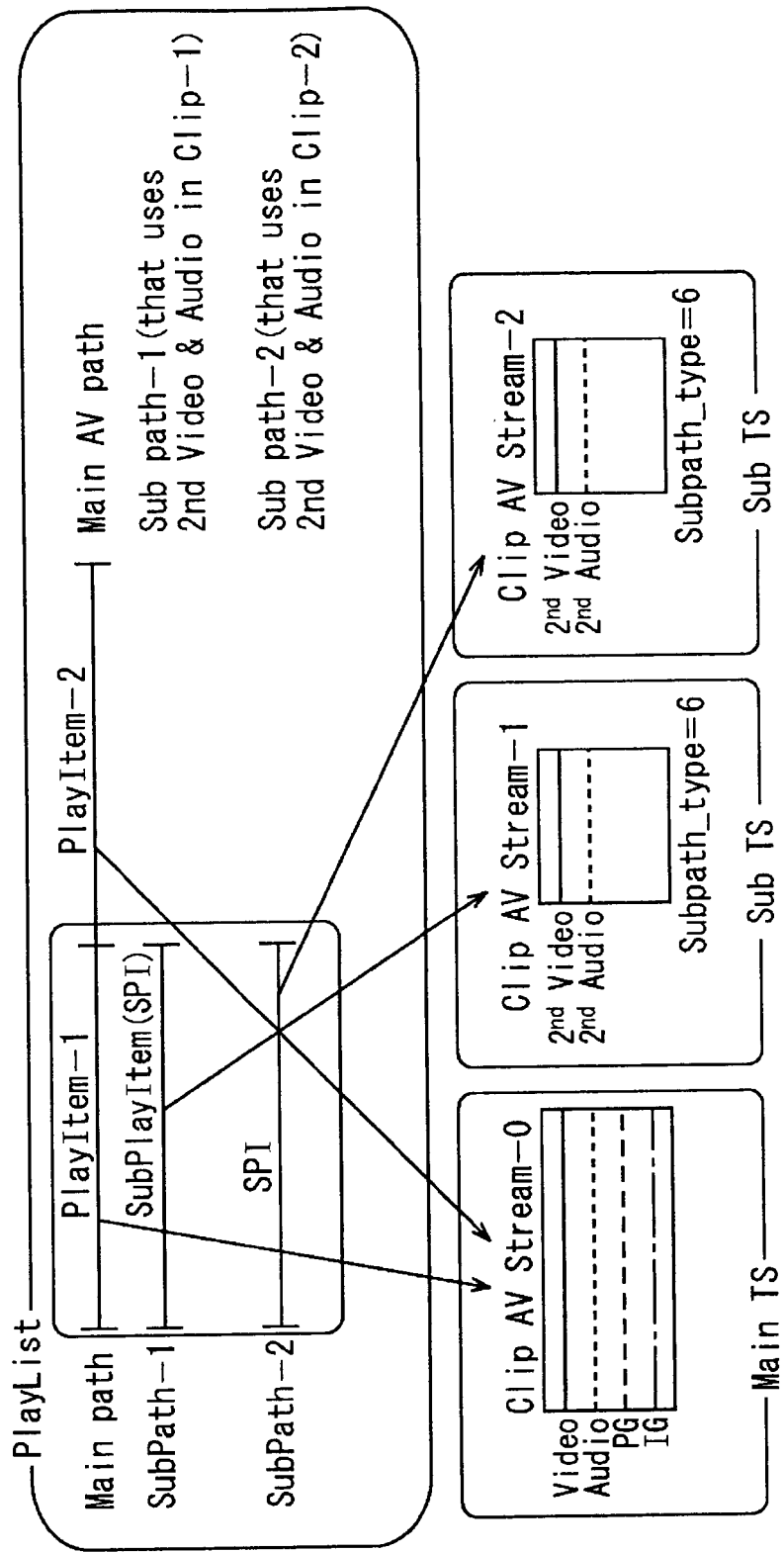

In this case, sub-paths that can be provided for playlists are restricted to sub-paths shown in FIG. 57 depending on the types of playlists (non-synchronized or synchronized). Such a restriction is imposed by the sub-path restriction technique.

The number of sub-paths indicated in the right side of FIG. 53 designates the number of sub-paths whose type is indicated in SubPath_type provided for the main TS.

The numbers indicated in SubPath_type correspond to the numbers indicated in SubPath_type shown in FIG. 45.

When the type of playlist is non-synchronized type, as shown in FIG. 53, i.e., when the type of playlist is browsable slideshow having application_type=3, only (1) at least 0 sub-paths of SubPath_type=2 or (2) at least 0 sub-paths of SubPath_type=3 are allowed. In other words, sub-paths other than the above-described (1) and (2) sub-paths are prohibited.

In (2) sub-path, if the main TS of application_type=3 contains an interactive graphics stream (IG), such sub-paths are prohibited (see *2 in FIG. 53). The reason is as follows.

From the viewpoint of IGs, playlists including IGs are largely divided into a first type and a second type. In the first type of playlist, an IG is multiplexed into the main TS, and the IG is played back simultaneously with an audio or video stream contained in the main TS. In the second type of playlist, an IG is included in a sub-path having SubPath_type=3, and the IG is preloaded (which is used for a popup menu). To play back the second type of playlist, the preload buffer 414 is disposed in the playback apparatus 401 shown in FIG. 49, as described above.

Since only one IG decoder is provided for the playback apparatus of this embodiment, and more specifically, since the single IG decoder 74 is provided for the playback apparatus 401, the following restriction is imposed. In the first type of playlist, while the IG in the main TS is being decoded by the IG decoder, another IG cannot be preloaded. In the second type of playlist, while a first IG, which is preloaded, is input into the IG decoder, a second IG from another main TS cannot be input into the IG decoder.

Because of the above-described reason, a restriction is imposed such that a playlist including STN_table( ) referring to an IG multiplexed into a main TS is not allowed to have a sub-path having SubPath_type=3. Under this restriction, if an IG is contained in the main TS of application_type=3, such sub-paths are prohibited (see *2 in FIG. 53).

When the type of playlist is synchronized type, i.e., i.e., when the type of playlist is movie-type/time-based slideshow of application_type=1 or 2, only (3) at least 0 sub-paths of SubPath_type=3, (4) at least 0 sub-paths of SubPath_type=4 (5) at least 0 sub-paths of SubPath_type=5, (6) at least 0 sub-paths of SubPath_type=6, or (7) 0 or 1 sub-path of SubPath_type=7 are allowed. In other words, sub-paths of SubPath_type=2 are prohibited.

In (3) sub-path, if the main TS of application_type=3 contains an IG, or if the TS referred to by a sub-path of SubPath_type=5 contains an IG, such sub-paths are prohibited (see *1 in FIG. 53). This is also because of the above-described restriction.

Additionally, in this embodiment, as stated above, the number of clips that can be referred to at the same time by a playlist, i.e., the number of TSs that can be read at the same time by the playback apparatus, is two. Accordingly, to ensure that ESs that can be referred to at the same time by the same playlist are contained in at most two clips, i.e., that ESs that can be played back at the same time are referred to by at most two clip AV stream files, a restriction is imposed by the sub-path restriction technique such that the following conditions are satisfied.

The condition, which is imposed by the sub-path restriction technique, for combining primary_video_stream, primary_audio_stream, PG_textST_stream other than text subtitle streams, IG_stream other than IGs for popup menu, secondary_video_stream, and secondary_audio_stream referred to by STN_table( ) is as follows.

In an ES specified by primary_video_stream_number, an ES specified by primary_audio_stream_number, an ES specified by PG_textST_stream_number, an ES specified by IG_stream_number, an ES specified by secondary_video_stream_number, and an ES specified by secondary_audio_stream_number, combinations of streams that can be played back simultaneously should be stored in at most two clip AV stream files. The excluded text subtitle streams or IGs for pop-up menu are preloaded streams. Accordingly, they are not simultaneously read from an optical disc or a hard disk though they are played back (displayed) together, and thus, they may be stored in a clip AV stream file different from the above-described two clip AV stream files.

ESs referred to by STN_table( ) may be stored by three or more clip AV stream files, but ESs that can be played back simultaneously should be stored in at most two of those clip AV stream files.

The sub-path restriction technique also imposes the restriction such that it is necessary that the combination of the number of play items and the number of sub-paths is one of the following combinations (a), (b), and (c). The combination (a) is only one play item (the topmost row in FIG. 54), the combination (b) is one play item and one sub-path (the middle row in FIG. 54), and the combination (c) is one play item, one sub-path, and one sub-path=7, i.e., one play item and two sub-paths (one of the sub-paths should be SubPath_type=7) (the bottommost row in FIG. 54).

In one type of sub-path restriction technique, the types of sub-paths (SubPath_type) that can be created according to the types of playlists are restricted.

In other words, the sub-path restriction technique includes conditions, such as the type of playlist (in the above-described example, type represented by application_type of the main TS), the number of TSs that can be read at the same time by the playback apparatus (in the above-described example, two), and whether an IG to be preloaded is contained in an ES referred to by a sub-path of the playlist) (in this example, whether the sub-path is SubPath_type=3). To satisfy those conditions, the sub-paths to be included in the playlist are determined, and as a result, a playlist including those sub-paths is created.

Specific examples of playlists created by the sub-path restriction technique are given below with reference to FIGS. 55 through 58.

Figure 55:
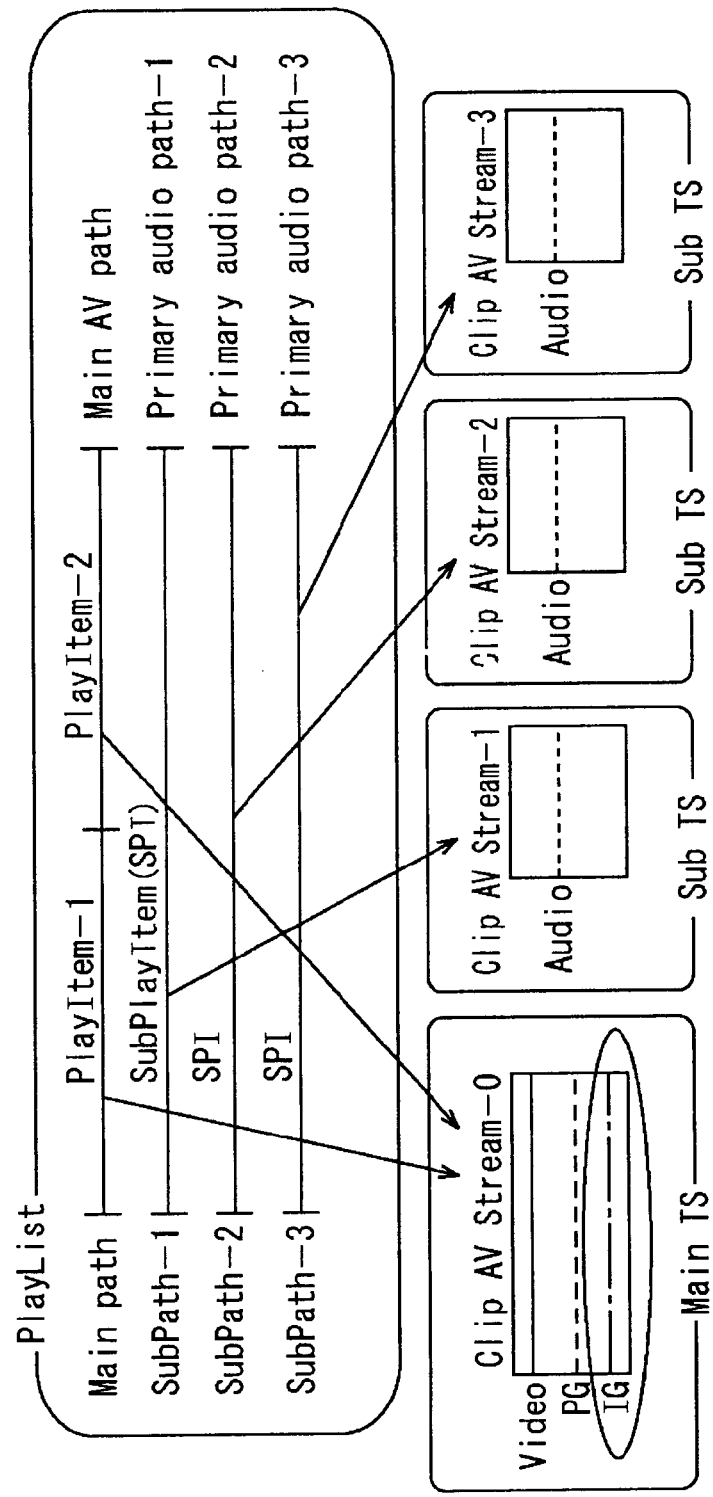
FIGS. 55 through 58 illustrate specific examples of playlists generated by the sub-path restriction technique shown in FIGS. 53 and 54.

FIG. 55 illustrates a playlist of browsable slideshow (non-synchronized type) which does not have SubPath_type=3, i.e., a playlist including sub-path 1 through sub-path 3 of SubPath_type=2. SubPath_type=3 is not contained in the playlist because an IG is contained in the clip AV stream-0 (i.e., main TS) referred to by play item 1 and play item 2. Since the playlist in this example is browsable slideshow which sequentially displays a plurality of still images by the user, video streams contained in the clip AV stream-0 store still image data.

The playlist shown in FIG. 55 is created by using the conditions that only (1) at least 0 sub-paths of SubPath_type=2 or (2) at least 0 sub-paths of SubPath_type=3 are allowed and sub-paths other than (1) or (2) sub-paths are prohibited, and that sub-paths of SubPath_type=3 are prohibited if an IG is contained in the main TS of application_type=3 (see *2 in FIG. 53).

Figure 56:
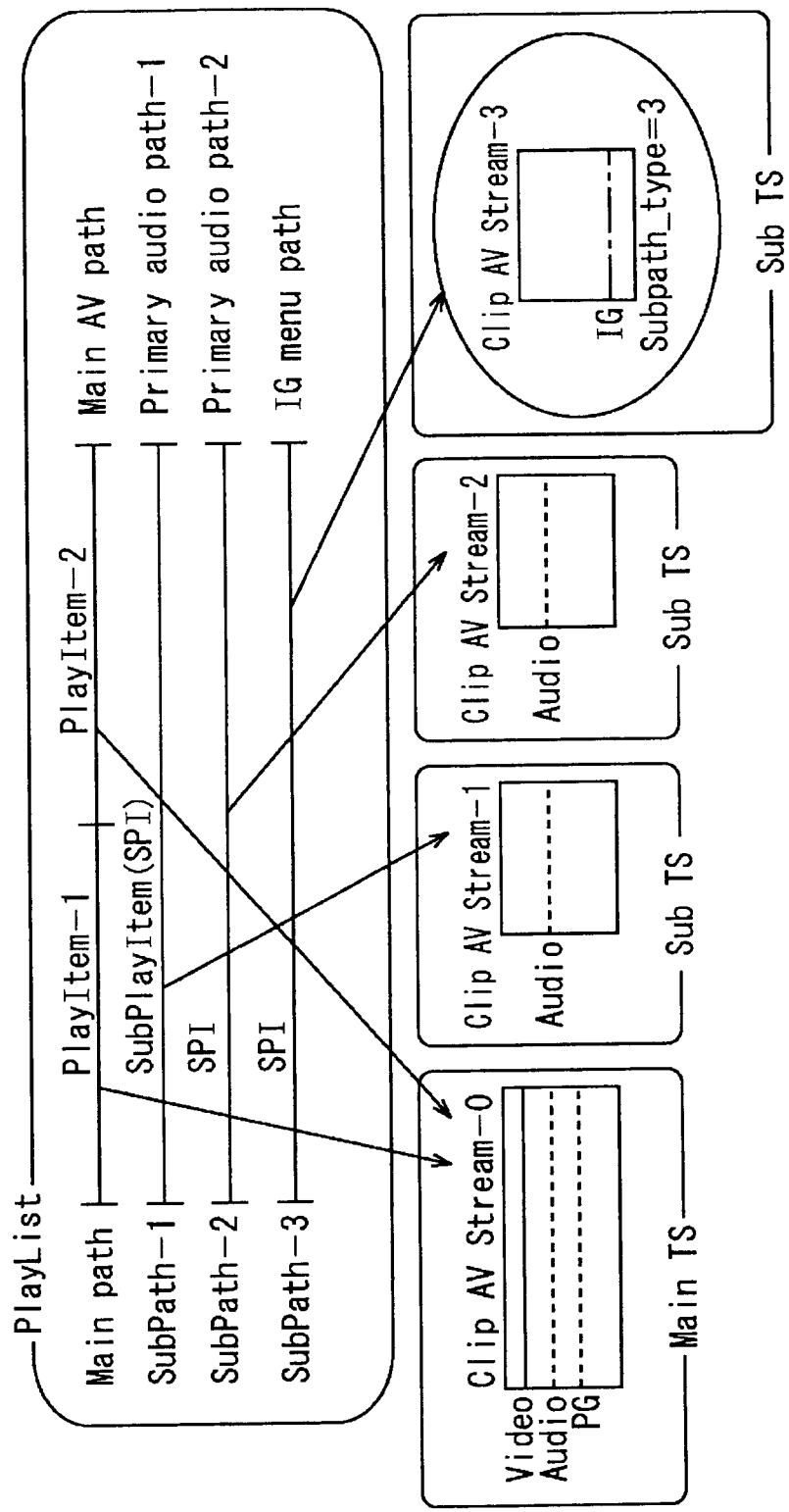

In contrast to the example in FIG. 55, FIG. 56 illustrates a playlist of browsable slideshow (non-synchronized type) which have SubPath_type=3, i.e., a playlist including sub-path 1 and sub-path 2 of SubPath=type2 and sub-path 3 of SubPath_type=3. SubPath_type=3 is contained in the playlist because an IG is not contained in the clip AV stream-0 referred to by play item 1 and play item 2, and SubPath_type=3 is used for referring to an IG contained in a clip AV stream-3, which is different from the clip AV stream-0.

The conditions used for creating the playlist shown in FIG. 56 are the same as those for the playlist shown in FIG. 55.

In other words, an example of the playlist on which the restriction indicated by *2 in FIG. 53, i.e., in "(2) sub-path, if the main TS of application_type=3 contains an IG, such sub-paths of SubPath_type=3 are prohibited", has to be imposed is the example in FIG. 55, and an example of the playlist on which such a restriction does not have to be imposed is the example in FIG. 56.

As described above, FIGS. 55 and 56 illustrate examples of playlists of browsable slideshow (non-synchronized type). In contrast, FIGS. 57 and 58 illustrate examples of playlists of movie-type/time-based slideshow (synchronized type).

More specifically, FIG. 57 illustrates a playlist of synchronized type in which a secondary video stream and a secondary audio stream are not multiplexed into the main TS (i.e., clip AV stream-0), i.e., the playlist including sub-path 1 and sub-path 2 of SubPath_type=5.

By using the condition that (6) "at least 0 sub-paths of SubPath_type=6 is allowed" described in FIG. 53, the playlist shown in FIG. 57 is created.

FIG. 58 illustrates a playlist of synchronized type in which the main TS, i.e., the clip AV stream-0, referred to by the playlist contains a main stream and a sub-stream and a secondary video stream and a secondary audio stream are multiplexed into the clip AV stream-0 forming the main TS. Accordingly, the playlist includes sub-path 1 of SubPath_type=7 and sub-2 and sub-path 3 of SubPath_type=5.

By using conditions that (5) "at least 0 sub-paths of SubPath_type=5 are allowed", and (7) "0 sub-path and one sub-path of SubPath_type=7 are allowed", the playlist shown in FIG. 58 are created.

The playlists created by the above-described sub-path restriction technique can also be played back by the playback apparatus 401 shown in FIG. 49.

For example, the playback apparatus 401 plays back a playlist of non-synchronized type, i.e., a playlist of browsable slideshow having application_type=3, in the following manner. If the playlist refers to at least one sub-path of SubPath_type=3 (interactive graphics presentation menu), the playback apparatus 401 preloads a clip AV stream of SubPath_type=3, i.e., an interactive graphics stream, in the preload buffer 414 before playing back the playlist. If the playlist refers to at least one sub-path of SubPath_type=2, the playback apparatus 401 refers to a predetermined sub-path (SubPath_type=2) and plays it back since sub-paths can be referred to only one by one (the number of TSs that can be read at the same time is two, and one of them is the main TS referred to by the main TS).

The interactive graphics presentation menu includes two menus, i.e., a popup menu that can be displayed or erased by the ON/OFF operation of the user, and an always-on menu that is always displayed. Details of playback processing for a playlist of application_type=3 are given below with reference to the flowcharts in FIGS. 59 and 60.

The playback apparatus 401 plays back a playlist of synchronized type, i.e., a playlist of movie-type/time-based slideshow of clips having application_type=1 or 2, in the following manner. If the playlist refers to at least one sub-path of SubPath_type=3 or 4 (interactive graphics stream or text subtitle stream), the playback apparatus 401 preloads a clip AV stream, i.e., an interactive graphics stream or a text subtitle stream, of SubPath_type=3 or 4 in the preload buffer 414 or the buffer 54 before playing it back. If the playlist refers to at least one sub-path of SubPath_type=5 or 6, the playback apparatus 401 refers to a predetermined sub-path (SubPath_type=5 or 6) and plays it back since sub-paths can be referred to only one by one (the number of TSs that can be read at the same time is two, and one of them is the main TS referred to by the main TS). However, if the sub-paths contained in the playlist includes at least one sub-path of SubPath_type=7, the playback apparatus 401 can refer to one sub-path of SubPath_type=7 and plays it back while playing back one sub-path of SubPath_type=5 or 6 since the sub-path of SubPath_type=7 refers to an ES contained in the main TS.

Details of playback processing for a playlist of application_type=1 or 2 are given below with reference to FIGS. 61 through 64.

Figure 59:
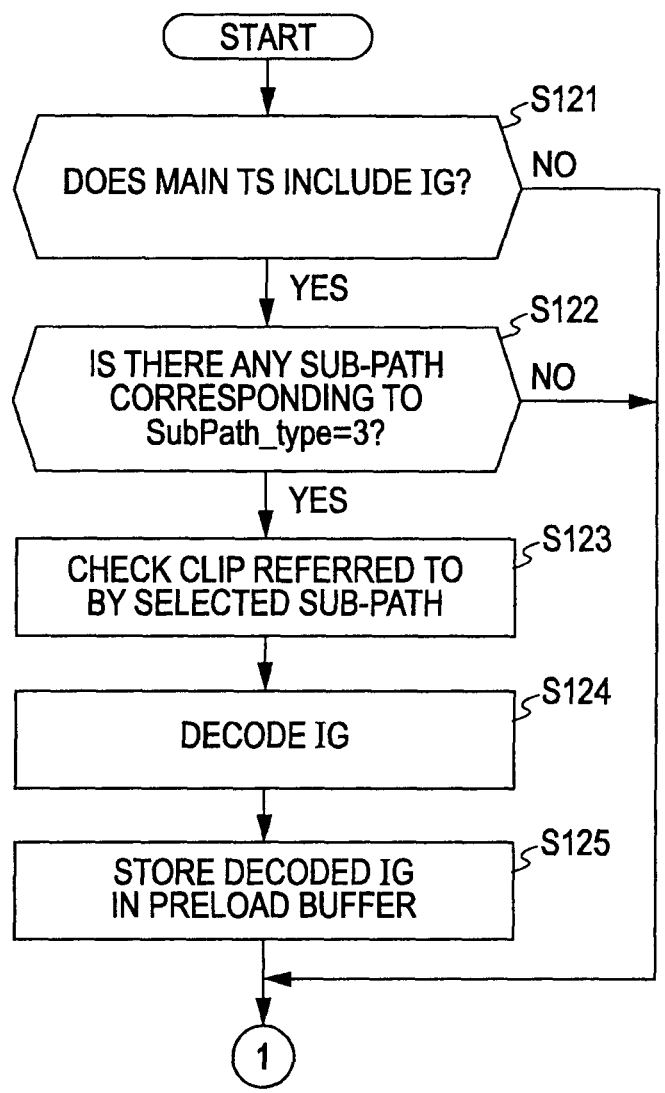
FIGS. 59 and 60 are flowcharts illustrating playback processing for a playlist having application_type=3.
Figure 60:
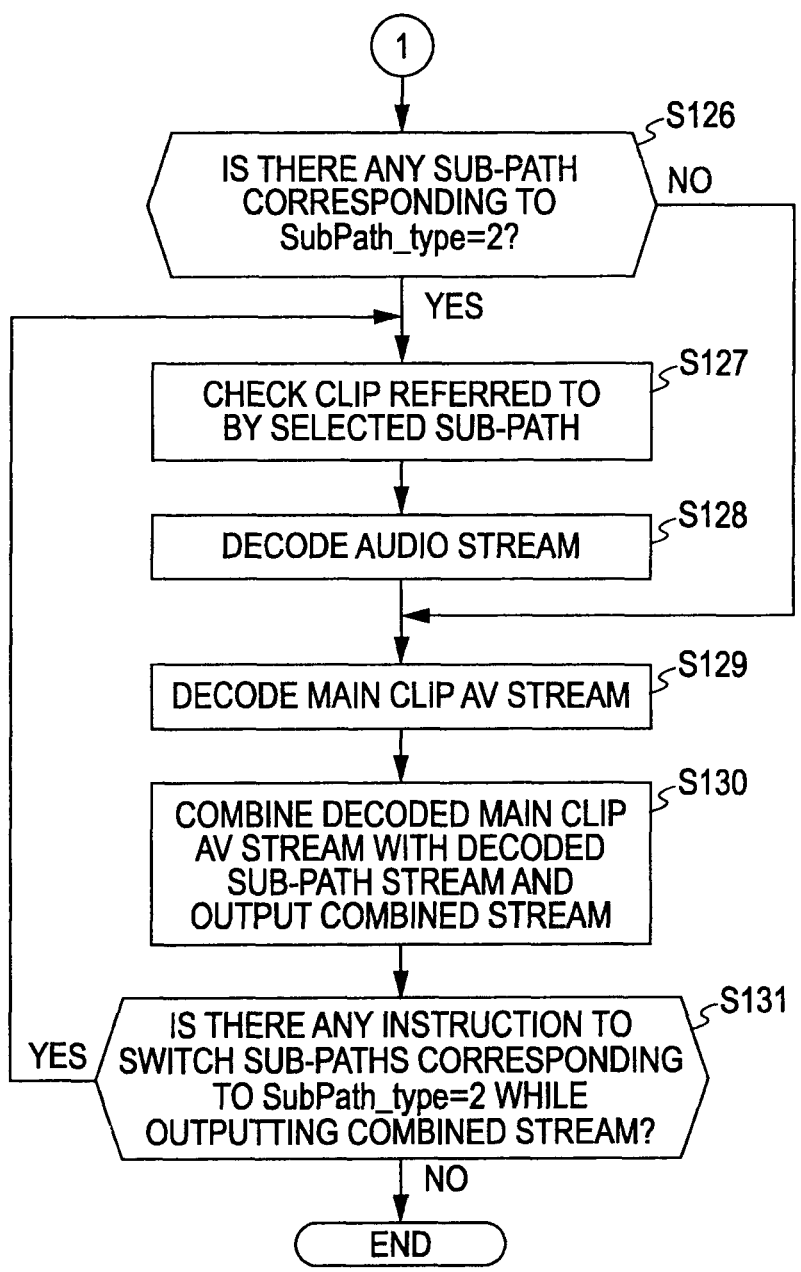
Figure 61:
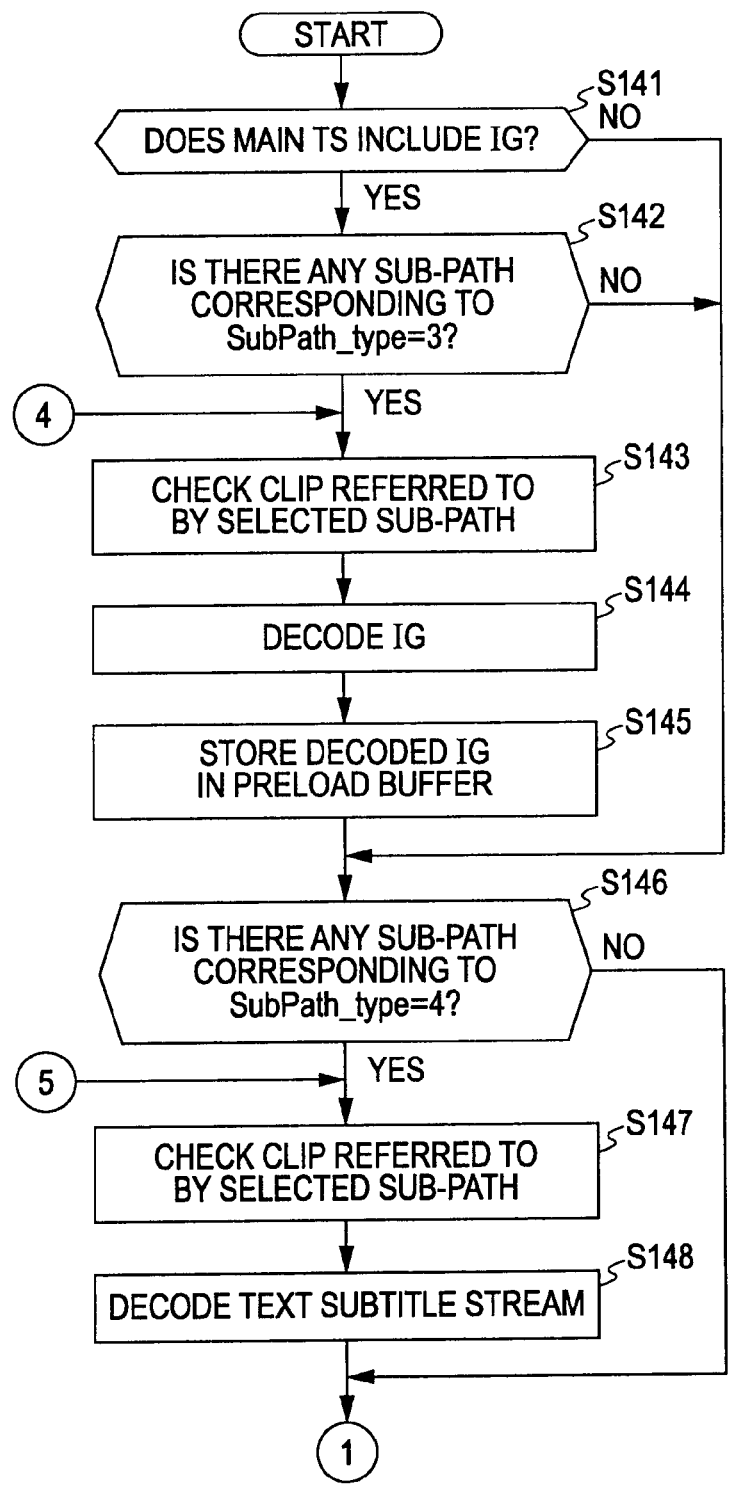
FIGS. 61 through 64 are flowcharts illustrating playback processing for a playlist having application_type=1 or 2.

An example of playback processing for a playlist of application_type=3 is described below with reference to FIGS. 59 and 60.

The controller 34 shown in FIG. 49 checks application_type of the main TS referred to by the main path of the playlist, and if it is found to be application_type=3, the controller 34 starts the playback processing for the playlist of application_type=3.

In step S121, the controller 34 determines whether the main TS includes an interactive graphics stream (IG).

If it is determined in step S121 the main TS does not include an IG, the process proceeds to step S126.

If it is determined in step S121 that the main TS includes an IG, the process proceeds to step S122 to determine whether there is any sub-path of SubPath_type=3.

If it is determined in step S122 that there is no sub-path of SubPath_type=3, the process proceeds to step S126.

If it is determined in step S122 that there is a sub-path of SubPath_type=3, the process proceeds to step S123. In step S123, the controller 34 checks the clip referred to by the selected sub-path of SubPath_type=3.

The controller 34 then instructs the storage drive 31 to read the stream specified by the sub-path, i.e., the IG, from the clip. The storage drive 31 reads the IG in response to this instruction. Then, the controller 34 instructs the interactive graphics decoder 74 to decode the IG.

Then, in step S124, the interactive graphics decoder 74 decodes the IG. Then, in step S125, the interactive graphics decoder 74 stores the decoded IG in the preload buffer 414.

After step S125, or if the outcome of step S121 or S122 is NO, the process proceeds to step S126 to determine whether there is any sub-path of SubPath_type=2.

If it is determined in step S126 that there is no sub-path of SubPath_type=2, the process proceeds to step S129.

If it is determined in step S126 that there is a sub-path of SubPath_type=2, the process proceeds to step S127. In step S127, the controller 34 checks the clip referred to by the selected sub-path (SubPath_type=2).

Then, the controller 34 instructs the storage drive 31 to read the stream specified by the sub-path, i.e., an audio stream, from the clip. The storage drive 31 reads the audio stream in response to this instruction. The controller 34 then instructs the second audio decoder 75-2 to decode the read audio stream.

Then, in step S128, the second audio decoder 75-2 decodes the read audio stream.

After step S128 or if the outcome of step S126 is NO, the process proceeds to step S129.

In step S129, the AV decoder 403 decodes the main clip AV stream. The main clip AV stream includes a video stream or an audio stream referred to by the main path of the playlist to be played back, for example, primary video streams and audio streams in the picture-in-picture technique. The first video decoder 72 or the first audio decoder 75-1 executes step S129.

In step S130, the AV decoder 403 combines the decoded main clip AV stream with the decoded sub-path stream, and outputs the combined stream. The decoded sub-path stream is the IG decoded in step S124 and stored in the preload buffer 414 in step S125 or the audio stream decoded in step S128.

In step S131, the controller 34 determines whether an instruction to switch sub-paths of SubPath_type=2 has been given while outputting the stream combined in step S130.

If it is determined in step S131 that an instruction to switch sub-paths of SubPath_type=2 has been given, the process returns to step S127. That is, the audio stream to be combined with the main clip AV stream is switched.

If it is determined in step S131 that an instruction to switch sub-paths of SubPath_type=2 has not been given, the playback processing is completed.

An example of playback processing for a playlist including a clip of application_type=1 or 2 is described below with reference to the flowcharts in FIGS. 61 through 64.

The controller 34 shown in FIG. 49 checks application_type of the main TS referred to by the main path of a playlist to be played back, and if it is found to be application_type=1 or 2, the controller 34 starts playback processing for the playlist.

In step S141, the controller 34 determines whether the main TS includes an IG.

If it is determined in step S141 that the main TS does not include an IG, the process proceeds to step S146.

If it is determined in step S141 that the main TS includes an IG, the process proceeds to step S142 to determine whether there is any sub-path of SubPath_type=3.

If it is determined in step S142 that there is no sub-path of SubPath_type=3, the process proceeds to step S146.

If it is determined in step S142 that there is a sub-path of SubPath_type=3, the process proceeds to step S143. In step S143, the controller 34 checks the clip referred to by the selected sub-path (SubPath_type=3).

The controller 34 then instructs the storage drive 31 to read the stream specified by the sub-path, i.e., the IG, from the clip. The storage drive 31 reads the IG in response to this instruction. The controller 34 then instructs the interactive graphics decoder 74 to decode the read IG.

Then, in step S144, the interactive graphics decoder 74 decodes the read IG. Then, in step S145, the interactive decoder 74 stores the decoded IG in the preload buffer 414.

After step S145, or if the outcome of step S141 or S142 is NO, the process proceeds to step S146 to determine whether there is any sub-path of SubPath_type=4.

If it is determined in step S146 that there is no sub-path of SubPath_type=4, the process proceeds to step S149.

If it is determined in step S146 that there is a sub-path of SubPath_type=4, the process proceeds to step S147. In step S147, the controller checks the clip referred to by the selected sub-path (SubPath_type=4).

The controller 34 then instructs the storage drive 31 to read the stream specified by the sub-path, i.e., the text subtitle stream. The storage drive 31 reads the text subtitle stream in response to this instruction. The controller 34 then instructs the text-ST composition 76 to decode the read text subtitle stream.

In step S148, the text-ST composition 76 decodes the read text subtitle.

After step S148, or if the outcome of step S146 is NO, the process proceeds to step S149 to determine whether there is any sub-path of SubPath_type=7.

If it is determined in step S149 that there is no sub-path of SubPath_type=7, the process proceeds to step S152.

If it is determined in step S149 that there is a sub-path of SubPath_type=7, the process proceeds to step S150. In step S150, the controller 34 checks the clip referred to by the selected sub-path (SubPath_type=7).

The controller 34 then instructs the storage drive 31 to read the stream specified by the sub-path, i.e., the video/audio stream, from the clip. The storage drive 31 reads the video/audio stream in response to this instruction. Then, the controller 34 instructs the second video decoder 412 or the second audio decoder 75-2 to decode the read video/audio stream.

In step S151, the second video decoder 412 or the second audio decoder 75-2 decodes the read video/audio stream.

After step S151, or if the outcome of step S149 is NO, the process proceeds to step S152 to determine whether there is any sub-path of SubPath_type=5.

If it is determined in step S152 that there is no sub-path of SubPath_type=5, the process proceeds to step S156.

If it is determined in step S152 that there is a sub-path of SubPath_type=5, the process proceeds to step S153. In step S153, the controller 34 checks the clip referred to by the selected sub-path (SubPath_type=5).

Then, the controller 34 determines by referring to stream_attributes( ) in step S154 whether it has the function of playing back the audio stream contained in the clip. A specific example of a determination as to whether the function of playing back audio streams has been discussed in the description of step S74 in FIG. 30, and thus, an explanation thereof is omitted here.

If it is determined in step S154 that the function of playing back the audio stream is not provided, the process proceeds to step S156.

If it is determined in step S154 that the function of playing back the audio stream is provided, the controller 34 instructs the storage drive 31 to read the stream specified by the sub-path, i.e., the audio stream, from the clip. The storage drive 31 reads the audio stream in response to this instruction. The controller 34 then instructs the second audio decoder 75-2 to decode the read audio stream.

Then, in step S155, the second audio decoder 75-2 decodes the read audio stream.

After step S155, or if the outcome of step S152 or S154 is NO, the process proceeds to step S156 to determine whether there is any sub-path of SubPath_type=6.

If it is determined in step S156 that there is no sub-path of SubPath_type=6, the process proceeds to step S161.

If it is determined in step S156 that there is a sub-path of SubPath_type=6, the process proceeds to step S157. In step S157, the controller 34 checks the clip referred to by the selected sub-path (SubPath_type=6).

In step S158, the controller 34 determines by referring to stream_attributes whether it has the function of playing back the audio stream contained in the clip. A specific example of a determination as to whether the function of playing back audio streams has been discussed in the description of step S74 in FIG. 30, and thus, an explanation thereof is omitted here.

If it is determined in step S158 that the function of playing back the audio stream is not provided, the controller 34 instructs the storage drive 31 to read the corresponding video stream specified by the sub-path from the clip. The storage drive 31 reads the video stream from the clip in response to this instruction. In this case, the controller 34 prohibits the decoding of audio streams contained in the read clip, and instructs the second video decoder 412 to decode the video stream. Then, the process proceeds to step S160.

If it is determined in step S158 that the function of playing back the audio stream contained in the clip is provided, the controller 34 instructs the storage drive 31 to read the stream specified by the sub-path, i.e., the video stream and the audio stream, from the clip. The storage drive 31 reads the video stream and the audio stream in response to this instruction. Then, the controller 34 instructs the second audio decoder 75-2 to decode the read audio stream, and the second video decoder 412 to decode the read video stream.

Then, in step S159, the second audio decoder 75-2 decodes the read audio stream.

After step S159, or if the outcome of step S158 is NO, the process proceeds to step S160.

In step S160, the second video decoder 412 decodes the read video stream.

After step S160, or if the outcome of step S156 is NO, the process proceeds to step S161.

In step S161, the AV decoder 403 decodes the main clip AV stream. The main clip AV stream includes a video stream or an audio stream contained in the main TS referred to by the main path of the playlist to be played back. The main clip AV stream is a primary video stream or a primary audio stream in the picture-in-picture technique. That is, the first video decoder 72 or the first audio decoder 75-1 of the AV decoder 403 executes step S161.

In step S162, the AV decoder 403 combines the decoded main clip AV stream with the decoded sub-path stream, and outputs the combined stream. The decoded sub-path stream includes at least 0 sub-path stream among the IG decoded in step S144 and stored in the preload buffer 414 in step S145, the text subtitle decoded in step S148, the audio stream decoded in step S151, the audio stream decoded in step S155, the audio stream decoded in step S159, and the video stream decoded in step S160.

In step S163, the controller 34 determines whether an instruction to switch sub-paths has been given by the user operation while outputting the stream combined in step S162.

If it is determined in step S163 that there is no instruction to switch sub-paths, the playback processing for a playlist of application_type=1 or 2 is completed.

If it is determined in step S163 that an instruction to switch sub-paths has been given, the process proceeds to step S164.

In step S164, the controller 34 checks SubPath_type of the sub-path selected by the switching instruction.

In step S165, the controller 34 determines whether the result of step S164 is SubPath_type=3.

If it is determined in step S165 that SubPath_type=3, the process returns to step S143. That is, the IG to be combined with the main clip AV stream is switched.

If it is determined in step S165 that the result of step S164 is not SubPath_type=3, the process proceeds to step S166 to determine whether the result of step S164 is SubPath_type=4.

If it is determined in step S166 that SubPath_type=4, the process returns to step S147. That is, the text subtitle to be combined with the main clip AV stream is switched.

If it is determined in step S166 that the result of step S164 is not SubPath_type=4, the process proceeds to step S167 to determine whether the result of step S164 is SubPath_type=7.

If it is determined in step S167 that SubPath_type=7, the process returns to step S150. That is, the video/audio stream to be combined with the main clip AV stream is switched.

If it is determined in step S167 that the result of step S164 is not SubPath_type=7, the process proceeds to step S168 to determine whether the result of step S164 is SubPath_type=5.

If it is determined in step S168 that SubPath_type=5, the process returns to step S153. That is, the audio stream to be combined with the main clip AV stream is switched.

If it is determined in step S168 that the result of step S164 is not SubPath_type=5, the process proceeds to step S169 to determine whether the result of step S164 is SubPath_type=6.

If it is determined in step S169 that SubPath_type=6, the process returns to step S157. That is, the audio stream or the video stream to be combined with the main clip AV stream is switched.

If it is determined in step S169 that the result of step S164 is not SubPath_type=6, the playback processing for a playlist of application_type=1 or 2 is completed.

As has been discussed above, to implement an application using the picture-in-picture technique, the definition of combinations of streams to be played back together with a primary video stream, i.e., combinations of secondary video streams, primary audio streams, secondary audio streams, and subtitle streams, is necessary.

By defining a plurality of combinations, not only a primary video stream or a primary audio stream played back in the main screen 301, but also a secondary video stream, a secondary audio stream, or a subtitle stream played back in the sub-screen 302 can be easily switched.

A manufacturing method for the recording medium 21 on which data that can be played back by the playback apparatus 20 or 401 is recorded is discussed below in the context of a disc-shaped recording medium with reference to FIGS. 65 and 66.

Figure 65:
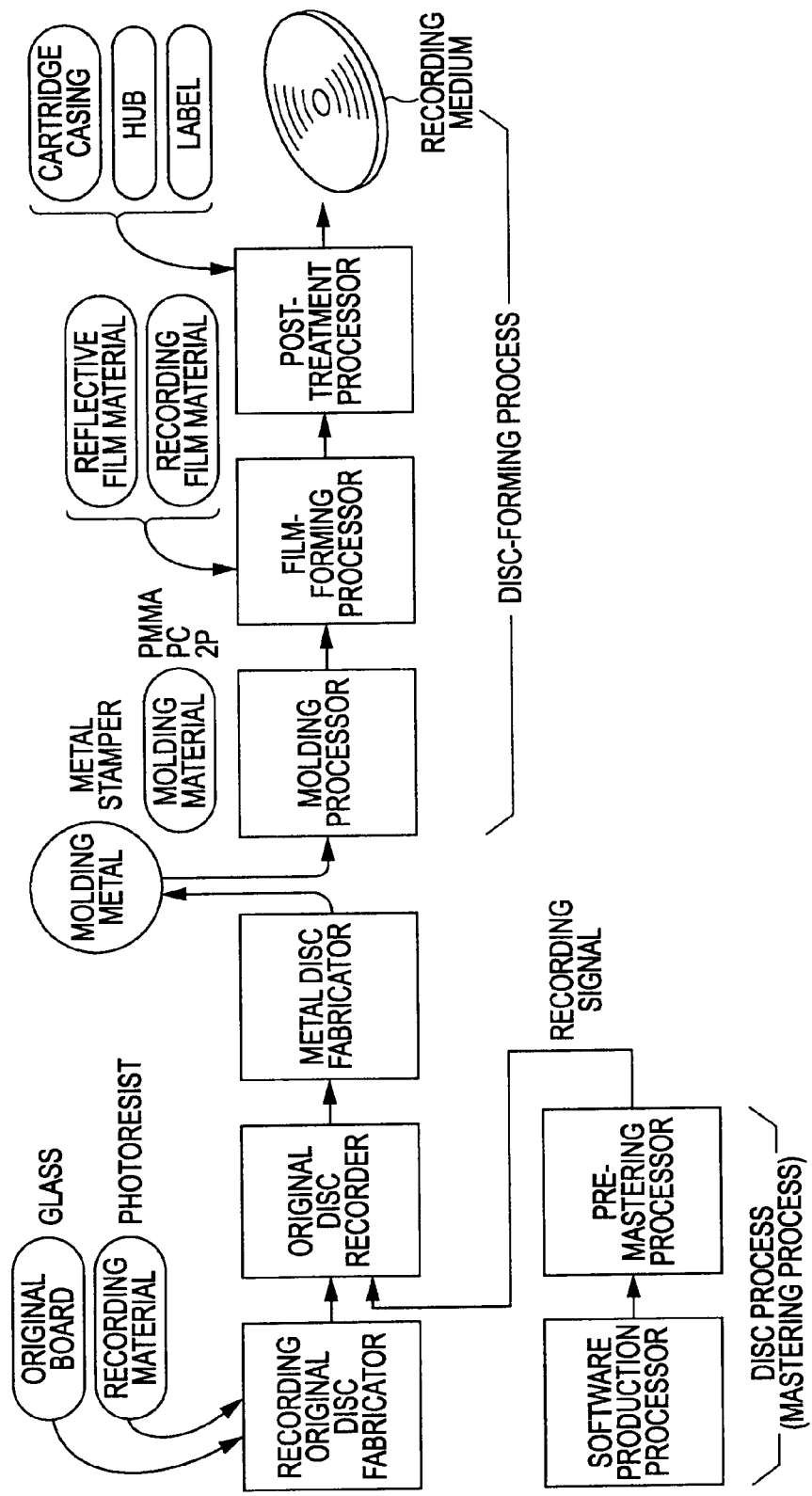
FIGS. 65 and 66 illustrate a manufacturing method for a recording medium on which data to be played back by an playback apparatus of an embodiment of the present invention is recorded.

An original board, such as glass, is prepared, as shown in FIG. 65, and then, a recording material, such as a photoresist, is applied onto the glass, thereby forming a recording original disc.

Figure 66:
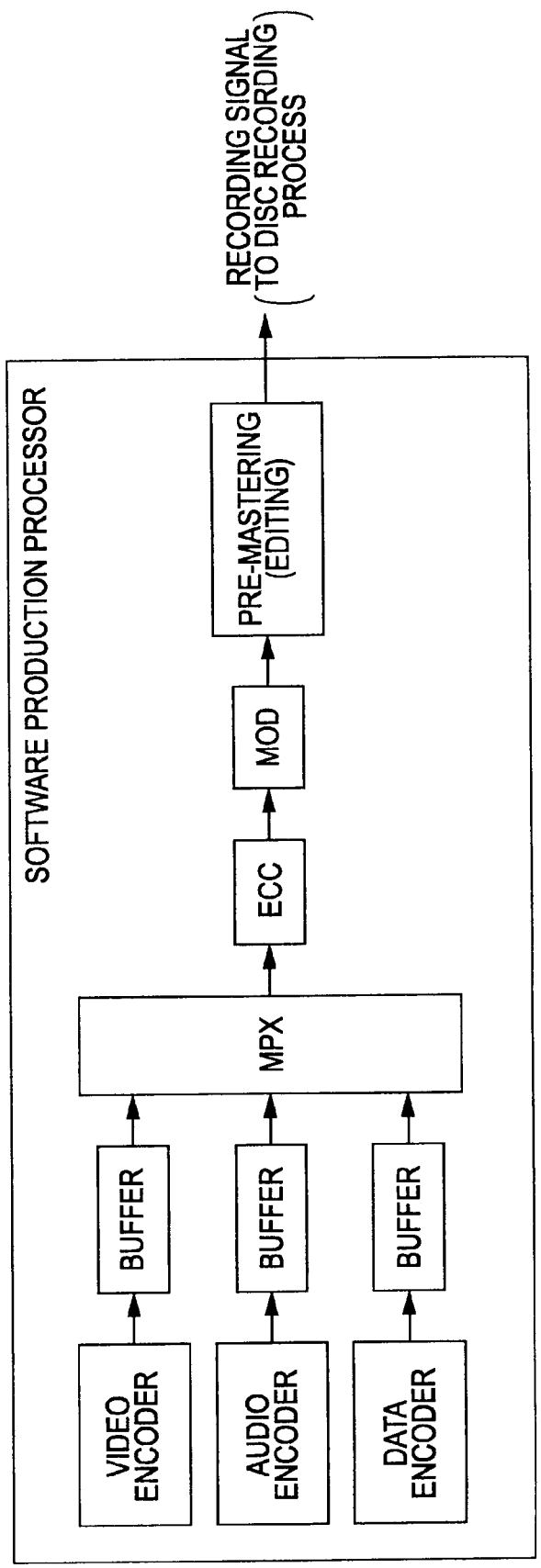

In a software production processor, as shown in FIG. 66, video data which is encoded by a video encoder and which is to be played back by the playback apparatus 20 or 401 is temporarily stored in a buffer. Audio data encoded by an audio encoder is temporarily stored in a buffer, and also, data other than streams (e.g., indexes, playlists, play items, etc.) encoded by a data encoder is temporarily stored in a buffer. The video data, audio data, and data other than streams stored in the buffers are multiplexed with a synchronizing signal in a multiplexer (MPX), and are provided with error correction codes in an error-correcting code (ECC) circuit. Then, the multiplexed data is modulated in a modulation circuit (MOD), and is then recorded on, for example, magnetic tape, according to a predetermined format. As a result, software to be recorded on the recording medium 11 and to be played back by the playback apparatus 20 or 401 is produced.

The software is edited (subjected to pre-mastering) if necessary so that a signal format to be recorded on an optical disc (recording signal) is generated. A laser beam is then modulated in accordance with this recording signal, and the modulated laser beam is applied to the photoresist on the original disc so that the photoresist is exposed to the laser beam in accordance with the recording signal.

Thereafter, the original disc is developed, and pits appear on the original disc. The original disc is then subjected to treatment, such as, electroforming, so that a metal original disc having pits transferred from on the original disc is fabricated. A metal stamper is then fabricated from the metal original disc. This metal stamper is used as a metal mold.

A material, such as polymethyl methacrylate (PMMA) or polycarbonate (PC) is injected into this metal stamper and is fixed. Alternatively, after applying an ultraviolet curable resin (2P) onto the metal stamper, the resin is irradiated with an ultraviolet and is cured. This makes it possible to transfer pits on the metal stamper to the resin, thereby forming a replica.

A reflective film is then formed on the replica by deposition, sputtering, or spin-coating.

Then, necessary processing, such as adjusting the inner and outer diameters of the resulting disc and laminating two discs, is performed. Then, a label and a hug are attached to the disc and the disc is then inserted into a cartridge. As a result, the recording medium 11 on which data to be played back by the playback apparatus 20 or 401 is recorded is completed.

Figure 67:
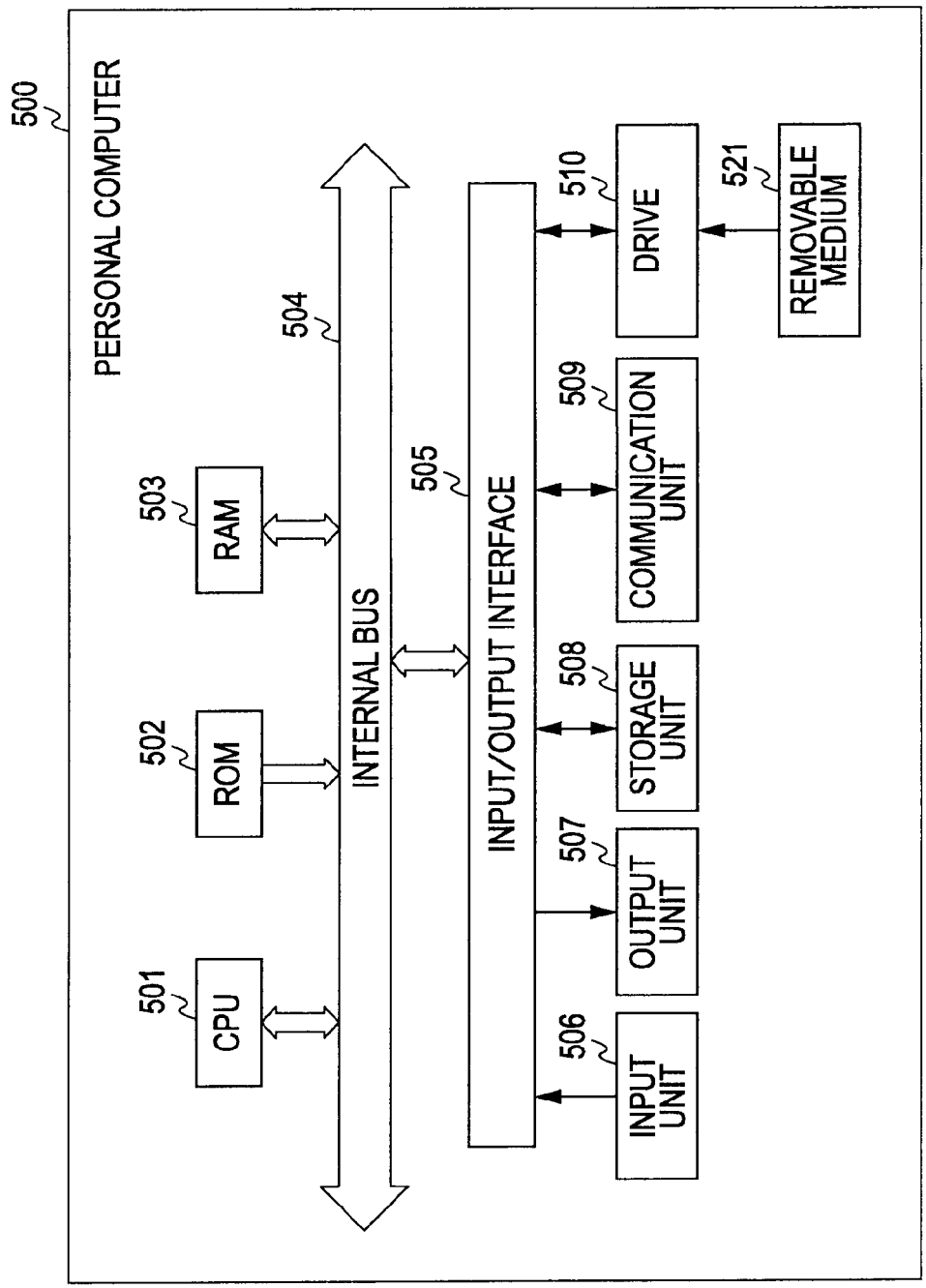
FIG. 67 illustrates the configuration of a personal computer.

The above-described series of processing operations may be executed by hardware or software. In this case, the processing operations can be performed by a personal computer 500 shown in FIG. 67.

In the personal computer 500, a central processing unit (CPU) 501 executes various processing operations according to a program stored in a read only memory (ROM) 502 or a program loaded into a random access memory (RAM) 503 from a storage unit 508. In the RAM 503, data necessary for the CPU 501 to execute various processing operations is also stored.

The CPU 501, the ROM 502, and the RAM 503 are connected to each other via an internal bus 504. An input/output interface 505 is also connected to the internal bus 504.

The input/output interface 505 is connected to an input unit 506, such as a keyboard and a mouse, an output unit 507, such as a display, for example, a cathode ray tube (CRT) or a liquid crystal display (LCD), the storage unit 508, such as a hard disk, and a communication unit 509, such as a modem or a terminal adapter. The communication unit 509 performs communication via various networks including telephone lines or cable television.

A drive 510 is connected to the input/output interface 505 if necessary. A removable medium 521, such as a magnetic disk, an optical disc, a magneto-optical disk, or a semiconductor memory, is installed in the drive 510. A computer program read from the removable medium 521 is installed into the storage unit 508.

If software is used for executing the series of processing operations, a corresponding software program is installed from a network or a recording medium.

This recording medium may be formed of a package medium, such as the removable medium 521, recording the program thereon, which is distributed to the user separately from the computer. Alternatively, the recording medium may be formed of the ROM 502 or a hard disk forming the storage unit 508 recording the program thereon, which is distributed to the user while being built in the computer.

In this specification, steps forming the computer program may be executed in chronological order described in this specification. Alternatively, they may be executed in parallel or individually.

The drive 510 can, not only read data recorded on the removable medium 521 installed in the drive 510, but also write data onto the removable medium 521. The personal computer 500 has a function similar to that of the software production processor discussed with reference to FIG. 66, for example, the personal computer 500 can execute a program for implementing a function similar to that of the software production processor by using the CPU 501.

More specifically, the personal computer 500 can generate data similar to data generated by the software production processor discussed with reference to FIG. 66 by using the CPU 501 or can obtain data similar to data generated by an external device, for example, the software production processor discussed with reference to FIG. 66, via the communication unit 509 or the removable medium 521 installed in the drive 510. The personal computer 500 also serves as a recorder that can record the generated or obtained data similar to data generated by the software production processor discussed with reference to FIG. 66 on the removable medium 521 installed in the drive 510.

It should be understood by those skilled in the art that various modifications, combinations, sub-combinations and alterations may occur depending on design requirements and other factors insofar as they are within the scope of the appended claims or the equivalents thereof.

The invention claimed is:

1. A non-transitory recording medium on which data including playback management information to manage playback of at least two streams including a first stream and a second stream is recorded, the playback management information comprising:
   a main playback path indicating a position on a time axis of the first stream;
   a sub playback path indicating a position on the time axis of the second stream; and
   type information indicating whether the second stream is played back synchronously with the first stream and whether the second stream is multiplexed into a same file as the first stream,
   wherein the main playback path includes video data and interactive graphics, and wherein the playback management information satisfies:
a first condition that a type of the sub playback path corresponds to a set of sub playback path types of a predetermined application media category among a plurality of application media categories, and
a second condition that the sub playback path is determined so that a number of files readable at one time does not exceed a predetermined number, and
wherein the inclusion of the interactive graphics in the main playback path prohibits inclusion of preloading interactive graphics in the sub playback path.

2. The non-transitory recording medium according to claim 1, wherein the type information indicates that the second stream is played back synchronously with the first stream and that the second stream is multiplexed into the same file as the first stream.

3. The non-transitory recording medium according to claim 1, wherein the type information indicates that the second stream is played back synchronously with the first stream and that the second stream is multiplexed into a file different from a file of the first stream.

4. The non-transitory recording medium according to claim 1, wherein the type information indicates that the second stream is played back asynchronously with the first stream and that the second stream is multiplexed into a file different from a file of the first stream.

5. The non-transitory recording medium according to claim 1, wherein the playback management information is classified into the predetermined application media category among the plurality of application media categories based on a type of media of the first stream, each application media category corresponding to the set of sub playback path types.

6. The non-transitory recording medium according to claim 1,
wherein the first stream is associated with a first file, and
wherein the second stream is associated with a second file.

7. The non-transitory recording medium according to claim 6,
wherein the predetermined number of the files readable at one time is two,
wherein the first file and the second file are different files, and
wherein the second condition is that the sub playback path is determined so that only the second file is read together with the first file.

8. The non-transitory recording medium according to claim 6,
wherein the predetermined number of the files readable at one time is two, the second file is the same file as the first file, and a remaining file is a file different from the first file, and
wherein the second condition is that the sub playback path is determined so that the second file is read with the first file and the remaining file.

9. The non-transitory recording medium according to claim 6, wherein, when the sub playback path is a non-synchronized reading type defining that the second file is read asynchronously with the first file, the playback management information satisfies a third condition that the asynchronous second file does not count toward the number of the files readable at one time.

10. The non-transitory recording medium according to claim 1, wherein the main playback path further includes presentation graphics.

11. A method for recording on a recording medium data that can be played back by a playback apparatus, comprising:
generating data having a data structure including playback management information to manage playback of at least two streams, the playback management information including:
a main playback path indicating a position on a time axis of the first stream,
a sub playback path indicating a position on the time axis of the second stream, and
type information indicating whether the second stream is played back synchronously with the first stream and whether the second stream is multiplexed into a same file as the first stream; and
recording the generated data on the non-transitory recording medium,
wherein the main playback path includes video data and interactive graphics, and
wherein the playback management information satisfies:
a first condition that a type of the sub playback path corresponds to a set of sub playback path types of a predetermined application media category among a plurality of application media categories, and
a second condition that the sub playback path is determined so that a number of files readable at one time does not exceed a predetermined number, and
wherein the inclusion of the interactive graphics in the main playback path prohibits inclusion of preloading interactive graphics in the sub playback path.

12. The method according to claim 11, wherein the plurality of application media categories includes movies, time-based slideshows, and browsable slideshows.

13. The method according to claim 11, wherein the main playback path further includes audio data and presentation graphics.

14. The method according to claim 11,
wherein the playback management information is classified into the predetermined application media category among the plurality of application media categories based on a type of media of the first stream, each application media category corresponding to the set of sub playback path types,
wherein the first stream is associated with a first file, and
wherein the second stream is associated with a second file.

15. The method according to claim 14, wherein, when the sub playback path is a non-synchronized reading type defining that the second file is read asynchronously with the first file, the playback management information satisfies a third condition that the asynchronous second file does not count toward the number of the files readable at one time.

16. The method according to claim 11, wherein the main playback path further includes presentation graphics.

17. A non-transitory computer-readable storage medium storing computer-readable instructions thereon that, when executed by a computer, cause the computer to perform a method comprising:
generating data having a data structure including playback management information to manage playback of at least two streams, the playback management information including:
a main playback path indicating a position on a time axis of the first stream,
a sub playback path indicating a position on the time axis of the second stream, and
type information indicating whether the second stream is played back synchronously with the first stream and whether the second stream is multiplexed into a same file as the first stream; and
recording the generated data on a recording medium, wherein the main playback path includes video data and interactive graphics, and wherein the playback management information satisfies:

a first condition that a type of the sub playback path corresponds to a set of sub playback path types of a predetermined application media category among a plurality of application media categories, and a second condition that the sub playback path is determined so that a number of files readable at one time does not exceed a predetermined number, and wherein the inclusion of the interactive graphics in the main playback path prohibits inclusion of preloading interactive graphics in the sub playback path.

18. The non-transitory computer-readable storage medium according to claim 17, wherein, when the sub playback path is a non-synchronized reading type defining that the second file is read asynchronously with the first file, the playback management information satisfies a third condition that the asynchronous second file does not count toward the number of the files readable at one time.

19. The non-transitory computer-readable storage medium according to claim 17, wherein the main playback path further includes audio data and presentation graphics.

20. The non-transitory computer-readable storage medium according to claim 17, wherein the main playback path further includes presentation graphics.

\* \* \* \* \*

UNITED STATES PATENT AND TRADEMARK OFFICE
CERTIFICATE OF CORRECTION

PATENT NO. : 8,824,868 B2
APPLICATION NO. : 12/833667
DATED : September 2, 2014
INVENTOR(S) : Shinobu Hattori et al.

Page 1 of 1

It is certified that error appears in the above-identified patent and that said Letters Patent is hereby corrected as shown below:

On the title page, Item (62), the Related U.S. Application Data Information is incorrect.
Item (62) should read:

Related U.S. Application Data

--(62) Division of application No. 11/505,370, filed on Aug. 17, 2006, now Pat. No. 8,139,922.--

Signed and Sealed this
Thirtieth Day of December, 2014

Michelle K. Lee
*Deputy Director of the United States Patent and Trademark Office*